(12) United States Patent
Hogan

(10) Patent No.: US 8,375,632 B2
(45) Date of Patent: *Feb. 19, 2013

(54) PLANTER THAT CAN BE RAISED, LOWERED AND LOCKED TO A VERTICAL SUPPORT STRUCTURE

(76) Inventor: James Hogan, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/036,962

(22) Filed: Feb. 28, 2011

(65) Prior Publication Data

US 2012/0047801 A1 Mar. 1, 2012

Related U.S. Application Data

(63) Continuation-in-part of application No. 12/164,075, filed on Jun. 29, 2008, which is a continuation of application No. 11/868,534, filed on Oct. 8, 2007, now Pat. No. 7,770,324, and a continuation-in-part of application No. 12/026,553, filed on Feb. 5, 2008, which is a continuation-in-part of application No. 11/868,534.

(60) Provisional application No. 60/867,108, filed on Nov. 22, 2006.

(51) Int. Cl.
*A01G 9/02* (2006.01)

(52) U.S. Cl. ........................ 47/67; 47/39; 47/66.6; 47/79

(58) Field of Classification Search ................... 47/65.5, 47/66.6, 67, 39, 41.01, 48.5; 211/113, 117, 211/88.03

See application file for complete search history.

(56) References Cited

U.S. PATENT DOCUMENTS

| 147,849 A | 2/1874 | Leslie |
| 183,163 A | 10/1876 | Hegarty |
| 779,924 A | 1/1905 | Gommel |
| 1,499,473 A | 7/1924 | Price |
| 2,003,986 A | 6/1935 | Witthuhn |
| 2,969,186 A * | 1/1961 | Geiger ............................ 239/65 |

(Continued)

FOREIGN PATENT DOCUMENTS

| JP | 08133693 A | * | 5/1996 |
| JP | 11206534 A | * | 8/1999 |

*Primary Examiner* — David Parsley
*Assistant Examiner* — Danielle Clerkley
(74) *Attorney, Agent, or Firm* — Mark Young, P.A.

(57) ABSTRACT

Planter systems allow for the raising, lowering, holding, locking and releasing of a planter on a vertical support structure. The planter assembly may include a carriage, to which one or more planters is attached. Guides such as cables, rollers, sliders, bristles, gaskets, carpet and registration pins maintain space between the vertical support and planter assembly and facilitate raising and lowering. A tether guided over a pulley may be retracted or extended by winding it around or unwinding it from a winch, cleat or windlass to causes the planter assembly to rise or descend. When raised to a locking height, the planter assembly causes a mechanical locking mechanism associated with the planter assembly to move into a locking position, securing the planter assembly to the vertical support. Further raising releases the locking mechanism. Attachable items such as banners, flags, hangers and the like may be coupled to the carriage. Optional irrigation supplies water to the planter assembly and/or surrounding terrain. The planter may be unitary or a plurality of assembled planter components or sections. Drain and cleanout ports facilitate draining and cleaning of the planter assembly. An optional waterfall embodiment includes a reservoir section with overflow ports to drain water into a lower reservoir at the base of the vertical support, from which a pump supplies the water back to the reservoir section of the planter assembly. A plurality of conduits for electrical, data and plumbing extend through the vertical support.

32 Claims, 62 Drawing Sheets

U.S. PATENT DOCUMENTS

| | | | |
|---|---|---|---|
| 3,382,988 A | 5/1968 | O'Reilly | |
| 4,600,348 A | 7/1986 | Pettit | |
| 4,861,219 A * | 8/1989 | Mayle | 414/469 |
| 5,017,080 A * | 5/1991 | Thorndike et al. | 414/454 |
| 5,348,374 A * | 9/1994 | Kuo | 297/344.18 |
| 5,440,836 A | 8/1995 | Lee | |
| 5,598,662 A | 2/1997 | Droste | |
| 5,794,563 A | 8/1998 | Klepac | |
| 6,557,297 B2 | 5/2003 | Receveur | |
| 6,626,773 B1 | 9/2003 | Fair | |
| 7,043,877 B1 | 5/2006 | Jensen | |
| 7,155,860 B1 | 1/2007 | Ferguson, III | |
| 2002/0189163 A1 * | 12/2002 | Cooper | 47/39 |
| 2003/0161622 A1 | 8/2003 | Zantos | |
| 2003/0196376 A1 | 10/2003 | Taylor | |
| 2004/0255513 A1 * | 12/2004 | Becker | 47/65.9 |
| 2005/0091916 A1 | 5/2005 | Faris | |

\* cited by examiner

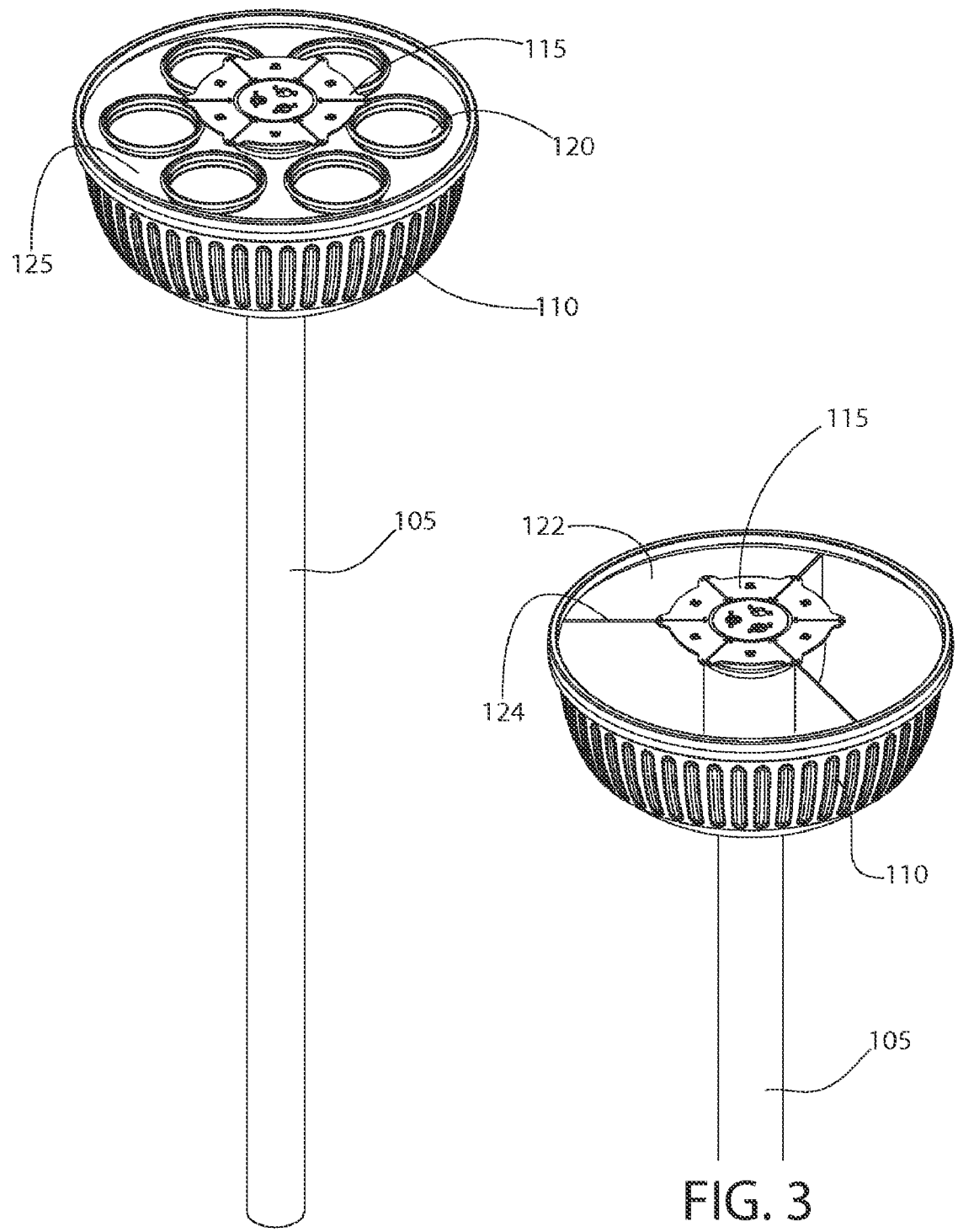

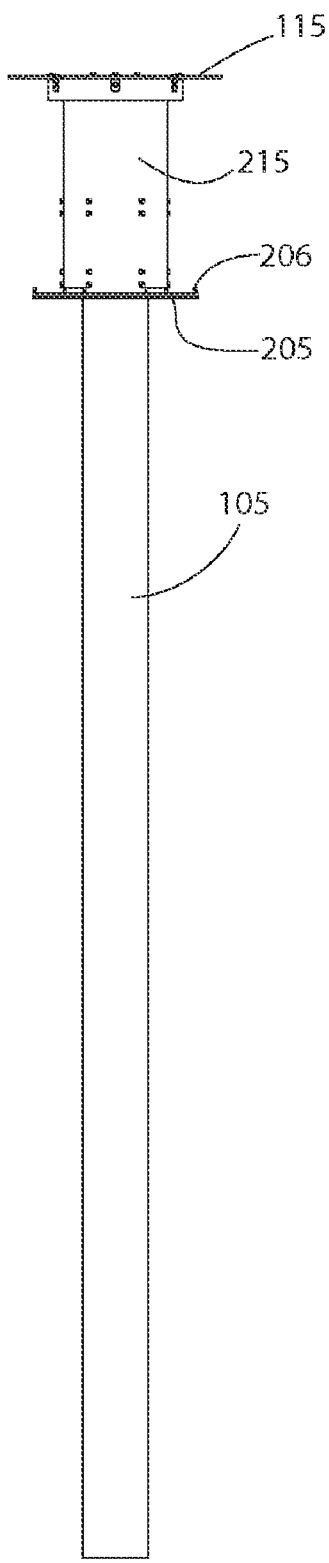
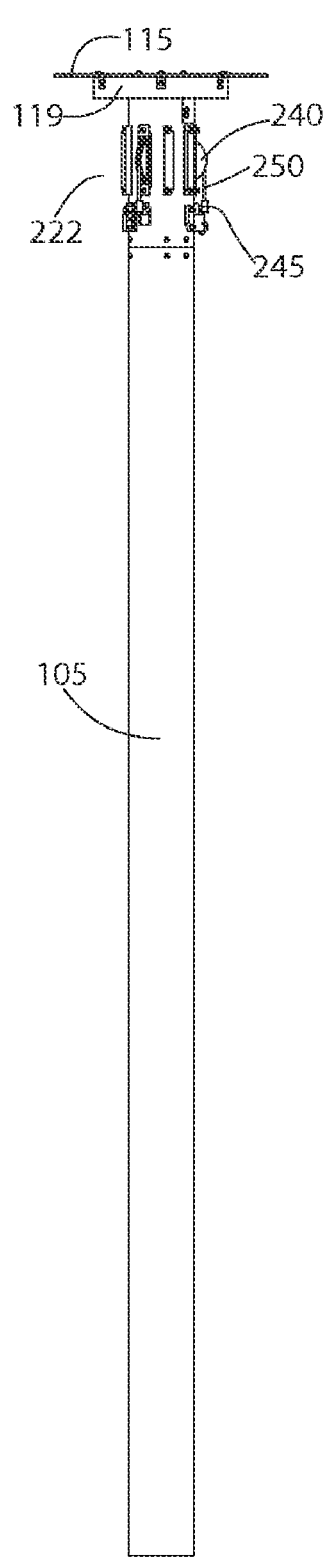
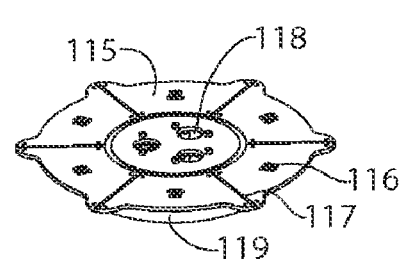
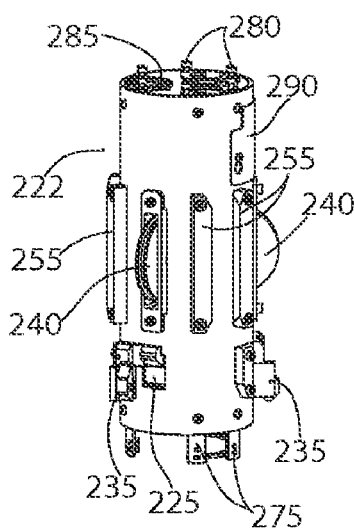
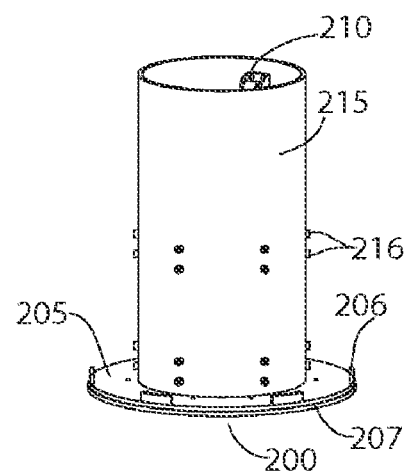
FIG. 7
FIG. 8
FIG. 9
FIG. 10
FIG. 11

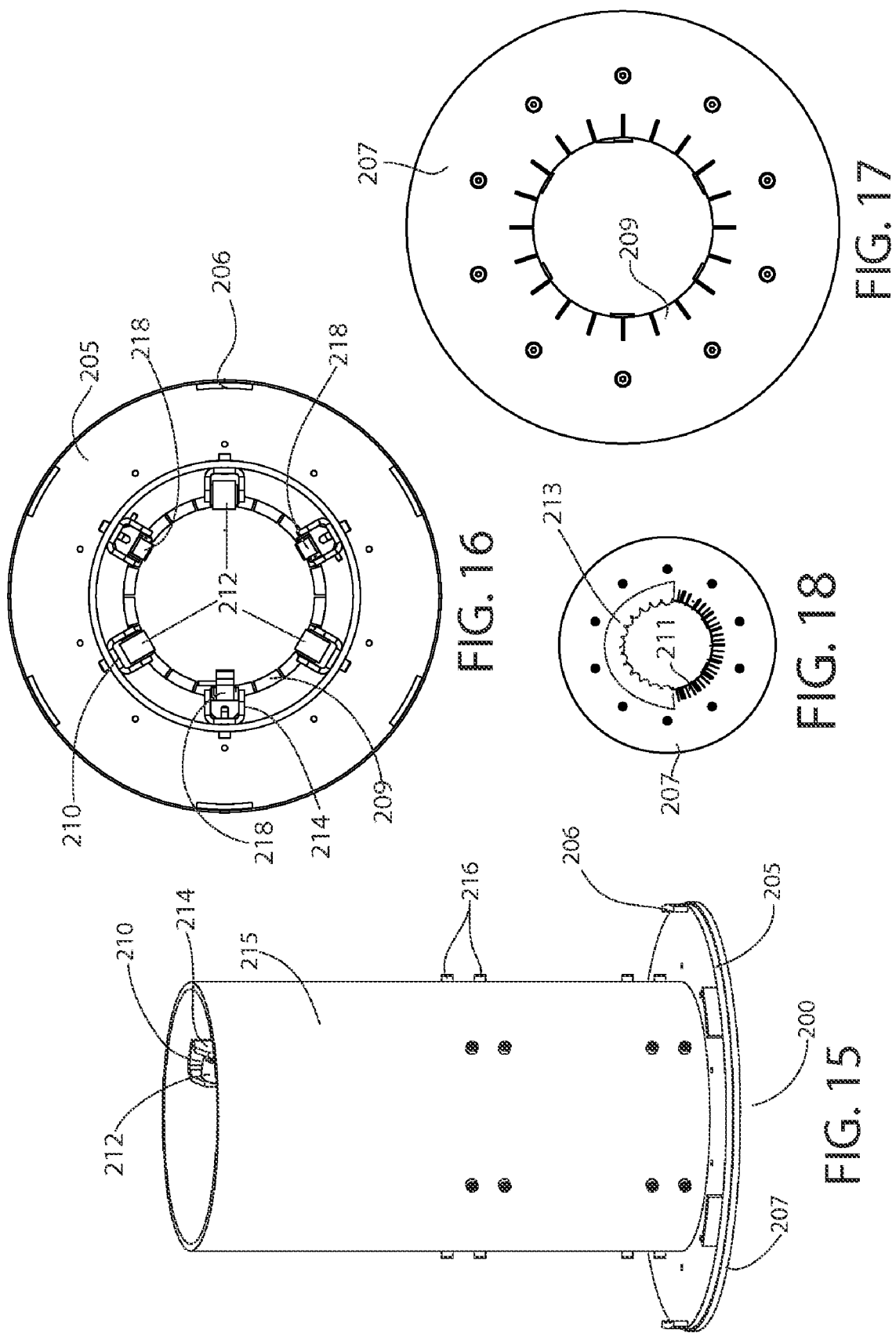

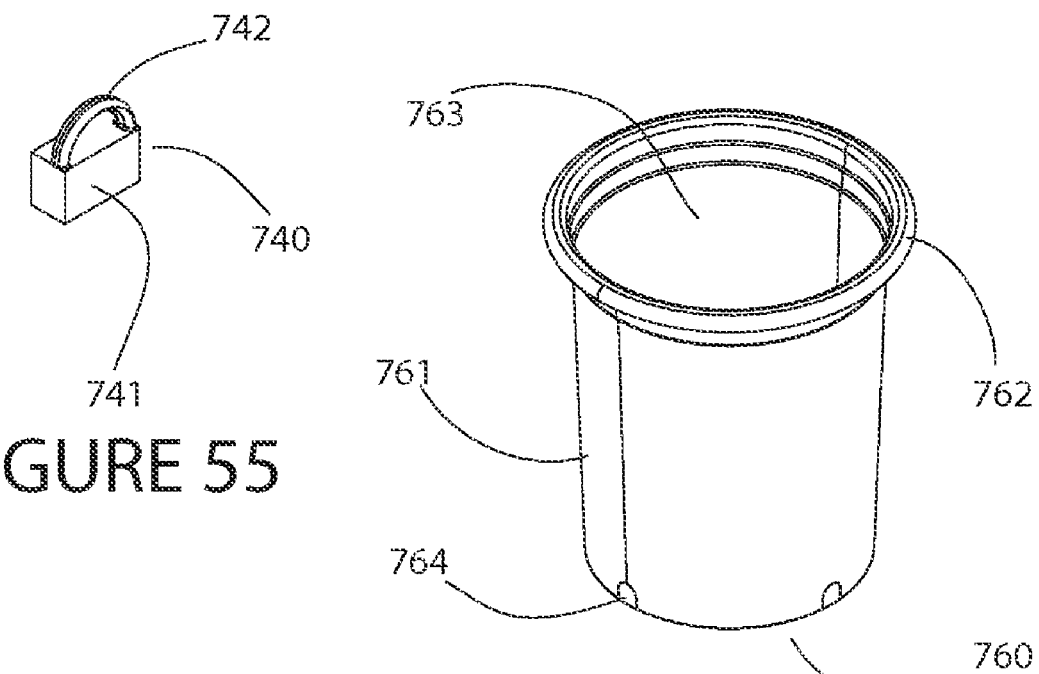
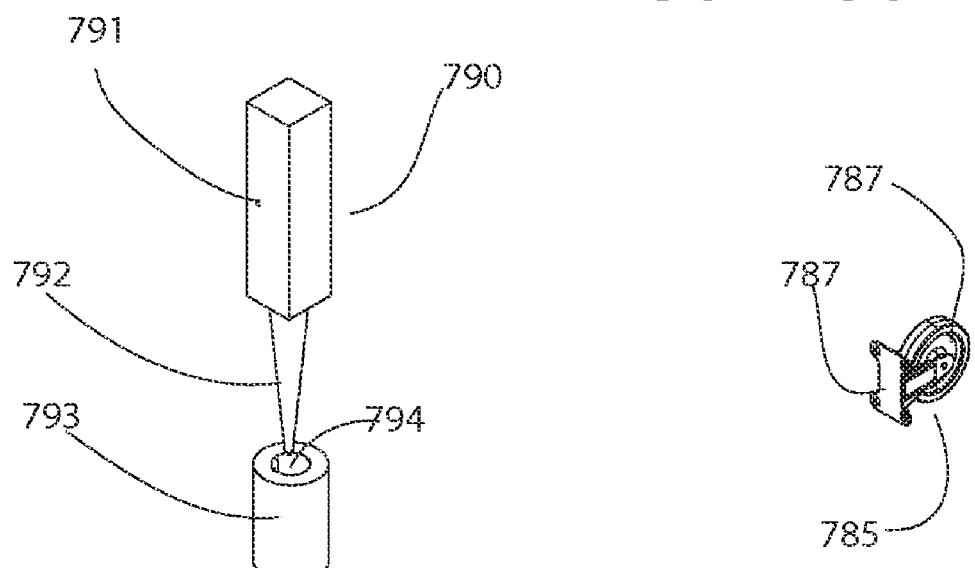
FIGURE 55
FIGURE 56
FIGURE 57
FIGURE 58

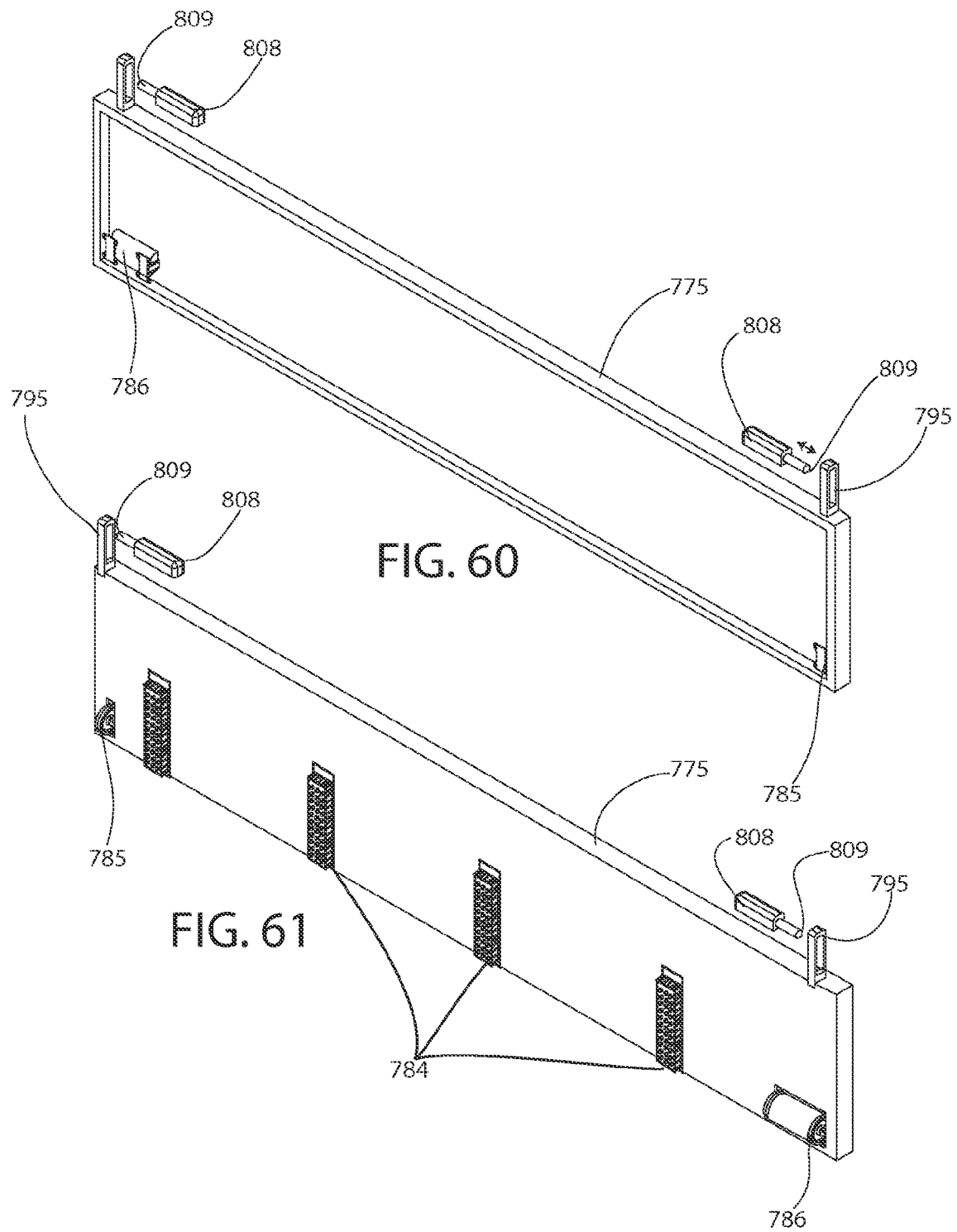

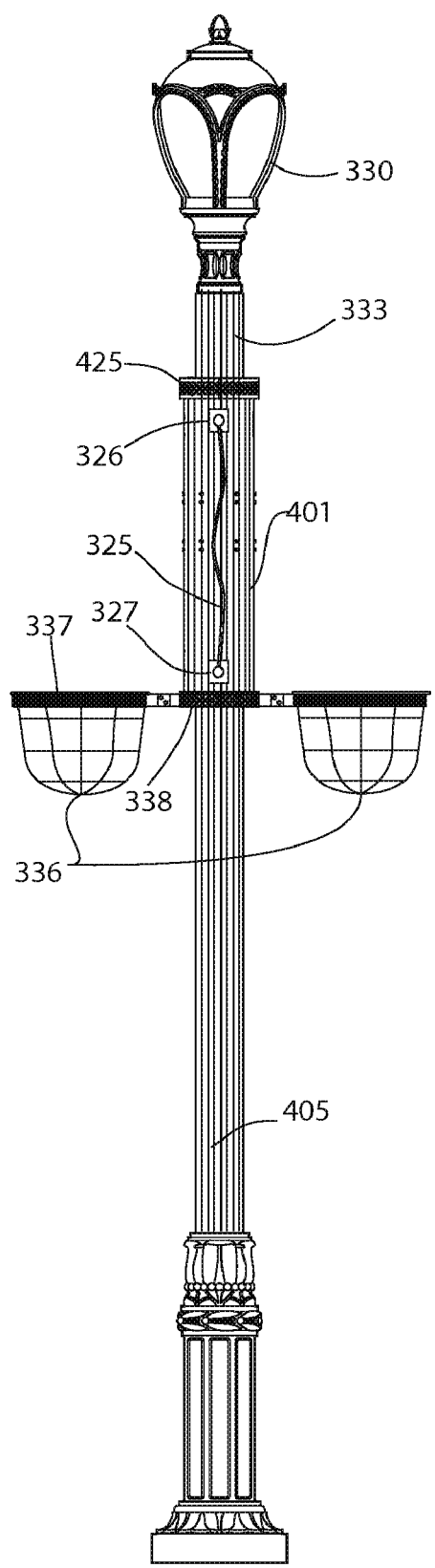
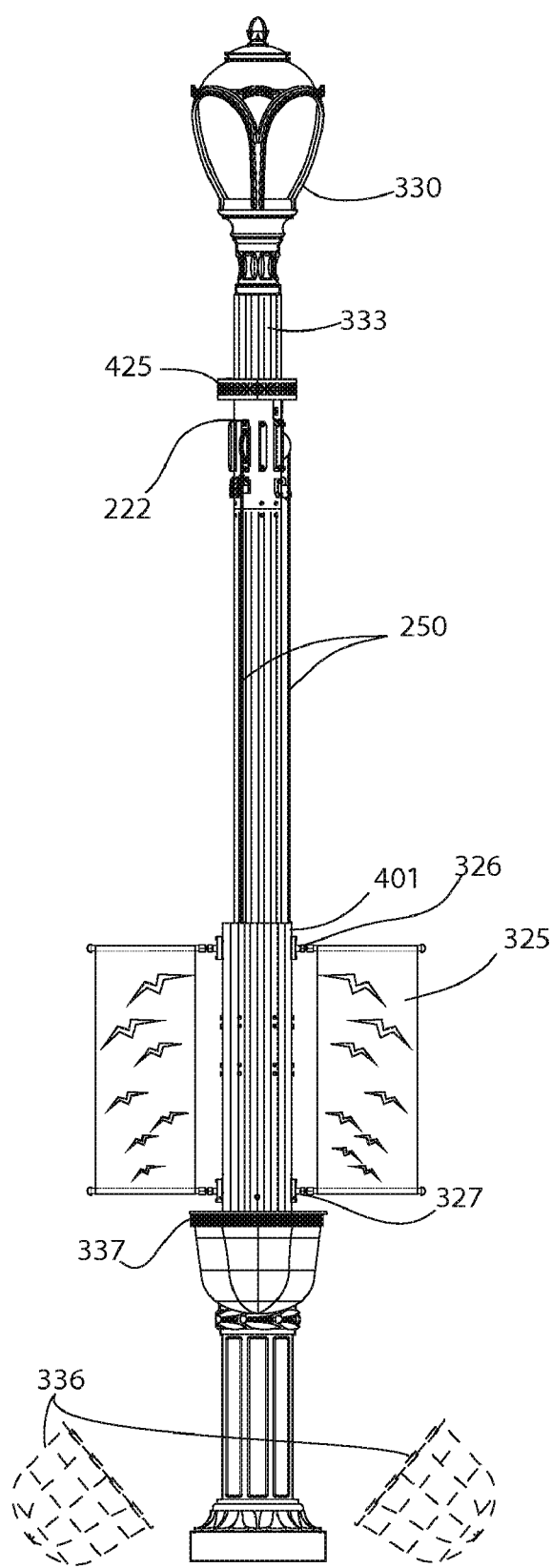
FIG. 84
FIG. 85

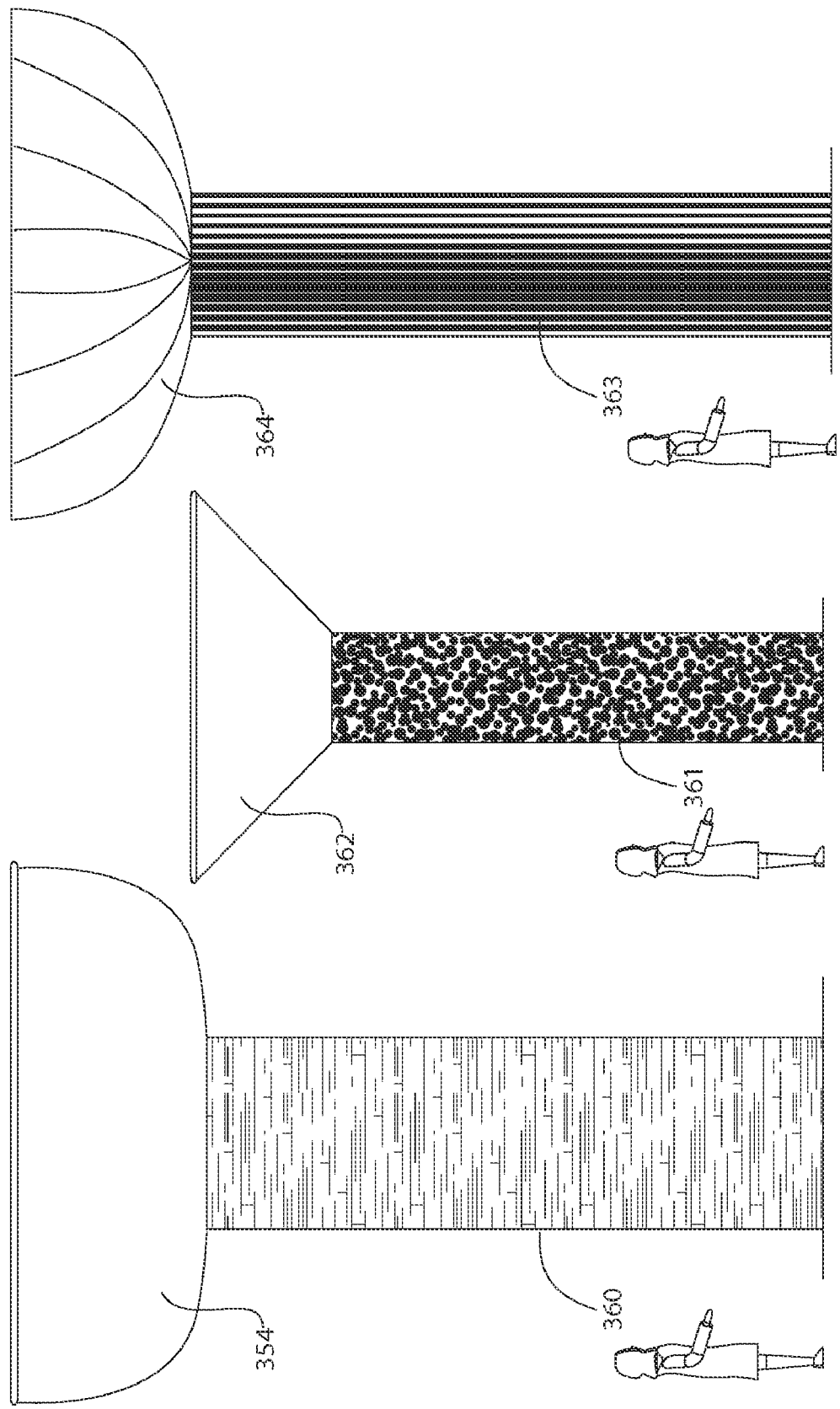

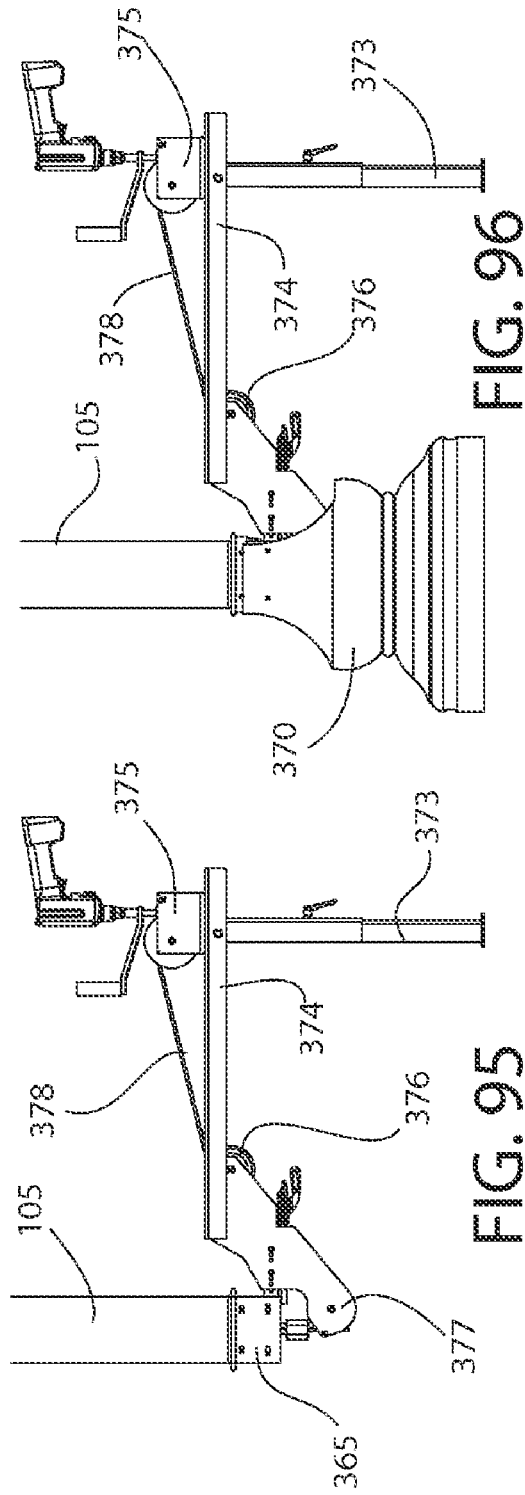
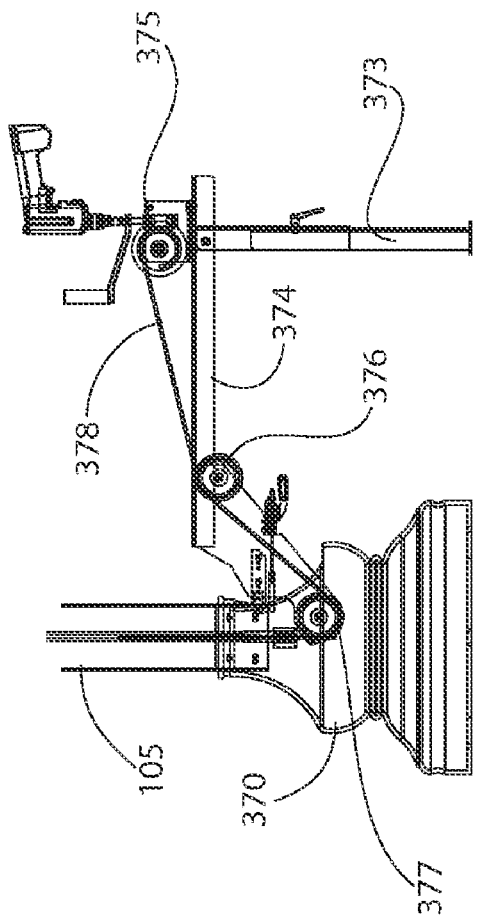
FIG. 95
FIG. 96
FIG. 97

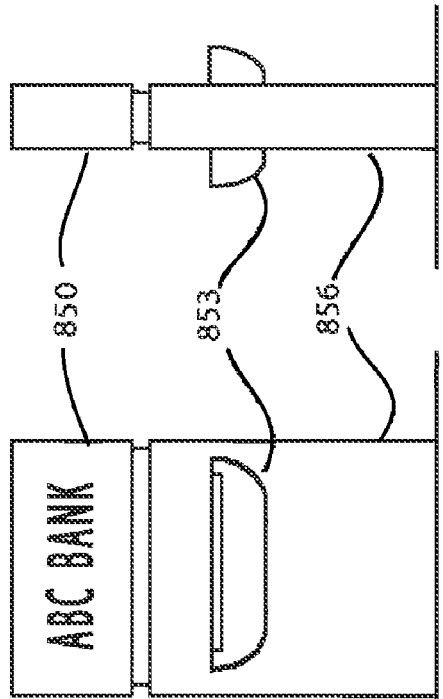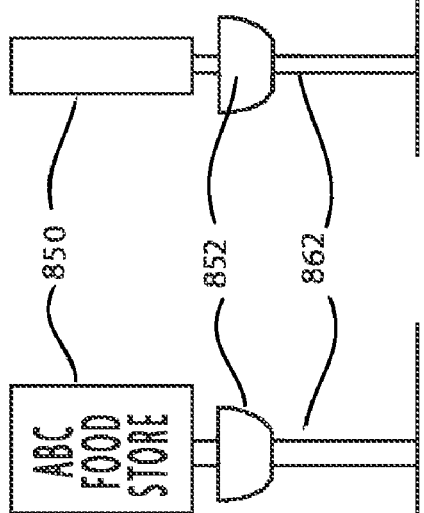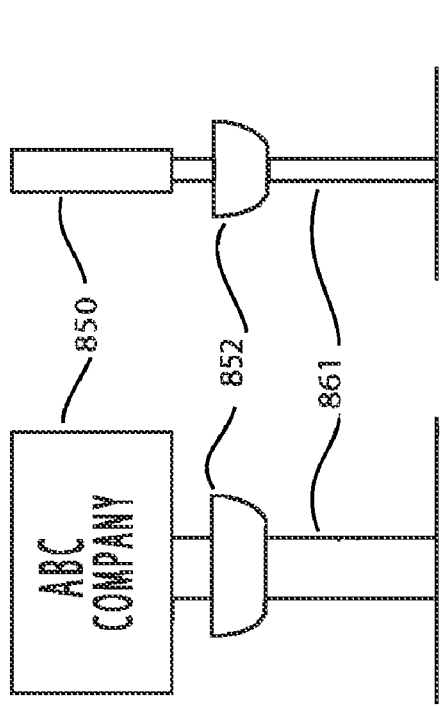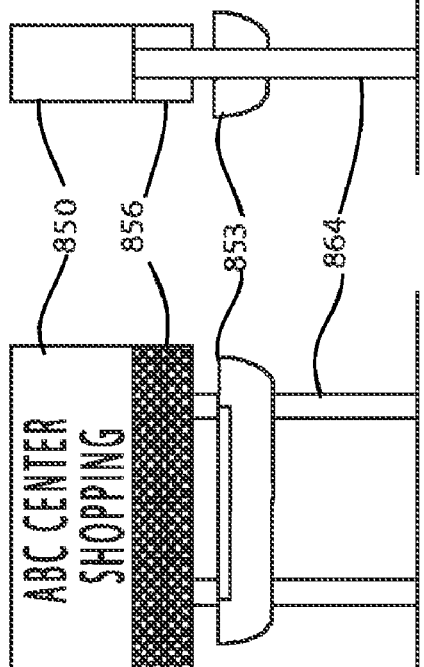

PLANTER THAT CAN BE RAISED, LOWERED AND LOCKED TO A VERTICAL SUPPORT STRUCTURE

RELATED APPLICATION

This application is a continuation in part and claims the benefit of priority of U.S. Nonprovisional application Ser. No. 11/868,534, filed Oct. 8, 2007, the entire contents, including declarations, of which are incorporated herein by this reference, and a continuation in part and claims the benefit of priority of U.S. Nonprovisional application Ser. No. 12/026,553 filed Feb. 2, 2008, and a continuation in part and claims the benefit of priority of U.S. Nonprovisional application Ser. No. 12/164,075 filed Jun. 29, 2008, the entire contents, including declarations, of which are incorporated herein by this reference.

FIELD OF THE INVENTION

This invention generally relates to planters, and, more particularly, to variable controlled planter systems allowing for the raising, lowering, holding, locking and releasing of planters on poles or other elongated support structures.

BACKGROUND

Planters (i.e., open vessels for holding plants) have been around for millennia, at least since the times of Queen Hatshepsut of Thebes, Egypt who reigned from BC 1504 to 1482. Ancient wall paintings show baskets being used to transport trees that produced myrrh, a fragrant resin. Later Kubla Khan shipped exotic plants in pots back to China on the backs of elephants. In Athens, earthenware flower pots were thrown into the sea during the festival of the Gardens of Adonis. Many Roman and Etruscan paintings feature potted plants, including vessels supported atop pedestals. An ancient Chinese scholar and poet, Tao Qian (aka, Tao Yuanming) grew potted wild chrysanthemums. In the 1700s, pots were used to ship breadfruit seedlings from Tahiti to the West Indies. The HMS Bounty, which is best known for mutiny against the dictatorial Captain Bligh, sailed for Tahiti and the South Pacific to collect breadfruit trees and ship them in clay pots to the West Indies to start plantations producing cheap food to feed slaves.

Over time, many forms of elevated containers emerged. One particular form is the 17th-century Caisse de Versailles box, a square wooden container standing on legs. The sides were hinged so that the box could be opened for access to a liner which supported the plant. Other elevated planters include hanging baskets, which suspend from hooks on walls or ceilings. More recent additions to the elevated planter market include vessels mechanically fastened to posts or poles. The fasteners may comprise bolts, screws, clamps and the like. Today, hanging baskets adorn light posts as centerpieces of many downtown beautification projects.

Despite the incredibly long history and evolution of potted plants, until the present invention, planters have always been fixed structures. Whether hanging from a ceiling, clamped to a pole, set upon a pedestal or resting on a floor, heretofore planters have always been stationary structures. While such planters create an aesthetically pleasing appearance, they suffer several shortcomings.

One shortcoming is inflexibility. Typical planters cannot be easily adjusted, i.e., raised and/or lowered and rotated repeatedly, through a continuum of positions. Instead, they remain fixed at a certain elevation and angular orientation. Thus, watering an elevated planter and caring for the plant requires use of a ladder or other tools or removal of the planter and reinstallation after the task is completed. Evenly distributing sunlight entails removal and repositioning the planter. Prior art planters that are adjustable, require complex manual disassembly, removal of components, and reinstallation of the components at discrete installation points. Conventional suspended planters are typically difficult to reach and have limited angular adjustability, in 90 or 180-degree increments. Such tasks are time consuming, extremely laborious, inconvenient and fraught with risk. A safer, more versatile, easily adjustable planter system is needed.

Remarkably, over the millennia no known prior efforts have been devoted to raising and lowering planters. No prior apparatus had been devised to easily raise and lower plants over a continuum of positions.

Another shortcoming of conventional planters, particularly raised and suspended planters, is limited size and location. Planter size and location are limited to reduce installation and serviceability problems. Concomitantly, planter size and location are limited to accommodate available structural supports and mounting hardware. Thus, conventional planters are relegated to serving as minor decorative devices, rather than major ornamental and landscaping features unlimited in size and location. Yet another shortcoming of conventional planters, particularly ground planters, is the inability to showcase a colorful array of flowers above existing flora. While ground planters may be quite large and well suited to accommodate tall plants, they are not suitable for elevating small flowering plants.

Yet another shortcoming is lack of adjustable irrigation that can be configured to water a plant as well as surrounding terrain. Lacking a suitable irrigation system not only increases the maintenance requirements for elevated planters, but also compromises overall functionality. Irrigating from an elevated height would offer extended coverage of surrounding terrain, over fences, hedges, bushes and even small trees. This may reduce the total number of sprinkler heads needed on an irrigation line, which can also lead to a reduction in irrigation lines, valves, overall complexity and cost. Elevated sprinklers do not interfere with mowing. Elevated irrigation also enables attractive waterfall fountains and misting features, not otherwise available with conventional elevated planter systems. Misting at various times combined with irrigation allows ornamentals to flourish year around in warmer climate zones or even hot summers in milder climate areas where the expense of manual watering and misting prohibits initial consideration or continuation of such programs for businesses and municipalities and other end users.

Furthermore, businesses need ways to beautify commercial structures, such as buildings and signage, including billboards. Adorning commercial structures with foliage is one way to accomplish this objective. Opponents are less offended when commercial structures are beautified. Introducing more horticulture to their commercial environment by adding elevated planters would improve the aesthetics and help blend commercial structures into the surrounding landscape. However, such adornment is impractical where the added planters are not easily raised and lowered for maintenance and not self-irrigating.

Conventional suspended planters are usually restricted in size, height, and weight to avoid serviceability problems. Additionally, they are most often residentially restricted to suspension from existing structures relegating them to an incidental decoration, rather than a major landscaping feature that can be of any size, location and independent of a structural support system as a pole planter.

Conventional planters suspended on small poles installed by simple foot pressure are vulnerable to falling, even with the small planters featured. This shortcoming also relegates such planters to a subsidiary decorative device versus a major landscaping feature that can be a focal point.

Conventional ground planters are usually decorative at lower levels, which are easily within reach. They also can be of a large size and feature taller bushes, plants and trees starting in the first tiers of landscaping. However, they rarely are changed and cannot feature a large colorful array of different flowers at higher levels deeper into landscaping tiers.

Conventional planters suspended on ornamental street light poles present unique maintenance challenges. Pole-mounted banners and flags present similar maintenance problems. Such planters, banners and flags must be serviced by bucket trucks, which requires an expensive vehicle, consumes considerable labor and creates traffic and safety issues. Additionally, conventional suspended planters on ornamental street light poles and pole-mounted banners and flags must be serviced by bucket trucks during the early pre-traffic mornings, which is expensive and dangerous. Concomitantly, conventional non-ornamental poles used in streets and parking lots do not lend themselves well to wire basket aesthetics.

Conventional irrigation systems lack an aesthetically acceptable permanent high-rise sprinkler that is not immediately removed after each use. Sprinkling from a high point offers greater coverage advantage over fences, hedges, bushes and even small trees. This often reduces additional sprinkler heads needed on an irrigation line, which can also lead to a reduction in irrigation lines and valves. Ground level systems often pass over, or tear into the more delicate flowers and ornamental plants versus irrigating by "raining" down from above. There may even be some water savings in properly designed landscape and irrigation systems using the post-pole planter systems.

Conventional planters do not offer the additional flexibility of including waterfall features to be used in or around ponds, exterior or interior pools, or other landscaping choices on such fixed pole systems.

Architects require innovative decorative planters for exteriors, or interiors of buildings, such as lobbies of hotels, motels, condominiums and airports, etc., as well as exteriors around pools and patio areas. Conventional planters on a pillar are of marginal utility at best. A ceiling may be too high, unavailable or not architecturally suitable for suspending a conventional planter.

Many enterprises identify their business and advertise their goods and services using signage, which is indispensable to long-term viability and success. For some enterprises, a good portion of their business is derived from motorists spotting roadside signage or tall signs visible above treetops. Billboards are often drivers' primary way of finding out where food and fuel are available when driving on unfamiliar highways.

Unfortunately, many citizens, groups and government planners vigorously oppose proliferation and even maintaining billboards and large and elevated signage. Sign opponents complain that billboards cause too much clearing of trees, intrude on the surrounding landscape, and constitute a form of visual pollution. Some contend that signage in general contributes negatively to the mental climate of a culture by promoting products as providing feelings of completeness, wellness and popularity to motivate purchase. This opposition has led to strict sign and building codes.

Signage proponents counter that signs are indispensable for many businesses. They maintain that the presence of signs in rural areas is of value in reducing a driver boredom, which many believe is a positive contribution to highway safety. Proponents also observe that surveys of drivers and road users have shown that the lighting provided by billboards provide security and visibility to many motorists. Proponents maintain that larger signage, which is visible to motorists over greater distances, improves safety by allowing greater time to make necessary lane changes in ever increasing traffic flows.

The Small Business Administration (SBA) recognizes that many businesses, including the SBA's small business clients, depend upon advertising and identification. To protect their own loan portfolios while helping their clients' succeed, the SBA has trained field offices to join the fight against overly restrictive sign and building codes.

To temper the opposition, businesses need ways to beautify commercial structures, such as buildings and signage, including billboards. Adorning the commercial structures with foliage is one way to accomplish this objective. Opponents are less offended when commercial structures are beautified. Introducing more horticulture to their commercial environment improves the aesthetics, draws attention and helps blend commercial structures into the surrounding landscape. Adorned signage would appear smaller, allowing for larger signage.

While conventional horticulture at ground level through professional landscaping helps, more is needed to beautify commercial structures. Conventional planter containers and their accessory products are not adequately associated with the sign. Means for raising and lowering plants and means for irrigating plants to facilitate maintenance are not provided with existing commercial structures. The tension between opponents and the signage industry has stifled innovation where it is needed most.

Accordingly, a need exists for a planter system with an adjustable height planter featuring optional waterfalls, fountains, misting, removable and rotatable vessels, a plurality of hanging objects, and irrigation of the planter and/or surrounding terrain. Furthermore, a need exists for a system to which banners and flags may be coupled so that they may be conveniently raised and lowered. The invention is directed to overcoming one or more of the problems and solving one or more of the needs as set forth above.

SUMMARY OF THE INVENTION

To solve one or more of the problems set forth above, in an exemplary implementation of the invention, a variable controlled planter system allows for the raising, lowering, holding, locking and releasing of a planter on a vertical support structure. The planter assembly may include a carriage, to which one or more planters is attached. The carriage facilitates raising, lowering, holding, locking and releasing of planter assemblies. Guides such as cables, rollers, sliders, bristles, gaskets, carpet and registration pins maintain space between the vertical support and planter assembly and facilitate raising and lowering. A tether guided over a pulley may be retracted or extended by winding it around or unwinding it from a winch, cleat or windlass to causes the planter assembly to rise or descend. When raised to a locking height, the planter assembly causes a mechanical locking mechanism associated with the planter assembly to move into a locking position, securing the planter assembly to the vertical support. Further raising releases the locking mechanism. Optional irrigation supplies water to the planter assembly and/or surrounding terrain. The planter may be unitary or a plurality of assembled planter components or sections. Drain and cleanout ports facilitate draining and cleaning of the planter assembly. A planter assembly with a waterfall includes a reservoir section with overflow ports to drain water into a lower reservoir at the base of the vertical support, from which a pump supplies the water back to the reservoir section of the planter assembly. A plurality of conduits for electrical, data and plumbing extends through the vertical support as necessary.

Artificial or natural plants may be used. Of course, in an embodiment that uses artificial plants, irrigation for the planter may be omitted, deactivated, disabled or removed.

An exemplary adjustable height planter system according to principles of the invention includes an adjustable height planter assembly, a vertical support structure, raising and lowering means for controllably moving the planter assembly relative to the support structure along a continuum of heights, from a lowest position to a highest position, a tether assembly operably coupling the adjustable height planter assembly to the raising and lowering means and a pulley at a raised height. The tether assembly extends from the raising and lowering means over the pulley to the adjustable height planter assembly. The adjustable height planter assembly is suspended from the tether. The raising and lowering means is configured to move the planter assembly along a continuum of heights, from the lowest position to the highest position by controllably adjusting the tether assembly from which the planter assembly is suspended. The planter assembly includes a planter container configured to hold contents including, but not limited to, a plant in a medium such as natural plants in a growing medium or artificial plants in a holding medium. Such media are collectively referred to herein as a planting medium, which includes a growing medium that is suitable for plant growth and a holding medium that is suitable for supporting an artificial plant. Additionally, as used herein, plant refers to any and all types of plants, including but not limited to artificial and natural plants. The planter container has a top that is substantially uncovered and remains substantially uncovered throughout the entire range of motion, including at the highest position, allowing the contents to be exposed throughout the entire range of motion. The planter assembly further includes a drainage aperture positioned and sized to automatically release from the planter assembly liquid accumulated in the planter container while contents are held in the planter container. Such drainage apertures may be provided regardless of whether a contained plant is natural or artificial.

In some settings artificial plants are preferred over natural plants. For example, it has been suggested by some auto dealers that artificial plants keep flower petals and leaves off cars. The same could be said of indoor settings. Artificial plants do not drop leaves and flowers that may otherwise create a maintenance burden indoors and pose risks to pedestrians from slipping and falling.

In one aspect of an embodiment of the invention, a plurality of guides are disposed between the vertical support structure and the planter assembly. The plurality of guides maintain a space between the vertical support structure and the planter assembly, protecting the vertical support structure from marring when the planter assembly moves relative to the vertical support structure, and facilitating movement of the planter assembly relative to the vertical support structure. The guides may comprise a plurality of supporting tether assemblies, rollers, slides, resilient material, brushes, bristles, gaskets, a registration male pin and a corresponding female receptacle.

In another aspect of an embodiment of the invention, the adjustable height planter system further includes a locking assembly apart from the raising and lowering means. The locking assembly releasably secures and holds the weight of the planter assembly at a locking height. The locking assembly includes a first locking mechanism associated with the planter assembly and a corresponding engageable locking mechanism associated with the support structure at the locking height. Upon moving the planter assembly to the locking height, the first locking mechanism engages and thereby locks with the engageable locking mechanism, preventing the planter assembly from moving below the locking height. Upon unlocking, the locking assembly allows the planter assembly to move relative to the support structure along a continuum of heights, from the highest position to the lowest position. The first locking mechanism associated with the planter assembly may include a mechanism movable relative to the planter assembly. The engageable locking mechanism associated with the support structure may include a mechanism stationary relative to the support structure. Alternatively, the first locking mechanism associated with the planter assembly may include a mechanism stationary relative to the planter assembly. The engageable locking mechanism associated with the support structure may include a mechanism movable relative to the support structure. As an example, the first locking mechanism associated with the planter assembly may include a pivoting hook. The engageable locking mechanism associated with the support structure may include a slot for receiving a portion of the pivoting hook when moved into a locking position.

In another aspect of an embodiment of the invention, the planter assembly includes a carriage movable relative to the vertical support and a planter supported by the carriage. The carriage includes a carriage body to which an accessory may be attached. By way of example and not limitation, the accessory may be a flag or banner. The carriage may also include a flange with a plurality of slots. The planter may have a plurality of hooks configured to engage the slots. The vertical support may include a collar to which a pulley is rotatably attached.

In another aspect of an embodiment of the invention, the means for controllably adjusting the height of the planter assembly relative to the vertical support structure includes at least one pulley defining the highest position. The pulley guides the tether. A winch is operably coupled to the tether. The winch is adapted to retract and extend the tether. The winch may be contained within the vertical support, or on the vertical support perimeter, or external and removable.

In another aspect of an embodiment of the invention, the system includes an irrigation unit attached to the vertical support. The irrigation unit has an outlet at about the highest position. A solenoid valve controls the supply of water to the irrigation unit. The irrigation unit automatically supplies water to the planter assembly in the highest position. The irrigation unit may also supply water to surrounding terrain. The irrigation unit may supply misting. The irrigation unit may comprise a water fountain. The irrigation unit may comprise a waterfall, supplying water beyond the peripheral edge of the planter, which falls into a reservoir at the base of the vertical support where a pump resupplies the water to the irrigation unit.

In another aspect of an embodiment of the invention, the planter container has a plurality of removable, replaceable and rotatable planter vessels. The planter vessels enable segregation of plants, use of a variety of growing media for each plant, independent removal and replacement of plants, controlled growth limitation of more invasive species. The planter container supports the planter vessels in spaced apart relation. Insulation material may be provided in spaces between the planter vessels for temperature control and water preservation.

In another aspect of an embodiment of the invention, the planter system includes an adjustable height planter assembly, a raceway having a top end and a bottom end, raising and lowering means for controllably moving the planter assembly relative to the support structure along a continuum of heights, from a lowest position to a highest position, a tether assembly operably coupling the adjustable height planter assembly to the raising and lowering means, and a pulley in the raceway structure. The tether assembly extends, within the raceway, from the raising and lowering means over the pulley to the adjustable height planter assembly. The adjustable height planter assembly is suspended from the tether. The raising and lowering means is configured to move the planter assembly along a continuum of heights, from a lowest position to a highest position by controllably adjusting the tether assembly from which the planter assembly is suspended. The planter assembly includes a planter container configured to hold contents including a plant in a planting medium. The planter container has a top that is substantially uncovered and remains substantially uncovered throughout the entire range of motion, including at the highest position, allowing the contents to be exposed to light and supplied water throughout the entire range of motion. The planter assembly includes a drainage aperture. The drainage aperture is positioned and sized to automatically release from the planter assembly liquid accumulated in the planter container while contents are held in the planter container. The planter system utilizes a guiding means, such as pulleys and tethers and/or a male pin guide in the raceway assembly corresponding with a female receiving aperture guide in the planter assembly. A locking assembly means is provided apart from the raising and lowering means. The locking assembly is configured to releasably secure and hold the weight of the planter assembly at a locking height. The locking assembly includes a locking assembly at the locking height associated with the planter assembly and a corresponding locking assembly associated with the raceway assembly. Upon locking, the locking assembly prevents the planter assembly from moving below the locking height and. Upon unlocking, the locking assembly allows the planter assembly to move relative to the support structure along a continuum of heights, from the highest position to the lowest position.

In another aspect of an embodiment of the invention, the system further includes a sign attached to the vertical support.

In another aspect of an embodiment of the invention, the vertical support includes a flag pole.

In another aspect of an embodiment of the invention, the vertical support comprises a building structure or a generally planar support surface.

Various alternative raising and lowering means may comprise a tether and pulley, a winch, a windlass, a block and tackle, a compression spring, an extension spring, a rack and pinion, a hydraulic cylinder, a lead screw assembly, beveled gears, worm gears and a ballast.

BRIEF DESCRIPTION OF THE DRAWINGS

The foregoing and other aspects, objects, features and advantages of the invention will become better understood with reference to the following description, appended claims, and accompanying drawings, where:

FIG. 2 provides a perspective view of an exemplary planter system with removable pots in a planter in a fully elevated position in accordance with principles of the invention; and FIG. 3 provides a perspective view of an exemplary planter system with a multi-section planter in a fully elevated position in accordance with principles of the invention; FIG. 7 provides a side view of an exemplary carriage assembly and support pole according to principles of the invention; and FIG. 8 provides a side view of an exemplary collar assembly and support pole according to principles of the invention; and FIG. 9 provides a perspective view of a drip plate according to principles of the invention; and FIG. 10 provides a perspective view of an exemplary carriage collar assembly (i.e., collar assembly) according to principles of the invention; and FIG. 11 provides a perspective view of an exemplary carriage assembly according to principles of the invention; FIG. 15 provides a perspective view of an exemplary carriage assembly according to principles of the invention; and FIG. 16 provides a top view of an exemplary carriage assembly with a roller guide according to principles of the invention; and FIG. 17 provides a bottom view of an exemplary carriage assembly with a gasket guide according to principles of the invention; and FIG. 18 provides a bottom view of another exemplary carriage assembly, conceptually illustrating various guides, according to principles of the invention; FIG. 55 provides a perspective view of an exemplary Deering for attaching cable to a raceway planter assembly according to principles of the invention; and FIG. 56 provides a perspective view of an exemplary raceway planter container for a planter assembly according to principles of the invention; and FIG. 57 provides a perspective view of an exemplary male and female registration guide assembly according to principles of the invention; and FIG. 58 provides a perspective view of an exemplary roller assembly for a raceway planter system according to principles of the invention; FIG. 60 provides a perspective view of an exemplary back panel for a raceway planter system according to principles of the invention; and FIG. 61 provides another perspective view of an exemplary back panel for a raceway planter system according to principles of the invention; FIG. 84 provides a front view illustrating a planter assembly with a plurality of planter baskets and a banner assembly according to principles of the invention; and FIG. 85 provides a side view illustrating a planter assembly with a plurality of planter baskets and a banner assembly according to principles of the invention; FIG. 90 provides a front view of a veneered planter assembly according to principles of the invention; and FIG. 91 provides a front view of a veneered planter assembly according to principles of the invention; and FIG. 92 provides a front view of a veneered planter assembly according to principles of the invention; FIG. 95 provides a side view of components of an external mobile drill or crank-powered mechanical winch assembly for a planter assembly according to principles of the invention; and FIG. 96 provides a perspective view of an external mobile drill or crank-powered mechanical winch assembly partially concealed by a base for a planter assembly according to principles of the invention; and FIG. 97 provides a wireframe view of an external mobile drill or crank-powered mechanical winch assembly for a planter assembly according to principles of the invention; FIG. 102 provides a front view of an elliptical bundt style planter assembly with a sign according to principles of the invention; and FIG. 103 provides a side view of an elliptical bundt style planter assembly with a sign according to principles of the invention; and FIG. 104 provides a front view of a raceway planter assembly with an LED digital sign according to principles of the invention; and FIG. 105 provides a side view of a two single faced raceway planter assembly with an LED digital sign according to principles of the invention; and FIG. 106 provides a front view of a raceway wall mounted planter assembly with a monument sign according to principles of the invention; and FIG. 107 provides a side view of a two single faced raceway wall mounted planter assembly with a monument sign according to principles of the invention; and FIG. 108 provides a front view of a round bundt style planter assembly with a sign according to principles of the invention; and FIG. 109 provides a side view of a round bundt style planter assembly with a sign according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes, ornamental aspects or proportions shown in the figures.

DETAILED DESCRIPTION

With reference to the Figures and the description provided below, exemplary variable controlled planter systems allowing for the raising, lowering, holding, locking and releasing of a planter on a vertical support structure are provided. In one embodiment, at least one pulley defines the highest position. A tether guided by the pulley is directly or indirectly coupled to a winch, cleat or windlass at one end. At the opposite end, the tether is directly or indirectly coupled to a planter assembly. The planter assembly may include a carriage, to which one or more planters is attached. The carriage facilitates raising, lowering, holding, locking and releasing of planter assemblies. The tether may be retracted by winding it around the winch, cleat or windlass and extended by unwinding it from the winch, cleat or windlass, or other means. Retracting the tether causes the planter assembly to rise. Extending the tether lowers the planter assembly. The winch may include a control, such as a handle or crank or electrical or electromechanical controller, accessible from outside the support structure, remote or associated with the support structure.

When raised to a locking height, the planter assembly causes a mechanical locking mechanism associated with the planter assembly to move into a locking position. In the locking position, the lock secures the planter assembly to the vertical support. In this configuration, the lock assembly supports the entire weight of the planter assembly. When raised higher (i.e., above the locking position) to an unlocking height, the lock assembly is moved to an unlocked position, which allows the planter assembly to be lowered.

The planter assembly includes a planter container configured to hold contents including, but not limited to, a plant in a medium, such as a natural plant in a growing medium or an artificial plant in a holding medium. Such media are collectively referred to herein as a planting medium. Thus, a planting medium encompasses both a growing medium that is suitable for natural plant growth and a holding medium that is suitable for supporting an artificial plant. Additionally, as used herein, plant refers to any and all types of plants, including, but not limited to, artificial and natural plants.

Figure 1:
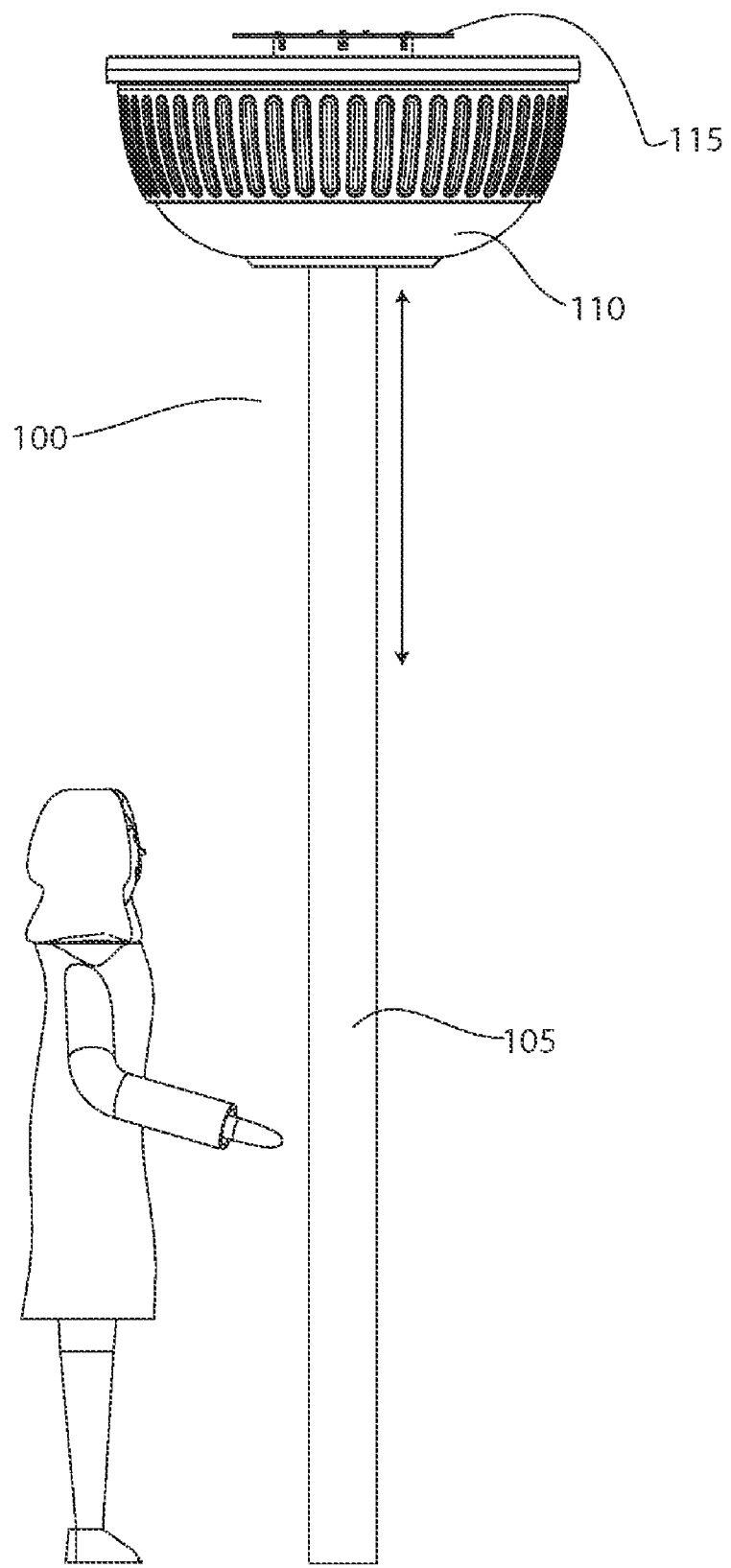
FIG. 1 provides a profile view of an exemplary planter system with a planter in a fully elevated position in accordance with principles of the invention.

Referring now to the Figures, in which like parts are indicated with the same reference numerals, various views of exemplary planter systems and components thereof according to principles of the invention are shown. With reference to FIG. 1, a pole structure 105 serves as a vertical support for an exemplary planter system 100. The pole 105 is preferably hollow to provide space, internally, for containing various components of the system. In other embodiments, a wall or plurality of poles or the like may serve as the vertical support. The vertical support 105 defines a range of travel for the supported planter assembly 110. The vertical support 105 also provides a structure for supporting and/or containing components of the system 100. While FIG. 1 shows a schematic of a woman standing next to the pole 105, the dimensions of the pole 105 are not limited in any way to those relative dimensions illustrated in the drawing. The pole 105 may be comprised of any material capable of providing the requisite structural support, including, but not limited to, wood, plastics, metals, alloys and composites. The pole may be a unitary structure or a structure comprised of a plurality of sections coupled together. The vertical support may be a pole having a circular or non-circular cross section and may have a consistent uniform diameter along its length or have a varying (e.g., tapering) diameter, and may be fluted or non-fluted. The poles, or background structure can be embedded in the ground, or in a concrete base, or anchor bolted to a concrete in ground base system or mounted in any other suitable fashion. A vertical support other than a pole may be utilized without departing from the scope of the invention.

A drip plate 115 is shown above the planter assembly 110 for distributing water to plants in the planter assembly. As discussed in more detail below, in a particular embodiment the system may be configured to irrigate the surrounding terrain and/or plants in the planter assembly 110. Plumbing (e.g., pipes) running within the pole supplies water from a source (e.g., a garden hose or utility connection) to one or more water emission devices, such as the drip plate 115 or a sprinkler. The drip plate 115 channels and moderates water supplied from the plumbing to the planter assembly. It also can be used to fasten irrigation tubes distributed from the interior water source to drip or drain into the planter containers 120. Additionally, it distributes natural rain water to the containers and prevents rain entering the structural pole system. Drip plates are not universally used on all types of systems as other alternatives are available.

The planter assembly includes a planter 110. The planter 110 is an open top receptacle for holding plants. The planter 110 may be a unitary structure or a structure comprised of a plurality of components. The planter 110 may define one or more compartments for storing plants. So long as the planter is compatible for use with a planter system according to principles of the invention, the planter is not limited to any particular size, configuration, material or shape, nor is it limited to any types of plants whether natural or artificial.

As shown in FIG. 2, an exemplary planter 110 includes a top lid 125 with apertures to receive a plurality of removable plant pots 120 referred to as mini-pots. Each removable pot 120 defines a compartment for planting. This embodiment offers many unique advantages. It facilitates removal and replacement of potted plants held by the planter 110. This embodiment also reduces water consumption by using less soil or growing media, which also reduces the weight. Additionally, this embodiment facilitates maintaining the temperature of potted plants, as a compartment beneath the lid 125 may be filled with an insulating material in the spaces between the plant pots 120.

Referring now to FIG. 3, an embodiment of a planter 110 with a plurality of compartments 122 defined by one or more partitions 124 is shown. This embodiment allows segregating plant sections. The planter 110 may be a unitary structure or separable into a plurality of attachable planter sections as discussed more fully below. The sections can also include a removable mini-pot shaped to match the sections for insertion.

Figure 4:
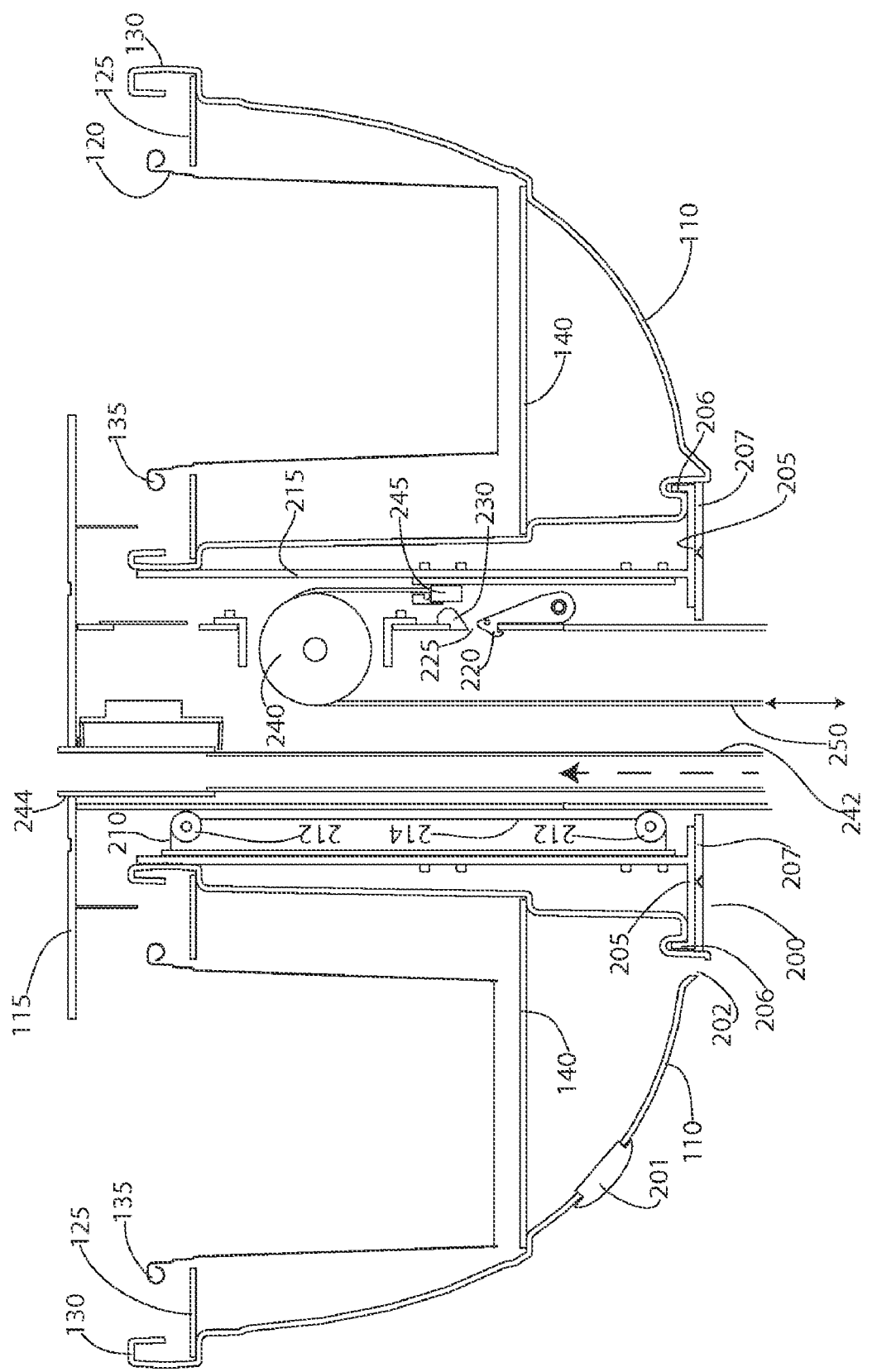
FIG. 4 provides a side cut-away view of an exemplary planter assembly, with drains, cleanout plugs, a carriage assembly and a carriage collar, with pulleys, rollers, irrigation pipe, electrical conduit, and catch-hook-release mechanism according to principles of the invention.

Now referring to FIG. 4, a section view of an exemplary planter assembly is provided. The planter 110 contains several plant pots 120 also referred to as min-i-pots, each having a lip 135 that extends above the lid 125. A support base 140 may be provided to support the weight of the plant pots 120. Additional insulation can be included between the min-i-pots as necessary for varying climates to conserve water and protect against extreme weather conditions.

Figure 42:
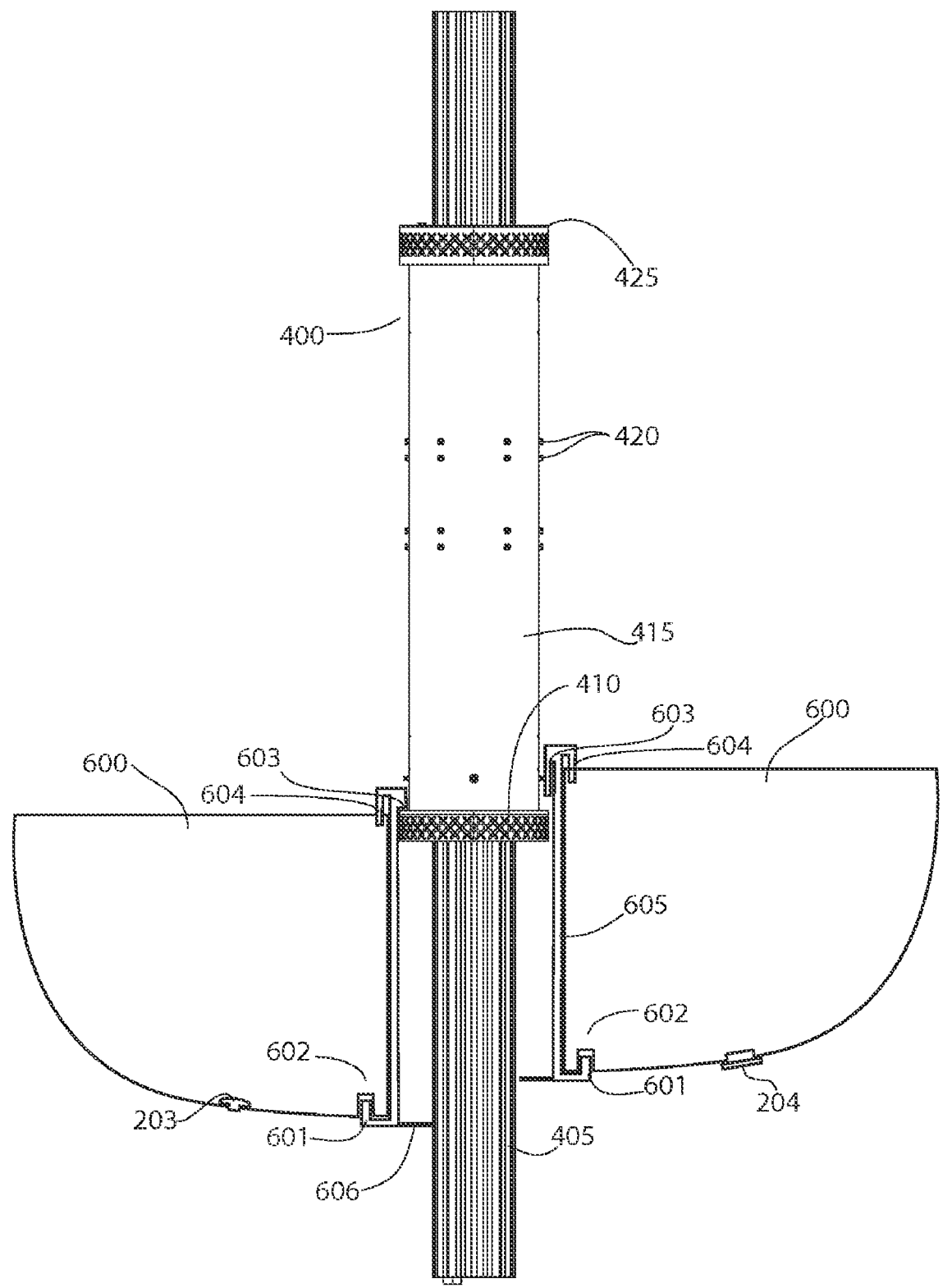
FIG. 42 provides a side view with a section view of a multi-section bottom planter assembly partially attached to a carriage assembly according to principles of the invention.
Figure 43:
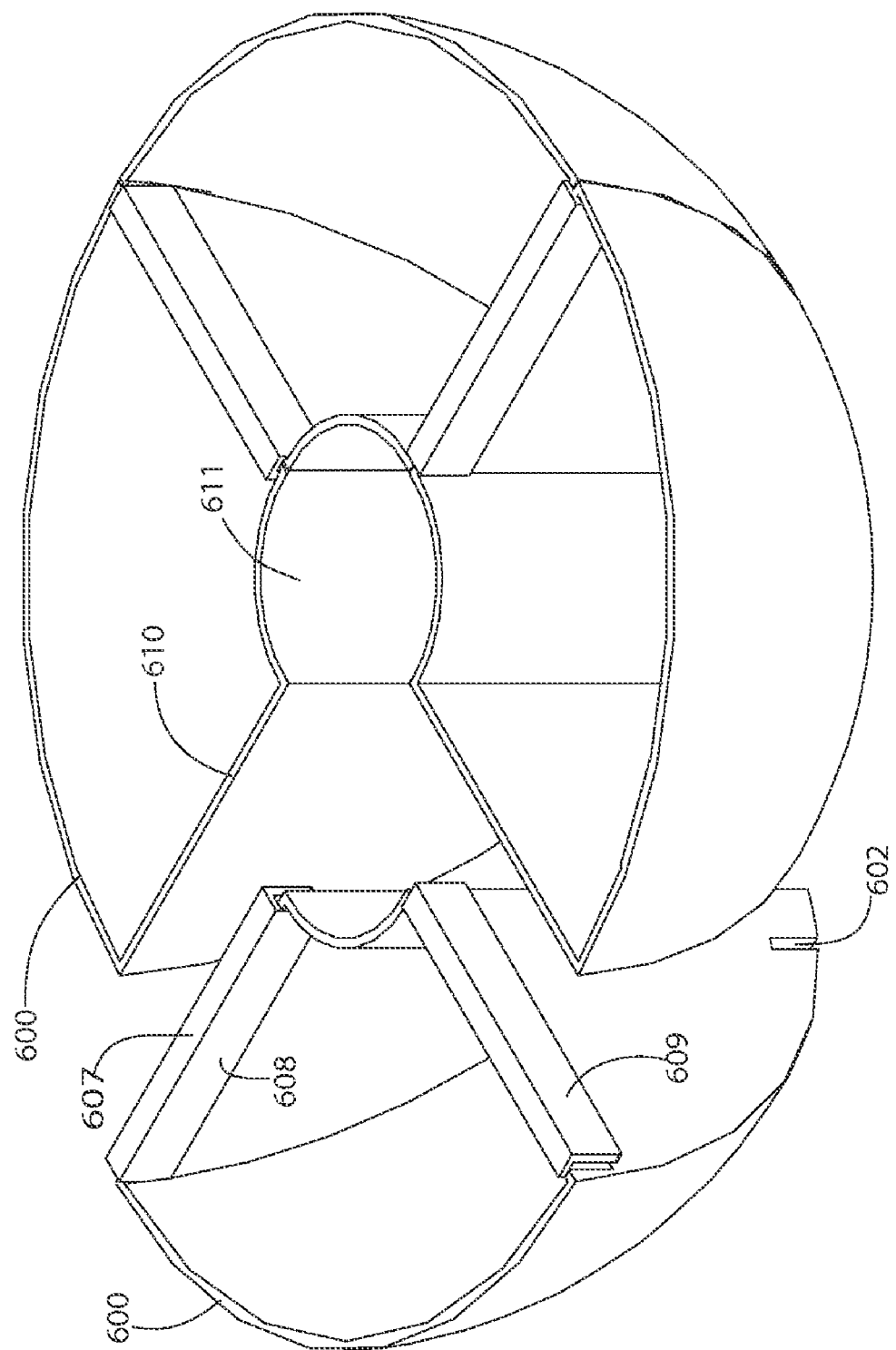
FIG. 43 provides a perspective view of a multi-section planter assembly according to principles of the invention.

The plant pots 120 and base 140 each include at least one drainage aperture. Thus, excess water may drain from a pot 120 through the base 140 and out of a drainage aperture 202 provided in the planter 110. A variety of drainage apertures can be utilized including 203 per FIG. 42, which allows the water to exit in a stream away from the pole 105. In this embodiment, a flanged or rolled lip 130 defines the top edge of the planter and enhances its rigidity.

A removable clean-out plug 201 is provided towards the bottom of the planter 110 to allow access to the interior compartment of the planter 110 through a corresponding clean-out port for purposes of cleaning out any debris from the planter 110. A hose may be inserted through the port to wash out the compartment. Such cleaning may be performed while the planter is elevated or lowered and while the planter contains plants, without disturbing the contained plants. Such cleaning is important for reducing the buildup of bacteria, mold, and other potentially hazardous substances and organisms. Conventional plugs can be used that either threadedly screw or pressure snap into place.

A carriage 200 supports the planter 110. The carriage includes a bottom 205 and a flange 206 which is received in a corresponding recess formed in the bottom of the planter 110. Other structures for securing the planter 110 to the carriage may be utilized without departing from the scope of the invention.

The carriage also includes guides to maintain a space between the pole and carriage and facilitate translation (i.e., movement) of the carriage 200 and supported planter 110 relative to the pole. In the exemplary embodiments shown in FIGS. 4 and 5, the guides comprise rollers 212 attached to a roller plate 214, which is a cutaway of one flange of the channel 210 also shown in FIGS. 15 and 16 *s* that is attached to the body of the carriage 200. The rollers 212 may optionally be spring based against the pole, thus allowing more controlled use with non finished larger tapered poles. The rollers are axle mounted between the two flanges 214 of the channel 210. Finished poles would normally not use rollers except when they can be very resilient, shaped to the pole, or wider to prevent marring. In most instances the rollers are not meant to ride the vertical structure throughout the raising and lowering movements, but to act as a soft non marring bumper guide. Other types of guides may be used to protect finished surfaces, such as resilient spacers, bristles, carpet, sliding pads and the like, in lieu of rollers. Many of these can be mounted in the same channel as 210. These guides also work with tapered, fluted and textured poles.

Figure 5:
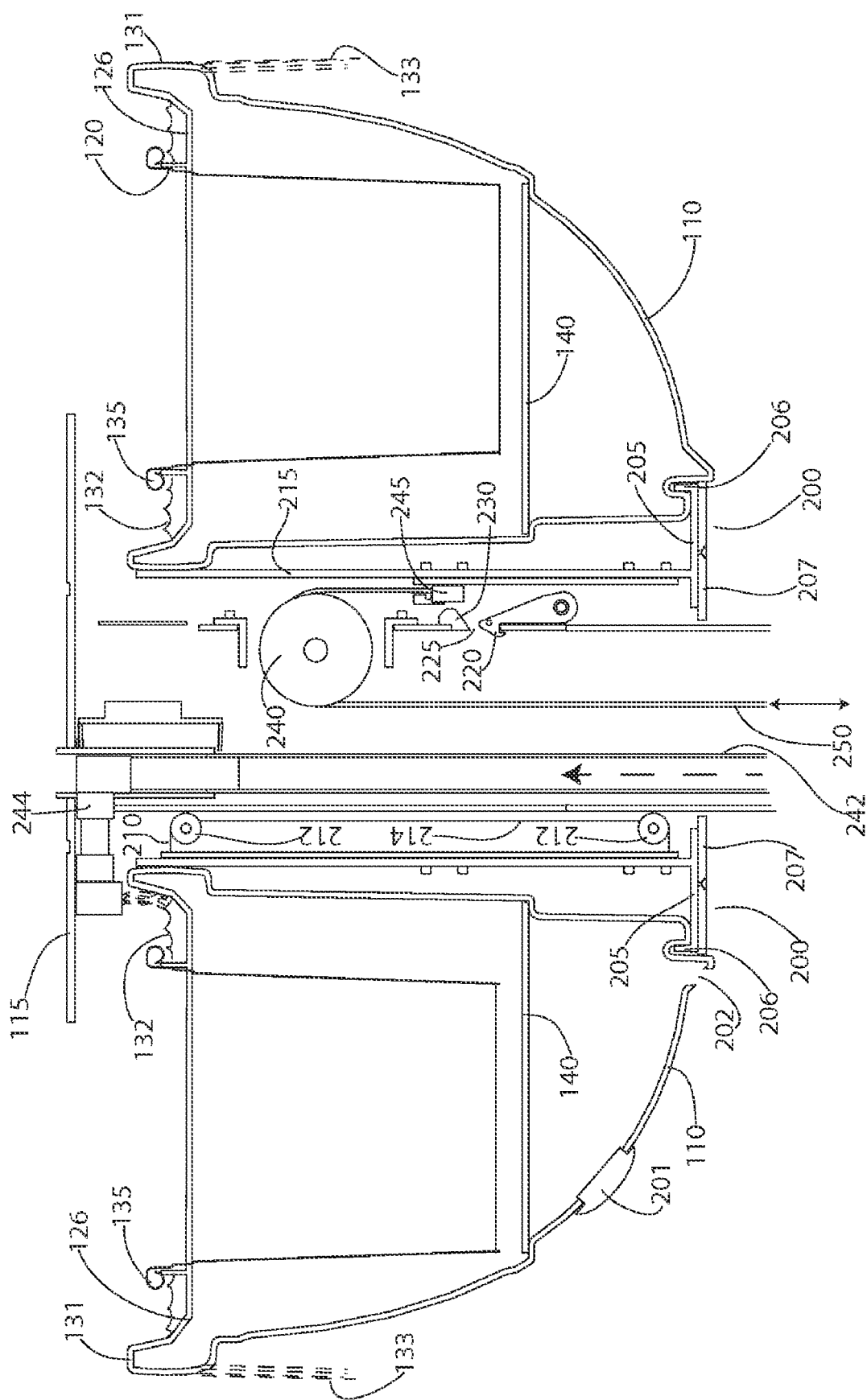
FIG. 5 provides a side cut-away view of an exemplary planter assembly with drains, cleanout plugs, waterfall features, a carriage assembly and a carriage collar, with pulleys, rollers, irrigation pipe, electrical conduit, and catch-hook-release mechanism according to principles of the invention.

In the exemplary embodiments shown in FIGS. 4 and 5, a resilient gasket 207 is provided at the bottom of the carriage. The gasket 207 comprises a resilient elastomer that will not mar the pole and can withstand repeated outdoor use. The gasket 207 extends from the carriage body 200 to the pole 105. The gasket 207 acts like a squeegee, blocking unwanted debris from fouling the mechanical components of the carriage 200. The gasket 207 also serves as a spacer or guide. In some embodiments, the gasket 207 may be used in lieu of or in addition to other guides, such as rollers 212.

One or more pulleys 240 and lanyards 250 are provided to enable raising and lowering the carriage 200. One end of a lanyard 250 is routed over a corresponding pulley 240 and attached to the carriage 200 using a mechanical fastener 245. The pulley 240 is rotatably attached to a collar assembly 222 shown in FIGS. 7-12, which is attached to the pole 110. As yet another type of guide, lanyard cables 250 which connect to the planter assembly may be utilized to maintain spacing between the vertical support 105 and planter assembly 110.

A mechanical locking mechanism responds to vertical linear motion of the planter assembly. In the exemplary embodiment shown in FIGS. 4 and 5, the mechanism comprises a catch-hook 220 pivotally mounted to the carriage 200. The hook system is designed to not touch the pole throughout the raising and lowering function until actuated into the locking position. Optionally, as a safety measure on various systems the tip of the hook 220 may be fitted with a roller or a low friction material (e.g., a polytetrafluoroethylene pad) to facilitate ascending and descending movement and prevent accidentally scratching the finish on the pole 110. A pusher bracket 235 in FIG. 10 (discussed below) positioned below the slot 225 in the collar assembly 222 in FIG. 10 (also discussed below), urges the catch hook 220 toward the slot 225 (i.e., into a "locking position") when the planter assembly is raised from a position below the pusher bracket to a position above the pusher bracket. The tip of the catch hook 220 then falls into and engages the slot 225 in FIGS. 4 and 5. An angled release bracket 230 above the slot 225 urges the catch hook 220 away from the slot 225 (i.e., into an "unlocked position") when the planter assembly is raised above the slot 225. In the unlocked position the planter assembly may then be lowered past the slot 225 without the hook 220 catching the slot 225. Various compatible mechanical locking mechanisms that are responsive to vertical linear movement of the planter assembly are described below and others shown in FIGS. 64-71.

An advantage of certain embodiments of the invention is rotatability. The planters of the embodiments shown in FIGS. 1 through 5, for example, can be conveniently rotated without removal of the planter from the carriage and without any disassembly. Rotation allows positioning and repositioning of plants for aesthetic reasons, to manage exposure to sunlight and to facilitate maintenance. Additionally, in embodiments with optional mini-pots (i.e., smaller planter pots held by the planter), such as, for example, the embodiment shown in FIG. 19, the mini-pots may also be rotatable, without removal and without any disassembly. Thus, each mini-pot may revolve around its own central axis and rotate around the planter central axis.

One or more irrigation pipes and/or electrical conduits may extend through the pole 110 and collar assembly 222. In the exemplary embodiment shown in FIGS. 4 and 5, an irrigation pipe 242 supplies water to an outlet 244. A sprinkler head or other water distribution device as for a fountain or misting may be coupled to an outlet.

Figure 6:
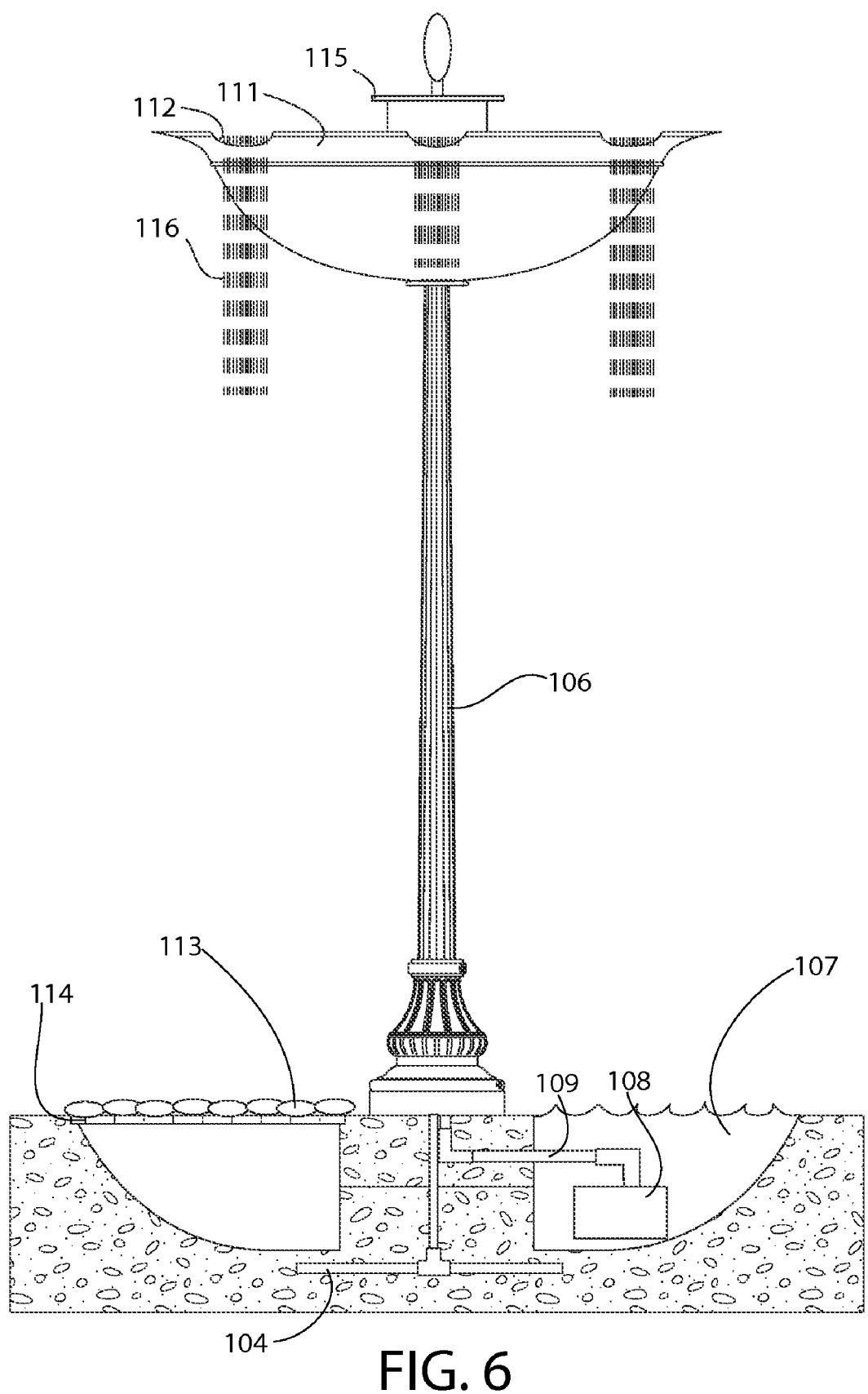
FIG. 6 provides a profile view of an exemplary planter system with a planter with waterfall features in a fully elevated position in accordance with principles of the invention.

The embodiments shown in FIGS. 5 and 6 include waterfall features. Pumped water is emitted from a down spout attached to the outlet 244. The water floods over a planter top 132 acting as a spillway defined by an integral lid 126 of the planter 110, to the outer edge of the planter through an exit opening provided by a lowered edge 112 of the planter rim 131 down into the reservoir 107 below without flooding the plant pots 120. The rim 135 of each plant pot 120 extends above the maximum height of the planter spillway 132. Alternative slots, apertures or other outlet features at the edge 131 of the planter 110 also define spillway outlets 112, as shown in FIG. 6. The ground reservoir 107 may be exposed or covered. In the case of a covered reservoir 107 a receptacle may be provided below ground level underneath a porous superstructure. The porous superstructure may comprise decorative materials such as rocks 113 on top of a supporting screen 114. Water flows between the rocks 113 through the screen 114 into the reservoir 107 below. A pump 108 and plumbing 109 re-supply water from the reservoir 107 through the pole 106 to the planter 111. Plumbing 104 for fresh water for irrigation and/or periodic refilling of the reservoir 107 may optionally be provided and, or an automatic refill valve utilized. An alternative system may extend the water source conduit 244 in multiple lines to the outside edge directly over 112, bypassing the spillway 126, planter containers 120 and planter 110. Alternative methods for installation of irrigation and electrical conduits can be used on all bases by first installing a sweep with a larger diameter than a flexible line inserted through it.

Referring now to FIGS. 8, 10 and 12 through 14, various views of an optional collar assembly 222 and components thereof are conceptually illustrated. The collar assembly 222 is mounted to a vertical support such as a pole 105, typically at or towards the top of the pole 105, using mechanical attachments such as attachment tabs 275. Alternative tenons can be used as in FIG. 73, which work well in tapered poles. The collar assembly 222 contains components and includes features that functionally cooperate with the carriage 200. Among the components in the exemplary embodiment shown in the figures are pulleys 240 for guiding lanyards, and guide brackets 285 for mounting and guiding components such as water and/or electrical supply lines or conduit. An access panel is provided 290 for installation, set-up and maintenance. Additionally, guide bars 255 align the guide channels 210 into the collar to also guide and closely register the locking system.

Figure 13:
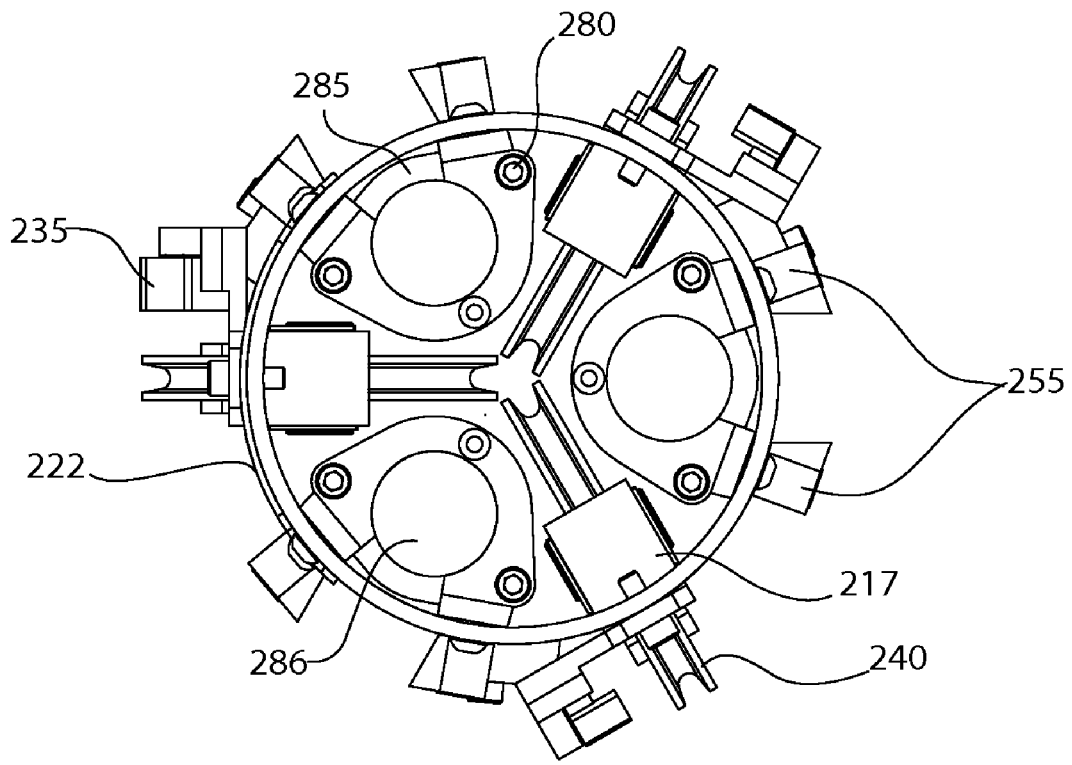
FIG. 13 provides a top view of an exemplary carriage collar assembly according to principles of the invention.
Figure 14:
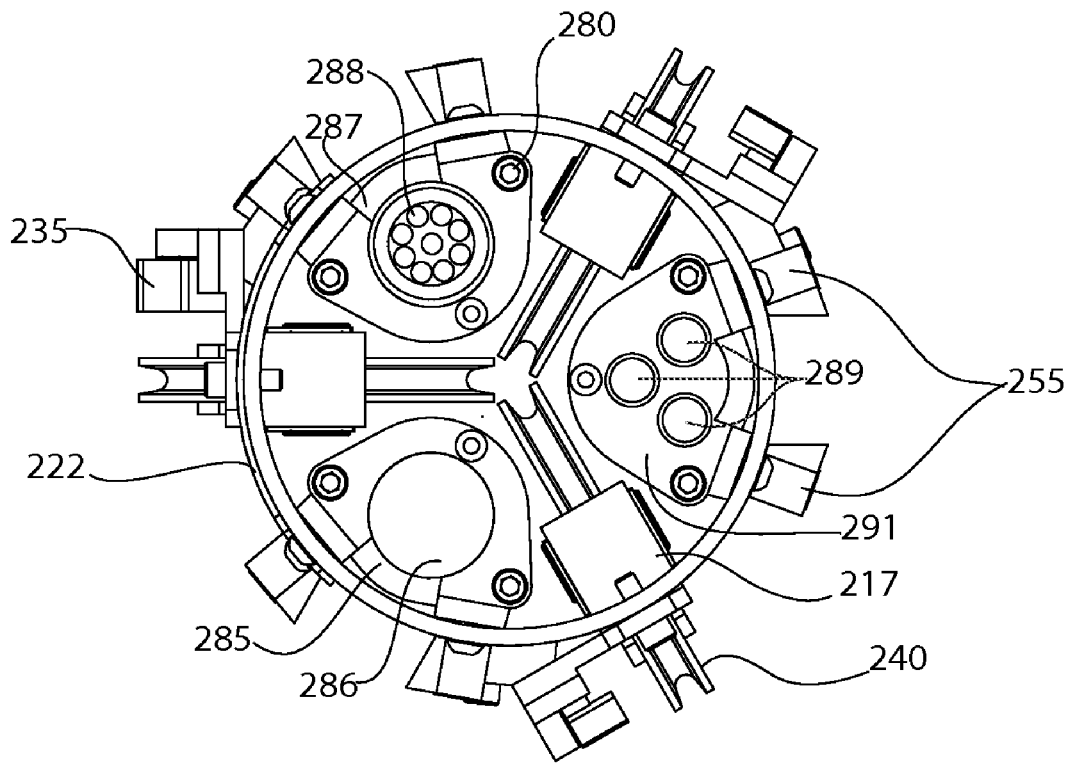
FIG. 14 provides a top view of an exemplary carriage collar assembly with conduit options according to principles of the invention, with various conduit arrangements.

As shown in the top views of FIGS. 13 and 14, conduits 286, 288, 289 for electrical wiring and/or irrigation extend through corresponding brackets 285 at the top of the pole 105. The brackets 285 position, guide and stabilize the conduits 286, 288, 289. Some conduits 286 may contain other conduits 288. The particular number, size, configuration and arrangement of conduits may vary without departing from the scope of the invention. Most of the multi-faceted products would only uses one separate conduit for both the irrigation and electrical as required. A separate conduit line for data may be required when used on signage with digital systems as well as for the Identification sign. Signage systems require much larger engineered support structures that can easily accommodate the necessary conduits. Conduits may also be included in the pole when and if extruded with a plurality of fittings used for the various connections.

Figure 12:
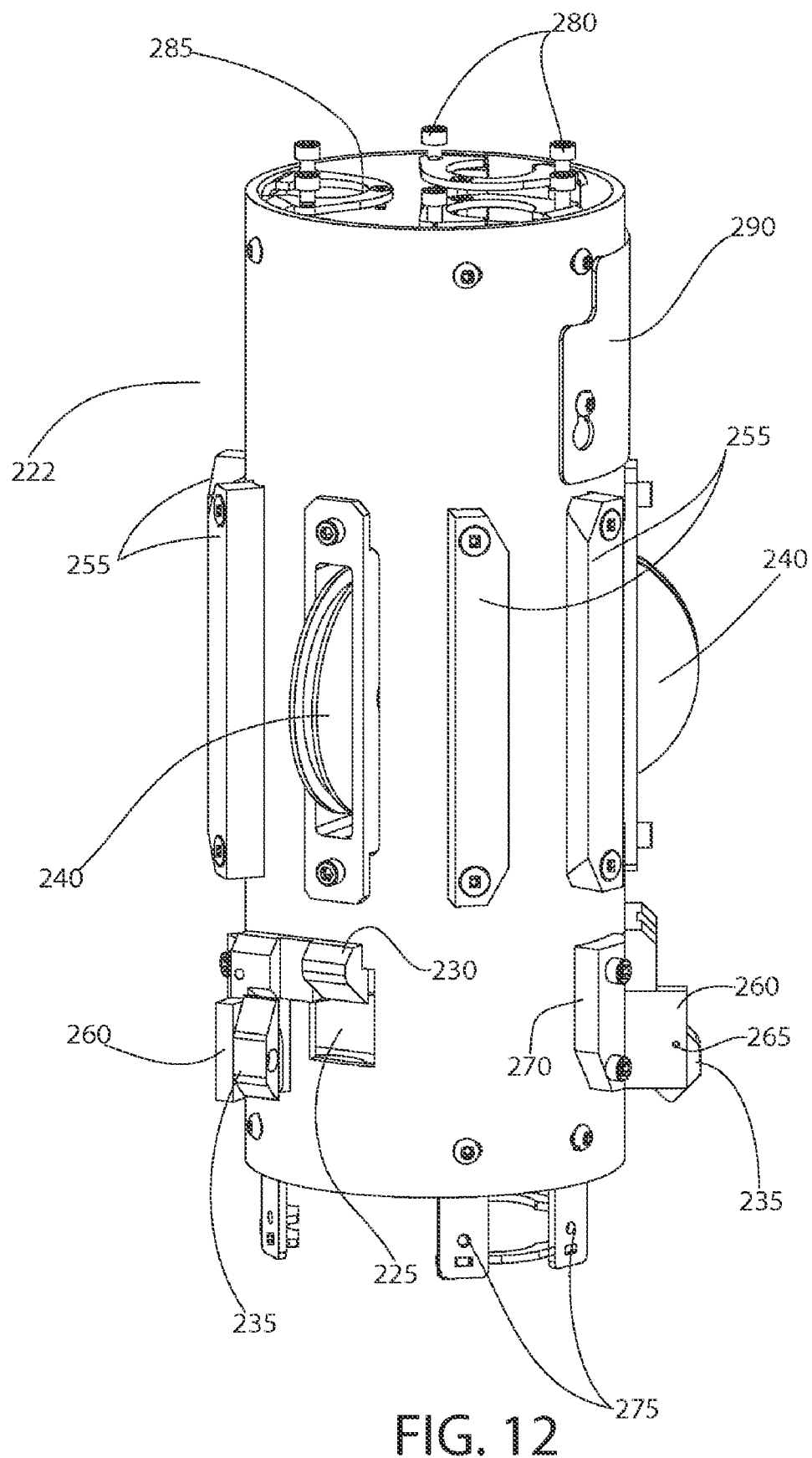
FIG. 12 provides a perspective view of exemplary carriage collar assembly according to principles of the invention.

A locking assembly 260 is also provided per FIGS. 12, 8 and 10. The locking assembly includes components that cause a corresponding locking component on the carriage to respond to vertical motion of the carriage 200 relative to the collar assembly 222. In the embodiment shown in FIG. 12, the collar-mounted locking components include a pusher bracket 235 for urging each catch hook pivotally mounted to the carriage 200 into a slot 225. The pusher bracket is pivotally mounted with a pivot pin 265 to a base 270 of the locking mechanism 260 on the carriages inside. A release bracket 230 on the collar urges each catch hook out of the slot 225 when the tip of the hook is raised past the release bracket 230.

Roller channel guide bars 255 on the collar align corresponding guide features, such as roller or pad assembly channels 210 on the carriage assembly 200, to ensure proper alignment of the locking mechanism. Rollers, or pad channel guide assemblies 210, or as shown by 470 in FIG. 29 on the carriage 200 travel between the guide bars 255.

A dust or debris shield or a drip plate 115 may be attachable to the top of the collar assembly 222, such as by using mechanical attachment hardware 280. The drip plate or other top structure may be adapted to mate with another component attached above it. For example, the drip plate may be equipped to attach a light assembly above the drip plate 115 as per FIGS. 72 and 73. The drip plate also provides support and fastening of various alternative irrigation and water distribution devices.

Referring now to FIGS. 7, 11 and 15-18, various views of a carriage assembly 200 and components thereof are conceptually illustrated. A plurality of guides, such as channel 210 mounted with rollers 212 spaced around the interior of the carriage 200, keep the carriage 200 from scraping against and scratching the pole 105 and facilitate smooth reduced friction travel of the carriage 200 as it is drawn up and down the pole 105. The roller assemblies channel 210 with mounting flange 214 attaches to the interior surface of the carriage body 215 using mounting hardware such as screws 216.

Other guides may include guide pad assemblies 218. Guide pad assemblies may be used in addition to or in lieu of rollers. The guide pad assemblies comprise a non-scratching material suitable for maintaining a substantially even space between the interior of the carriage 200 and the collar 222. They can be interchanged and mounted inside the same channel 210 with the flanges 214 as the roller guide assemblies.

Another guide comprises a resilient carpet 213 or resilient brush-like bristles 211 provided at the bottom of (or along the interior of) the carriage, as shown in FIG. 18. Alternatively, a gasket 207 in FIGS. 17, 4 and 5 comprises a resilient elastomer with a plurality of flexible fingers 209 that will not mar the pole and can withstand repeated outdoor use. The fingers 209 extend from inside the carriage body 215 to the pole 105. The fingers 209 act like a squeegee, blocking unwanted debris from fouling the mechanical components of the carriage 200. The fingers 209 also serve as a spacers or guides. In some embodiments, the gasket 207 with the fingers 209 in FIG. 17 or the gasket alternatives in FIG. 18 may be used in lieu of other guides, such as rollers 212, or pads 218 in the channel 210. As yet another type of guide, lanyard cables 250 which connect to the planter assembly may be utilized to maintain spacing between the vertical support 105 and planter assembly 110. The lanyard cables or tethers going over grooved pulleys also serve as an alignment guide for the entire carriage assembly.

Catch-hooks 220 allow for locking the carriage 200 to the collar 222 when the carriage 200 is raised into a locking position. As discussed below, catch hooks 220 are pivotally mounted to the interior of the carriage 200 and are an alternative locking mechanism design.

The base 205 of the carriage 200 has flanges 206 to support and/or attach planter assemblies to be carried by the carriage 200. A seal assembly 207, comprising a resilient O-ring, bristles, or carpet is provided along the bottom of the carriage assembly 200. The inner periphery comprises a flexible, non-scratching material, such as an elastomer, rubber 209, bristles 211, carpet 213 or the like. The diameter of the inner periphery is approximately the same or slightly less than an outer diameter of the pole 105. Thus, the seal assembly 207 of the carriage assembly 200 helps reduce intrusion of water, debris, insects and dust. The seal assembly also helps maintain alignment and prevent binding of the carriage 200 during ascending and descending motion. Optionally, a similar seal assembly may be provided at or near the top of the carriage assembly 200.

Figure 19:
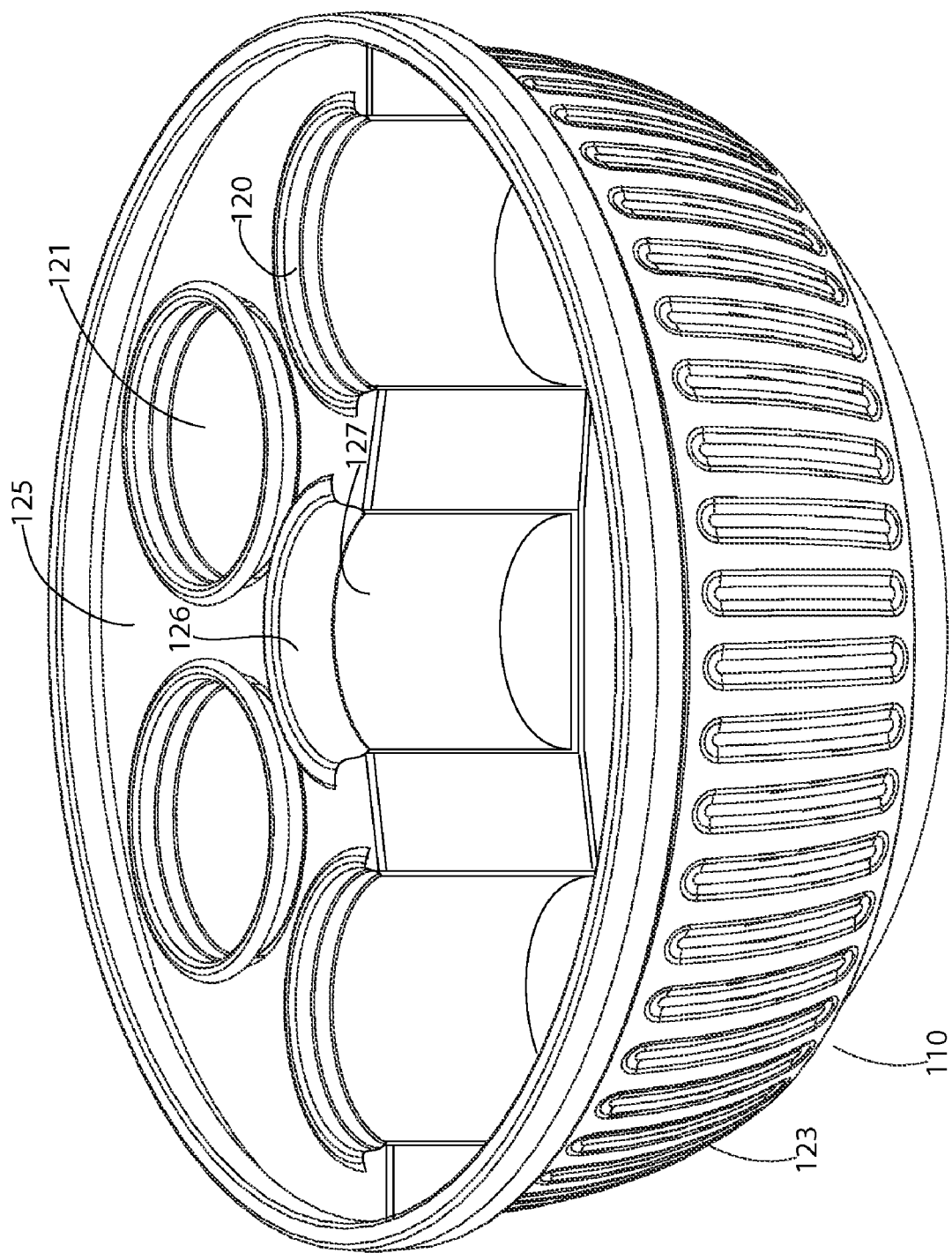
FIG. 19 provides a perspective view of an exemplary planter assembly according to principles of the invention.

As shown in FIG. 19, an exemplary planter 110 includes a body 123 and a top lid 125 with apertures to receive a plurality of removable plant pots 120 referred to as mini-pots. Each removable pot 120 defines a compartment 121 for planting. A central collar 126 defines a central aperture 127 for receiving a vertical support. This embodiment offers many unique advantages. It facilitates removal and replacement of potted plants held by the planter 110. As discussed above, this embodiment also reduces water consumption by using less soil or growing media. Additionally, this embodiment facilitates maintaining the temperature of potted plants, as a compartment beneath the lid 125 may be filled with an insulating material in the spaces between the plant pots 120. In the alternative the plant pots 120 and top lid 125 can be removed and the entire planter 110 can be used.

Figures 20, 21:
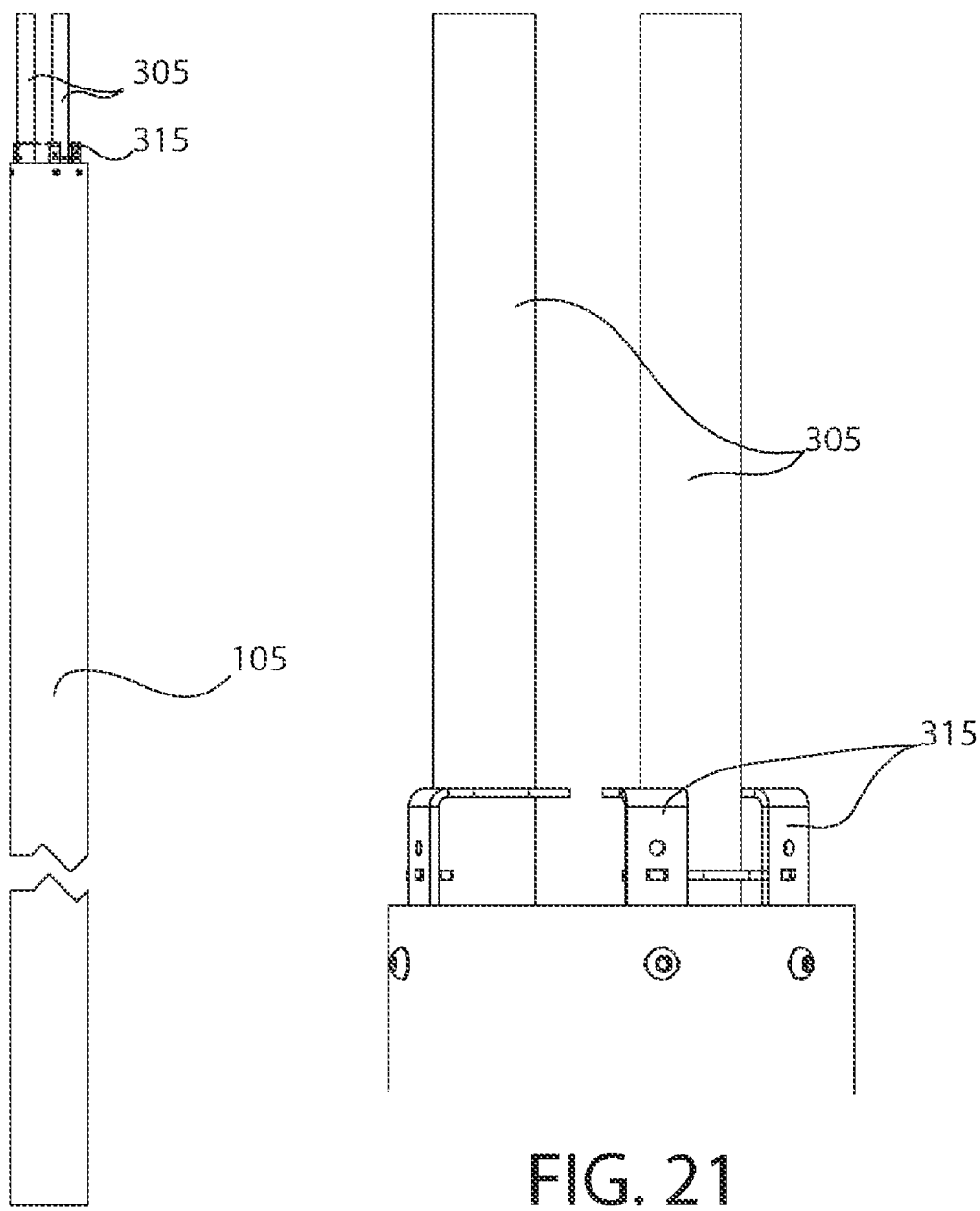
FIG. 20 provides a side view of an exemplary pole assembly with conduits according to principles of the invention.
FIG. 21 provides a side view of a top of an exemplary pole assembly with conduits according to principles of the invention.

FIGS. 20 and 21 illustrate a pole 105 without an attached collar 222. Conduits 305 for electrical wiring and/or irrigation extend through corresponding brackets 315 at the top of the pole 105. The conduit may be rigid or flexible, formed as an integral part of the pole as part of an extruded pole or formed separately. Brackets 315 position, guide and stabilize the conduits 305.

Figures 22, 23:
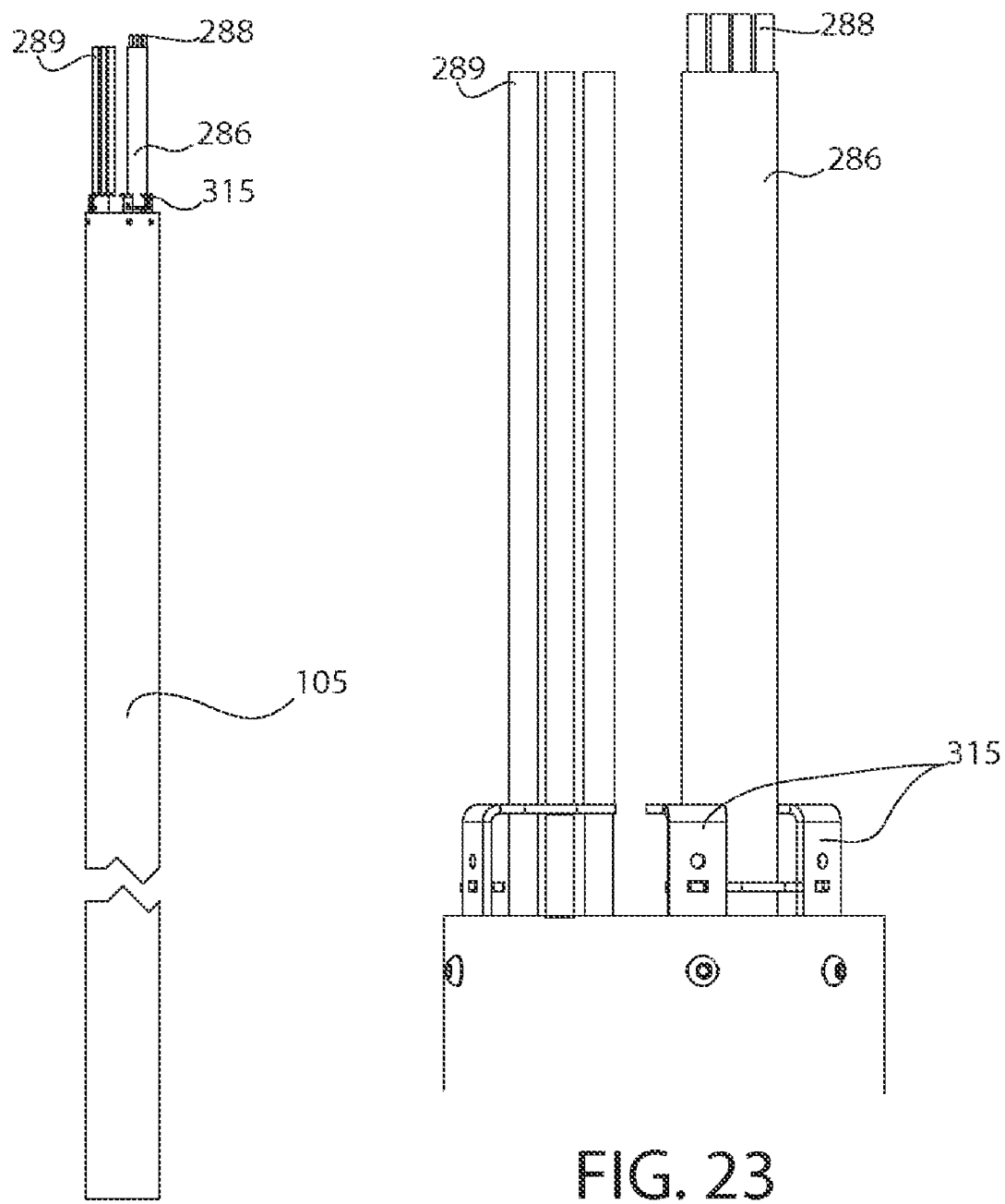
FIG. 22 provides a side view of another exemplary pole assembly with conduit variables according to principles of the invention.
FIG. 23 provides a side view of another top of an exemplary pole assembly with conduit variables according to principles of the invention.

FIGS. 22 and 23 illustrate another pole 105 without an attached collar 222. Conduits 286, 288, 289 for electrical wiring and/or irrigation extend through corresponding brackets 315 at the top of the pole 105. The brackets 315 position, guide and stabilize the conduits 286, 288, 289. Some conduit 286 may contain other smaller diameter conduit 288 for micro-irrigation lines or other elongated structures. The particular number, size, configuration and arrangement of conduits may vary without departing from the scope of the invention.

Figure 24:
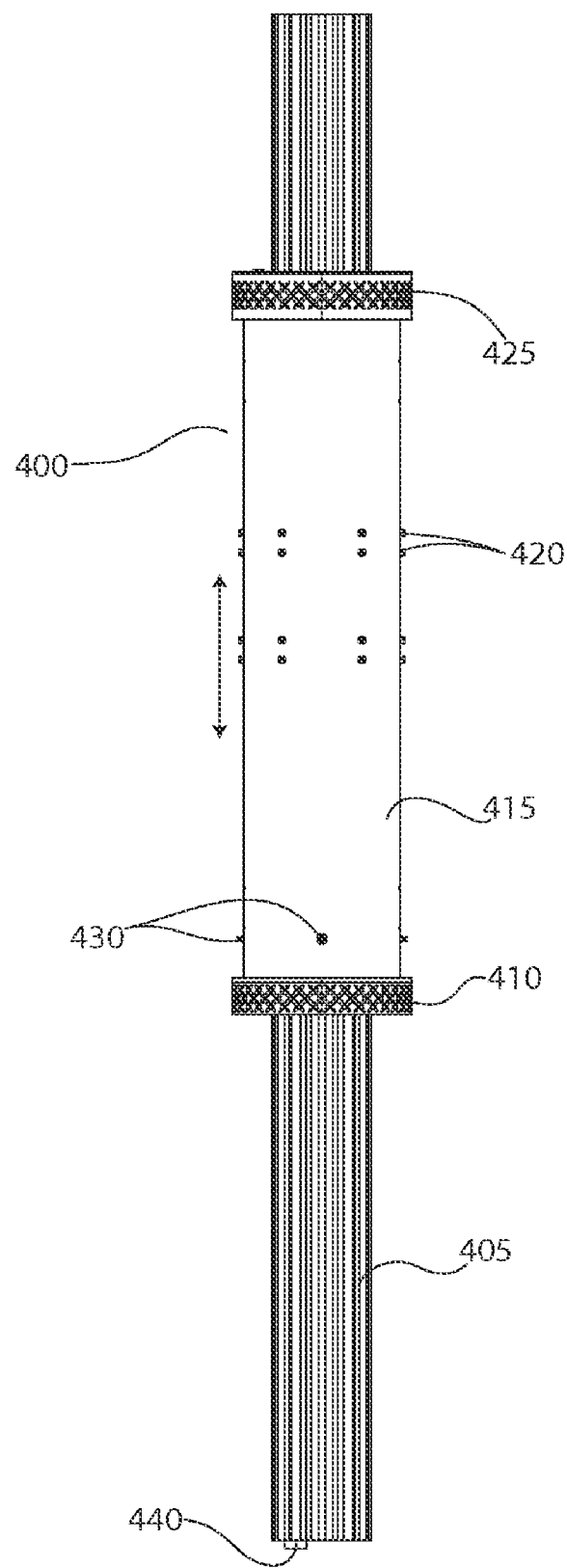
FIG. 24 provides a side view of an exemplary carriage assembly on a fluted pole assembly according to principles of the invention.
Figure 25:
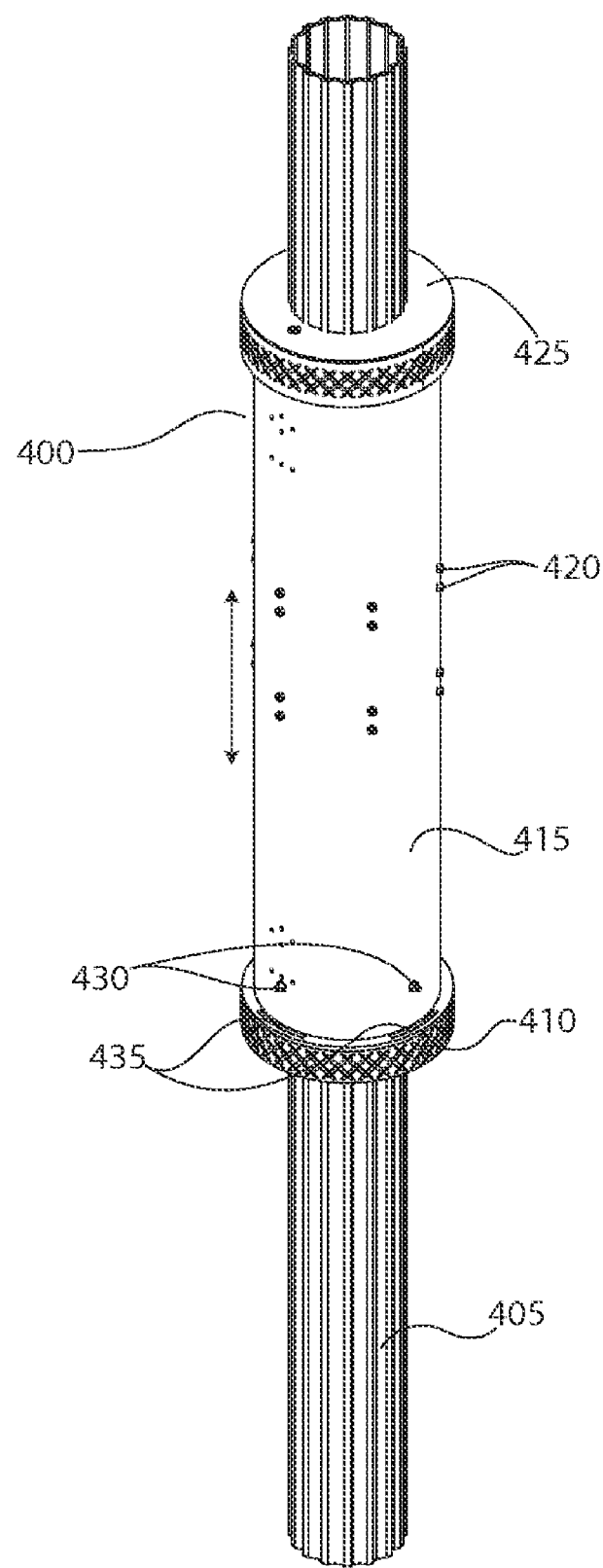
FIG. 25 provides a perspective view of an exemplary carriage assembly on a fluted pole assembly according to principles of the invention.
Figure 26:
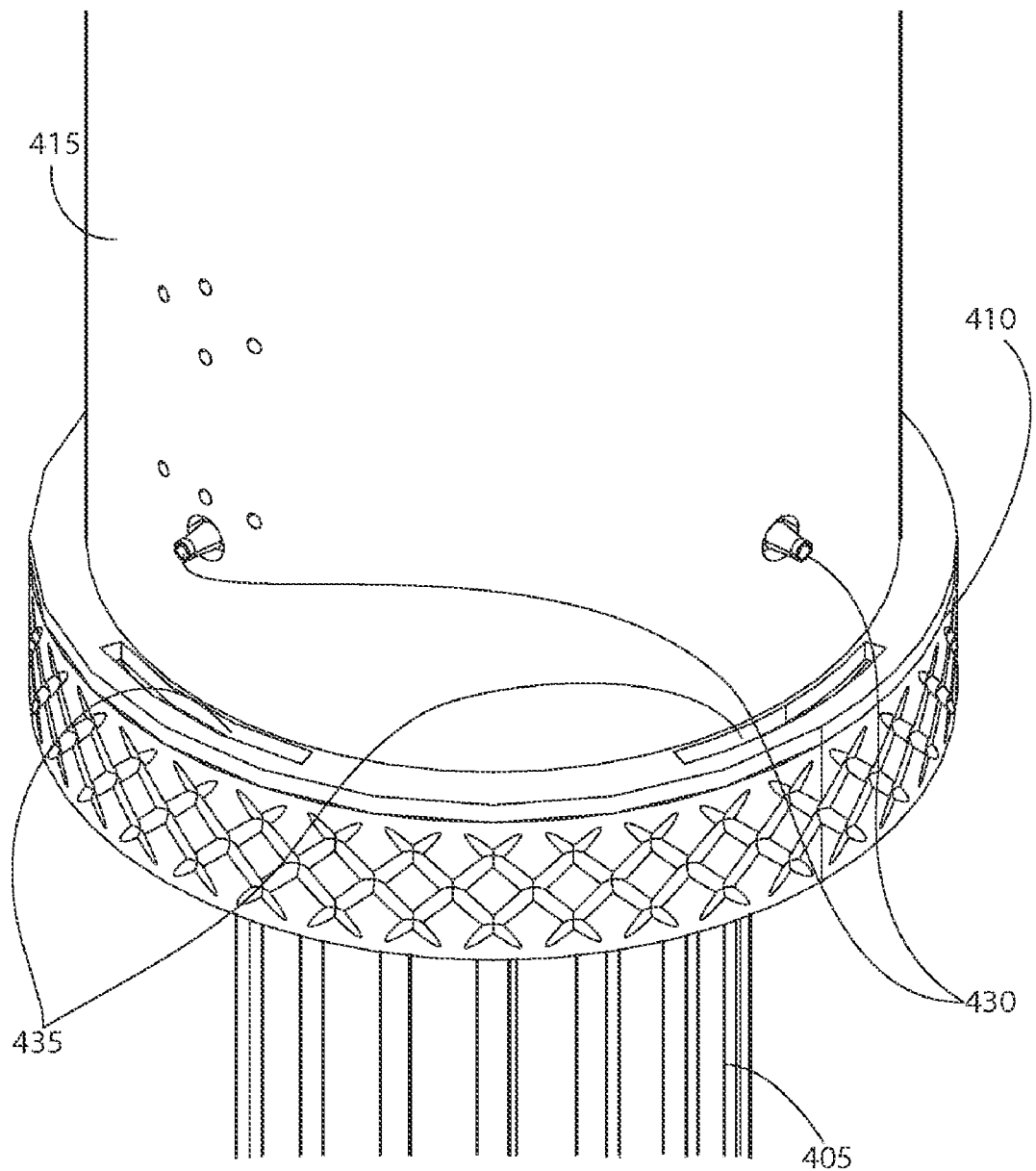
FIG. 26 provides a perspective view of a bottom of an exemplary carriage assembly on a fluted pole assembly according to principles of the invention.

Referring now to FIGS. 24-26, various views of the exterior of another carriage assembly 400 and components thereof are conceptually illustrated. The vertical support is a fluted pole 405. Conduit 440 may extend through the pole 440. A housing 415 for the carriage assembly 400 provides a base to which various components are attached or integrated. The exemplary housing 415 is tubular in configuration. While a housing 415 having a circular cross section is shown, housings having non-circular cross sections (e.g., elliptical, ovoid, polygonal, complex and irregular cross sectional shapes), whether fluted, textured or smooth, may be used without departing from the scope of the present invention. Additionally, the cross sectional dimensions may be constant or variable (e.g., tapering) along the length of the vertical support. Mounting hardware such as nut, bolts, rivets, welds or screws 420 or other mechanical attachments are provided to attach internal and/or external components such as rollers or guides, brackets, supports and the like, as described below.

Nozzles 430 for irrigation extend through the housing 415. The nozzles 430 control the direction and characteristic of emitted fluid (e.g., irrigating water). Plumbing within the housing 415, including a down flow pipe 447, releasably connects to irrigation lines, which are fluidly coupled to an irrigation conduit 440. The plumbing within the housing (as discussed below) supplies fluid from the irrigation conduit 440 to the nozzles 430, which can be extended as necessary and receive various irrigation dispensers for emitting water into the planter.

Figure 27:
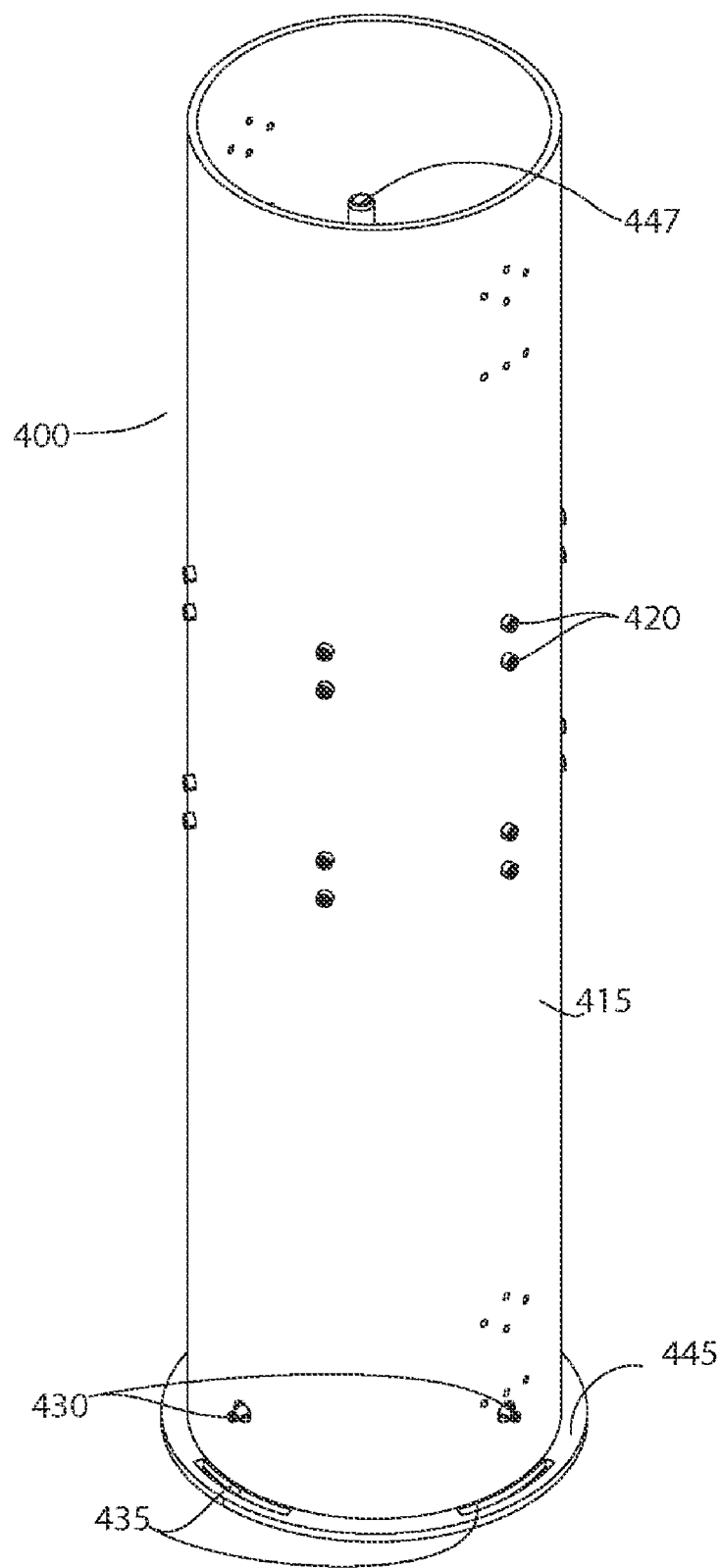
FIG. 27 provides a perspective view of a core housing of an exemplary carriage assembly for use with a planter system according to principles of the invention.

As shown in FIGS. 25, 26 and 27, the bottom of the housing 415 includes a flange 445 with slots 435 for mounting items such as planter assemblies. The slots 435 are configured for engagement by a correspondingly shaped hook.

A decorative cover 410 (i.e., skirt) conceals a portion of hook structures that extend through the slots 435 and below the flange 445. The skirt 410 also conceals, at least in part, the bottom of the housing 415, any hardware at the bottom of the housing 415, and the bottom interface between the housing 415 and vertical support 405. The bottom cover also conceals carriage assembly hardware (e.g., gaskets) at the bottom of the carriage assembly 400. The bottom cover 410 may be permanently or removably attached to the flange 445. In FIG. 27, the housing 415, flange 445 and slots 435 are shown without the bottom cover 410.

The top of the carriage assembly 400 mates with a top cover 425 when the carriage assembly 400 is raised to a top position. Thus, the top cover 425 surrounds and is attached to the pole 405, defining the top of the range of travel of the carriage assembly 400 per FIG. 31. The dimension (e.g., diameter) of the top cover 425 is larger than the dimension of the carriage assembly 400, such that the top cover 425 forms a compartment that receives and conceals the top edge of the carriage assembly 400 when the carriage assembly 400 is raised to the top position. As used herein the top position refers to a point on the pole 405 that is the maximum height to which the carriage may be raised. The top position may or may not be the topmost point of the pole 405. The top cover 425 is attached to the pole 405 at the top position. It shields the top of the carriage 415 from debris, rain and insect intrusion, and serves an aesthetic function. The top edge of the carriage housing 415 is about even with or slightly higher than the bottom edge of the top cover 425 when the carriage assembly 400 is raised to a locked position. The top cover allows (i.e., does not impede) additional upward motion of the carriage housing 415 from the locked position to a higher (i.e., unlocking) position, to enable unlocking. Then, when the carriage assembly 400 is lowered, the top cover remains stationary, at the top position on the pole 405.

Figure 28:
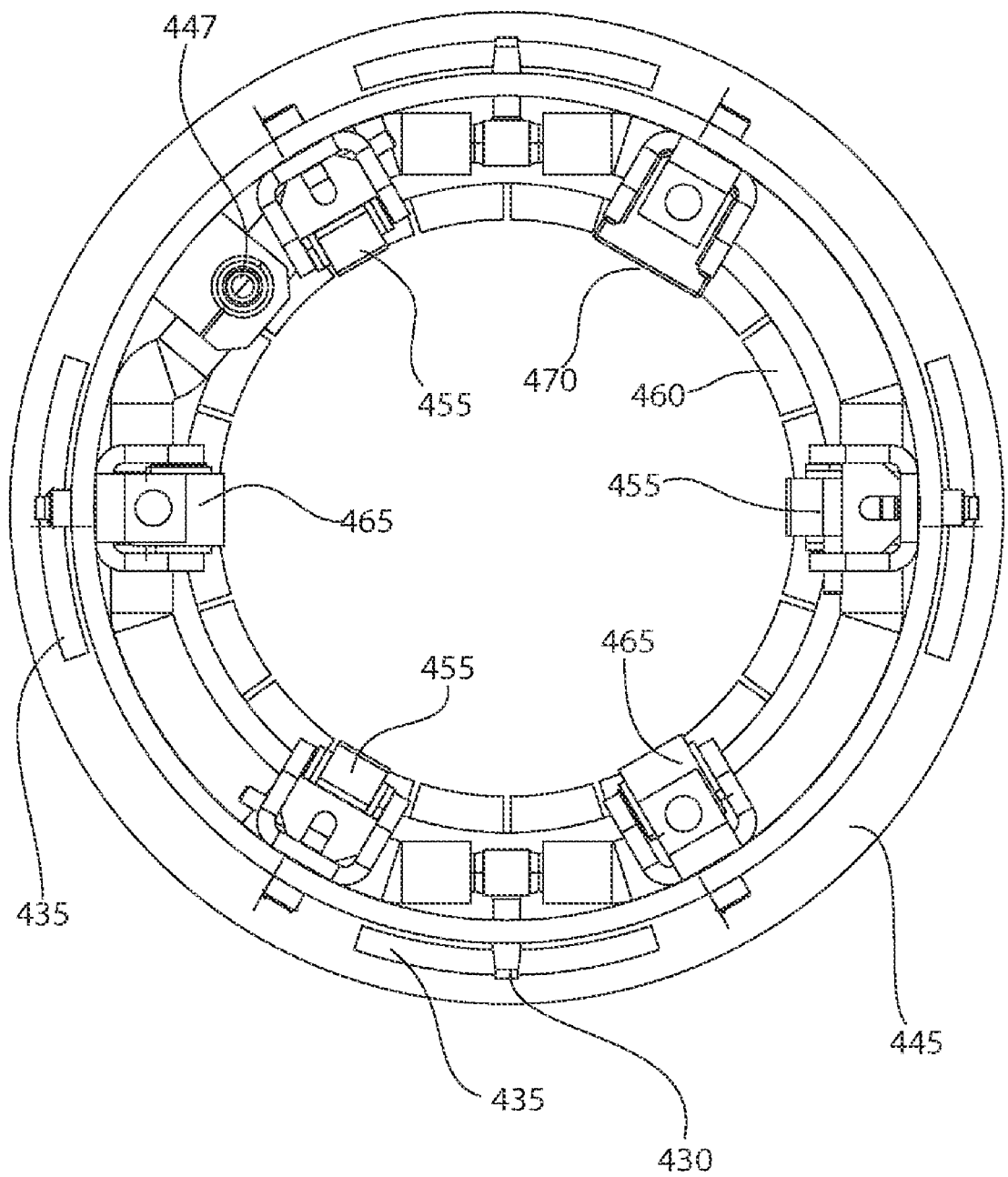
FIG. 28 provides a top view of an exemplary carriage assembly and collar for use with a planter system according to principles of the invention.
Figure 29:
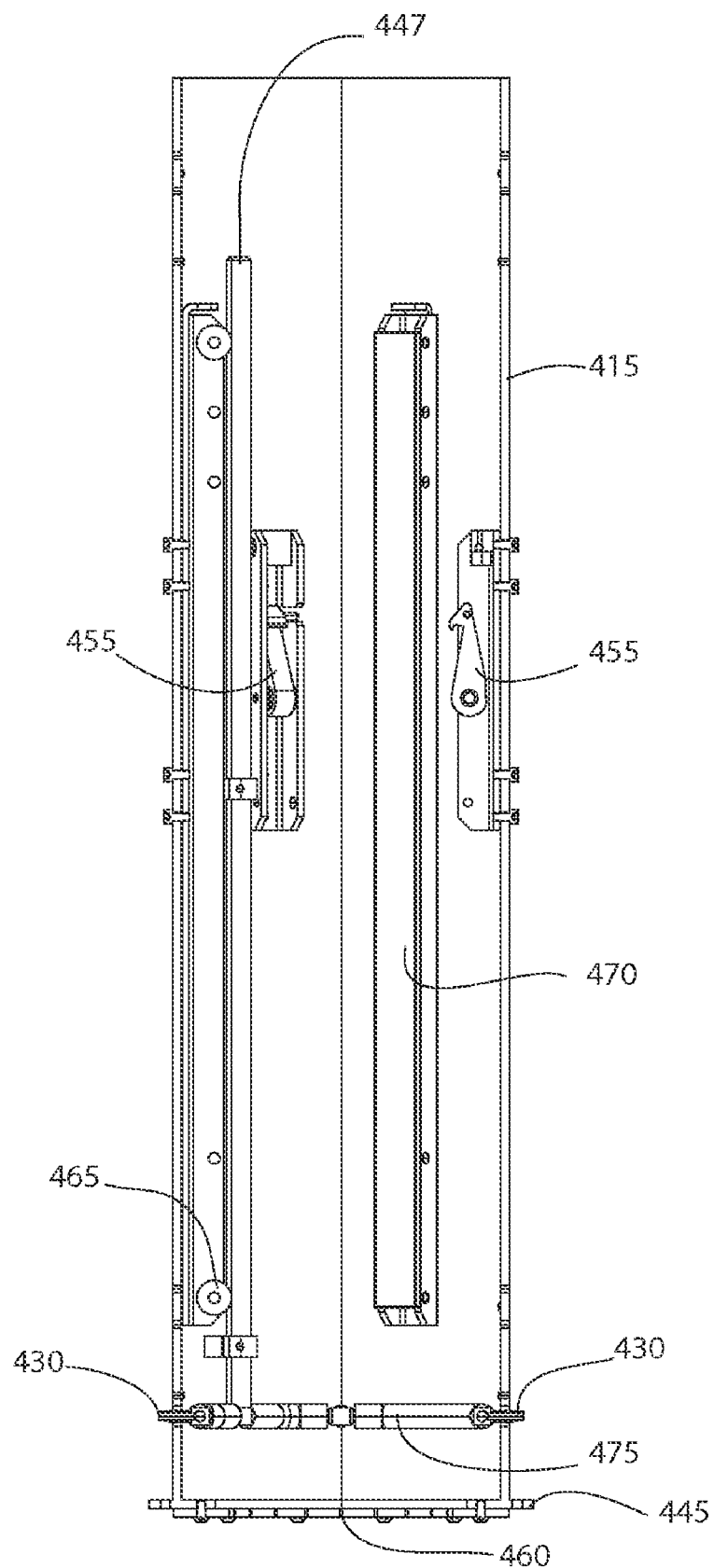
FIG. 29 provides a cutaway view of an exemplary carriage assembly for use with a planter system according to principles of the invention.

Referring now to FIGS. 28 and 29, a plurality of guides, such as channel mounted rollers 465 and or sliding pad assemblies 470 attached to and spaced around the interior of the carriage housing 415, keep the carriage 400 centered with the pole 405, reduce scraping against and scratching of the pole 405 and facilitate smooth reduced friction travel of the carriage 400 as it is drawn up and down the pole 405. The roller assemblies 465 include a mounting flange, or channel that attaches to the interior surface of the carriage body using mounting hardware such as screws. As an alternative to a roller, a sliding pad assembly 470 is shown in the location where a third roller may otherwise be located. Sliding pad assemblies 470 include a durable non-marring pad structure, preferably having a low coefficient of friction to maintain a space between the carriage 400 and pole 405, without scratching the pole or substantially impeding linear motion of the carriage 400. A sliding pad 470 may be included in lieu of or in addition to any roller. The guides are configured to travel between the roller channel guide bars 255 in the collar assembly 222, thereby ensuring proper alignment of the locking mechanism.

Guides other than roller assemblies 465 and sliding pads 470 may be utilized without departing from the invention. Such other guides may include soft resilient material (e.g., carpeting or similar material) extending between the interior surface of the carriage body 415 and the pole 405, a resilient elastomeric gasket extending between the bottom and/or interior surface of the carriage body 415 and the pole 405, and a plurality of support lanyards (e.g., cables). It has been found, that a plurality of spaced apart lanyards, such as cables, connected to the carriage assembly 400 helps maintain distance between the carriage body 415 and the pole 405.

The carriage assembly includes components of a mechanical locking mechanism that is responsive to vertical linear motion and cooperates with corresponding locking mechanism components on the collar assembly 222. In the exemplary embodiment, one or more catch-hooks 455 allow for locking the carriage 400 to the collar 222 when the carriage 400 is raised into a locking position. The catch hooks 455 are pivotally mounted to the interior of the carriage 400. In cooperation with corresponding locking components of the collar assembly 222, catch hooks 455 respond to vertical (up and down) linear motion. Locking is achieved when the catch hook 455 encounters a pusher bracket 235 on the collar assembly 222 during upward movement. The pusher bracket 235 of the collar assembly 222 urges the catch hook 455 into a corresponding slot 225 of the collar assembly 222. Optionally, biasing means may be provided to urge the hook towards the slot. Such optional biasing means may include magnets and/or springs configured to urge the hook towards the slot. When locked, the catch hooks 455 support the weight of the carriage assembly 400 and any supported planter assembly. This relieves the lanyards, tethers (e.g., cables), and the raising and lowering means of prolonged stress and attendant strains and fatigue.

Unlocking is achieved when the catch hook 455 encounters a release bracket 230 on the collar assembly 222. The catch hook 455 encounters the release bracket 230 during upward movement of the carriage assembly 400 beyond the locked position. During such upward movement, the release bracket 235 of the collar assembly 222 urges the catch hook 455 away from the corresponding slot 225 of the collar assembly 222.

Figure 41:
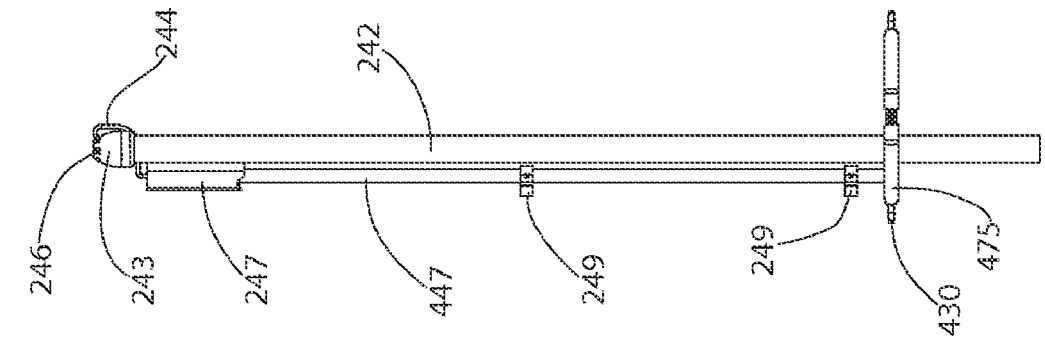
FIG. 41 provides an opposite side view extraction of an exemplary bottom irrigation system of a planter system according to principles of the invention.
Figure 40:
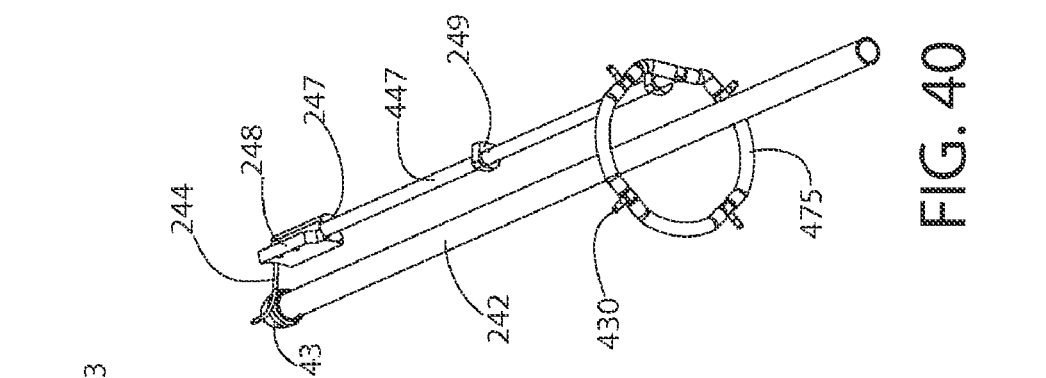
FIG. 40 provides a perspective angular view of an exemplary bottom irrigation system of a planter system according to principles of the invention.
Figure 39:
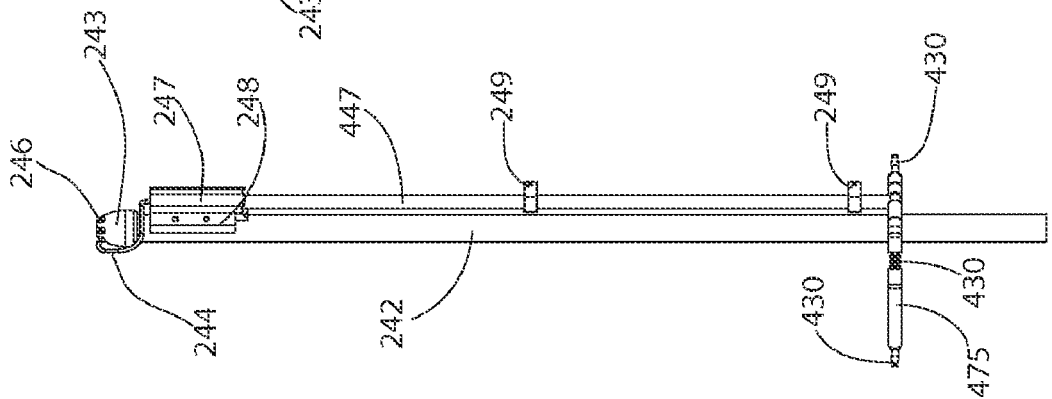
FIG. 39 provides a side view extraction of an exemplary bottom irrigation system of a planter system according to principles of the invention.

The exemplary carriage assembly shown in FIGS. 24 through 29 also includes irrigation components. In the exemplary embodiment, a downflow pipe 447 is configured to mate with a fluid coupling receptacle 247 of a collar assembly 222 when the carriage assembly 400 is raised to a locked position, as shown in FIGS. 39 through 41. The fluid coupling receptacle 247 includes a mounting base 248 for attachment to the collar assembly 222. A tube 244 fluidly couples the receptacle 247 to a manifold 243. The manifold includes one or more ports 246 for controlling flow to one or more tubes. An irrigation supply line, such as conduit 242, in the pole 405, is coupled to and supplies water to the manifold 243. Conduit 242 is the top segment of fluid supply line 440 (shown at the bottom of FIG. 24). The mating end of the downflow pipe 447 may be equipped with a gasket to provide a seal between the pipe 447 and receptacle 247. Mounting brackets 249 secure the downflow pipe 447 to the carriage assembly 400. At the end opposite to the mating end, the downflow pipe 447 is coupled to a nozzle manifold assembly that supplies water to the plurality of nozzles 430. The nozzle manifold comprises sections of pipes or tubing 475 and joints 460. The manifold generally follows the interior surface of the carriage housing 415. For example, a circular cross section carriage housing 415 may have a ring-like manifold assembly. Nozzles 430 are fluidly coupled to the nozzle manifold assembly. The nozzles 430 of the carriage are configured to emit liquid to a planter assembly coupled to the carriage assembly 400. The invention is not limited to any particular number, arrangement or configuration of nozzles 430 or to this irrigation system as designed for other alternates exist. Any alternative irrigation system that is suitable for supplying water to the planter when raised may be utilized and comes within the scope of the invention.

Figure 30:
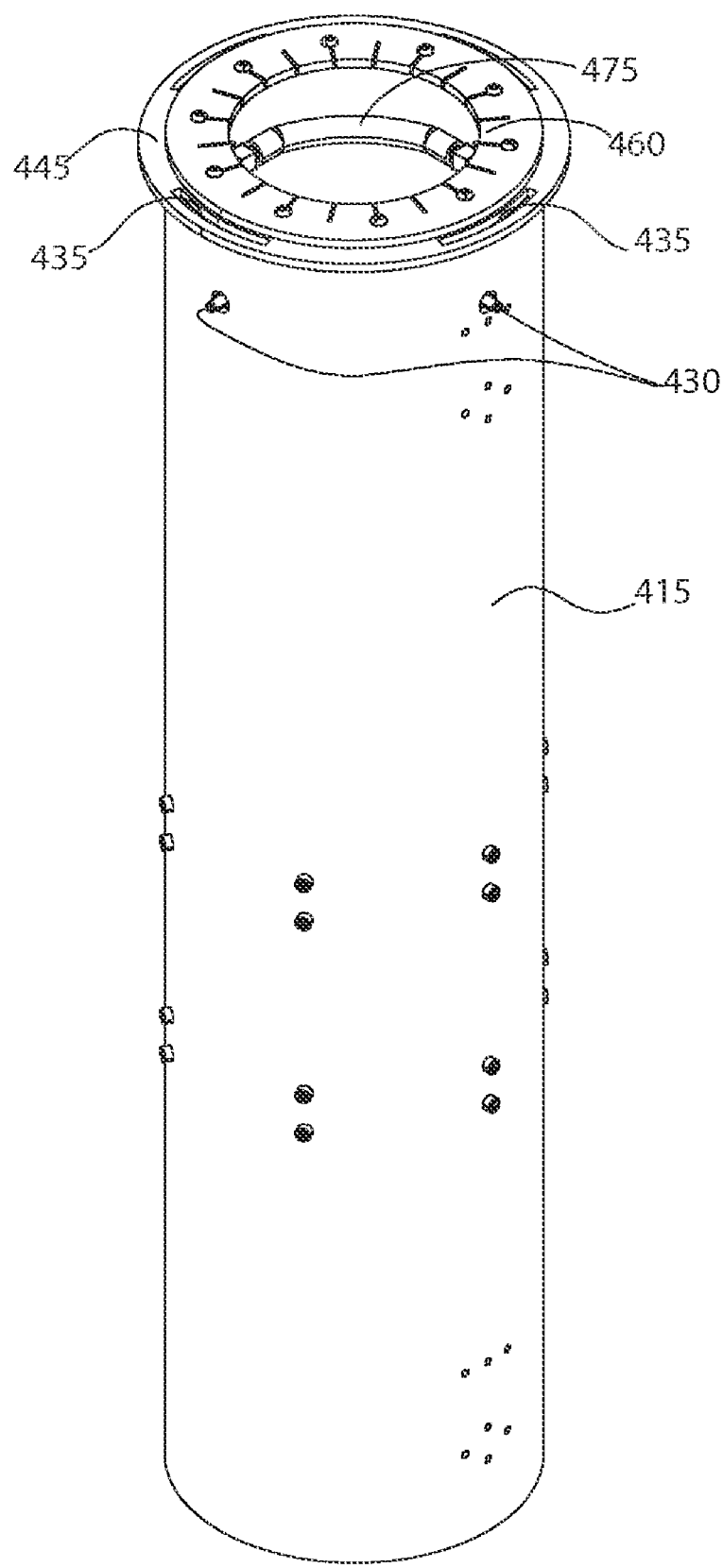
FIG. 30 provides a bottom perspective view of an exemplary carriage assembly for use with a planter system and gasket guide according to principles of the invention.

A bottom perspective view of the carriage assembly as shown in FIG. 30 reveals a gasket or seal assembly 460. The inner periphery of the seal assembly 460 comprises a flexible, non-scratching material, such as an elastomer, rubber 209, as shown in FIG. 17, bristles 211 as shown in FIG. 18, carpet 213 as shown in FIG. 18, or the like. The diameter of the inner periphery is approximately the same or slightly less than an outer diameter of the pole 405. Thus, the seal assembly 460 of the carriage assembly 400 helps reduce intrusion of water, debris, insects and dust. The seal assembly also helps maintain alignment and prevent binding of the carriage 400 during ascending and descending motion. Optionally, a similar seal assembly may be provided at or near the top of the carriage assembly 400, and/or between the top and bottom the carriage assembly 400.

Figure 31:
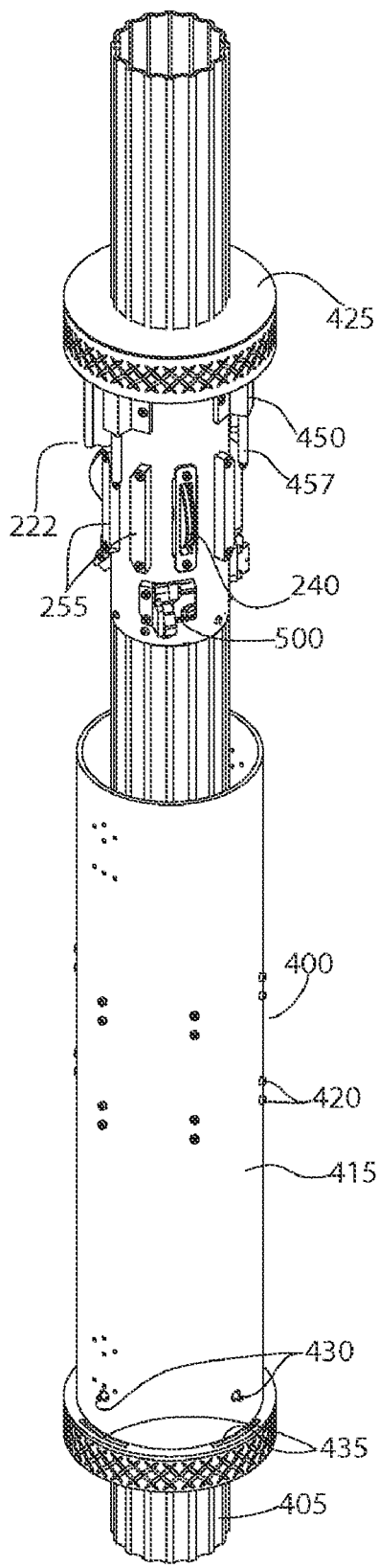
FIG. 31 provides a perspective view of an exemplary carriage assembly, on a fluted pole, in a lowered position, with a collar assembly for use with a planter system according to principles of the invention.

As shown in FIG. 31, the collar assembly 222 includes one or more pulleys 240 to guide lanyards that enable raising and lowering the carriage 400. One end of a lanyard may be routed over a corresponding pulley 240 and attached to the carriage 400 using a mechanical fastener. The pulley 240 is rotatably attached to the collar assembly 222, which is attached to the pole 110.

As shown in FIG. 31, an optional registration pin assembly includes a base 450 and a spring 457 biasing a pin 455 with an elongated shank and conical free end. The base 450 is attached to the collar 222. A conical free end of the pin 455 engages an aperture of a correspondingly aligned component of the carriage assembly 400 as and when the carriage assembly 400 is raised to a locked position. In one embodiment, that component is the catch hook assembly 505 and a registration guide 535 at the top of the assembly, which includes an aperture 540 for engaging the tip of a registration pin 455. The registration pin 455 steadies, aligns and secures the engaged registration guide 535. Upon engagement, the carriage assembly 400 is aligned for locking and vibrations and rattling of the carriage assembly 400 are dampened as necessary. In other embodiments, the registration pin 455 may engage apertures formed at the top of other assemblies attached to the carriage assembly 400.

Figure 32:
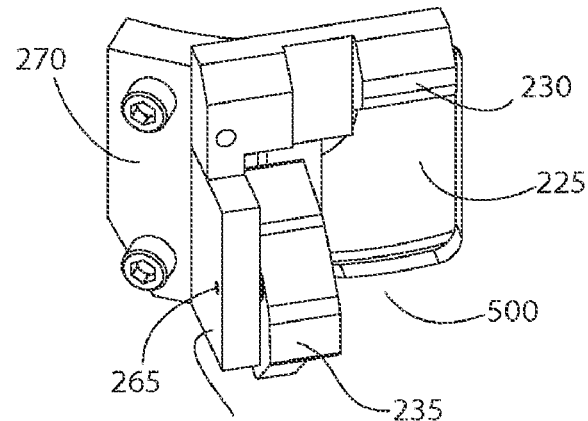
FIG. 32 provides a perspective view of an exemplary latch guide assembly for a mechanical locking mechanism for use with a planter system according to principles of the invention.
Figure 33:
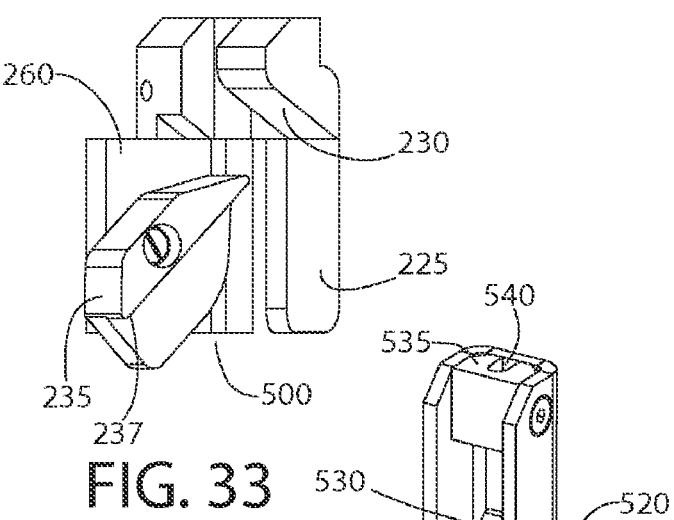
FIG. 33 provides another perspective view of an exemplary latch guide assembly for a mechanical locking mechanism for use with a planter system according to principles of the invention.
Figure 34:
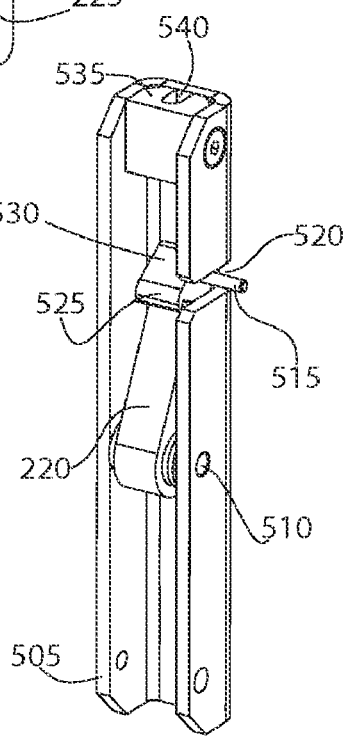
FIG. 34 provides a perspective view of an exemplary latch assembly for a mechanical locking mechanism for use with a planter system according to principles of the invention.

A mechanical locking mechanism responds to vertical linear motion of the carriage assembly 400 relative to the collar assembly 222. FIGS. 32 through 34 illustrate components of an exemplary mechanical locking mechanism that responds to vertical linear motion of the carriage assembly 400. The mechanism comprises a bracket assembly 500 and a catch-hook assembly 505. The bracket assembly 500 includes a pusher bracket 235 pivotally mounted with a pivot pin 265 to a pusher bracket base 260. A mounting base 270 with mounting hardware secures the bracket assembly 500 to the exterior of the collar assembly 222. The pusher bracket 235 is configured with a planar slanted surface 237 configured to engage and urge the push pin 515 of the catch hook 220 toward the slot 225 (i.e., into a "locking position") when the planter assembly is raised from a position below the pusher bracket 235 to a position above the pusher bracket 235. The catch hook 220 then falls into and engages the slot 225. A release bracket 230 above the slot 225 urges the tip 525 and then the head 530 of the catch hook 220 away from the slot 225 (i.e., into an "unlocked position") when the planter assembly is raised above the slot 225. In the unlocked position the carriage 400 and any supported planter assembly may then be lowered past the slot 225 without the hook 220 catching the slot 225. The catch hook assembly 505 comprises a channel-like base to which the catch hook 220 is pivotally mounted with a pivot pin 510. A pusher pin 515 attached to the pusher bracket 235 is configured to engage the slanted plane 237 of the pusher bracket 235. A slot 520 in the channel accommodates travel of the pusher pin 515.

Figure 35:
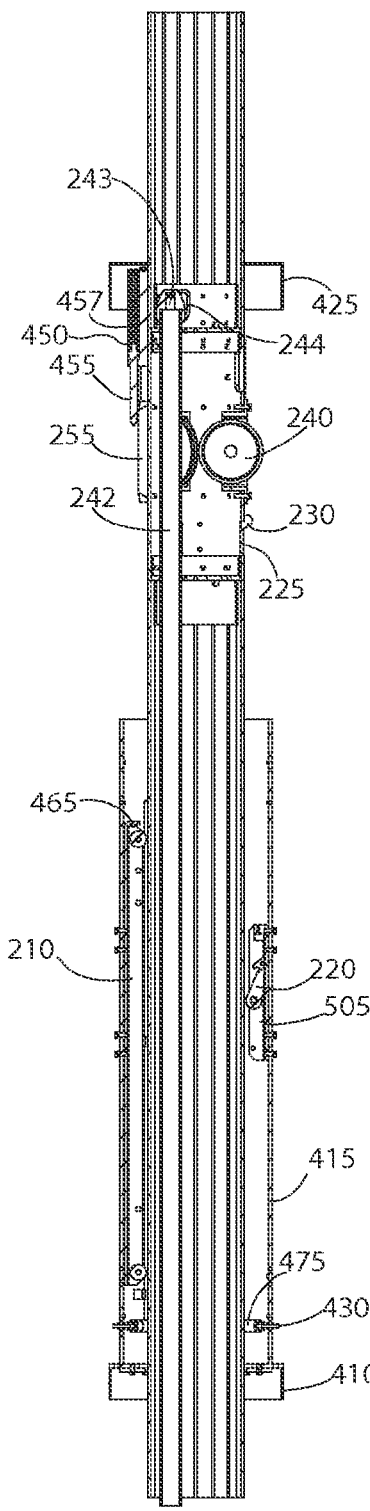
FIG. 35 provides a side cutaway view of an exemplary carriage assembly, on a fluted pole, in a lowered position, with a carriage collar assembly for use with a planter system according to principles of the invention.
Figure 36:
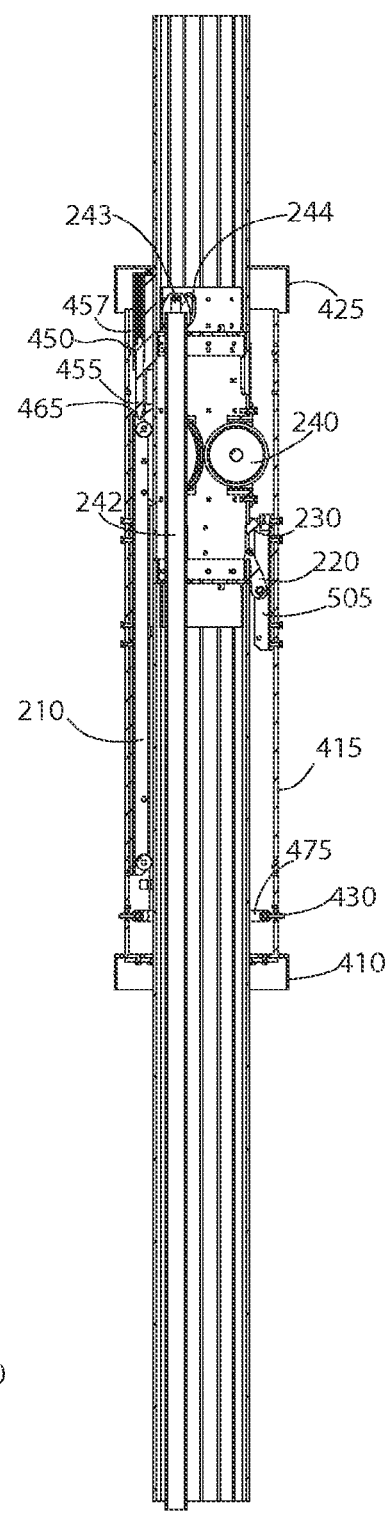
FIG. 36 provides a side cutaway view of an exemplary carriage assembly, on a fluted pole, in a locked position, with a carriage collar assembly for use with a planter system according to principles of the invention.
Figure 37:
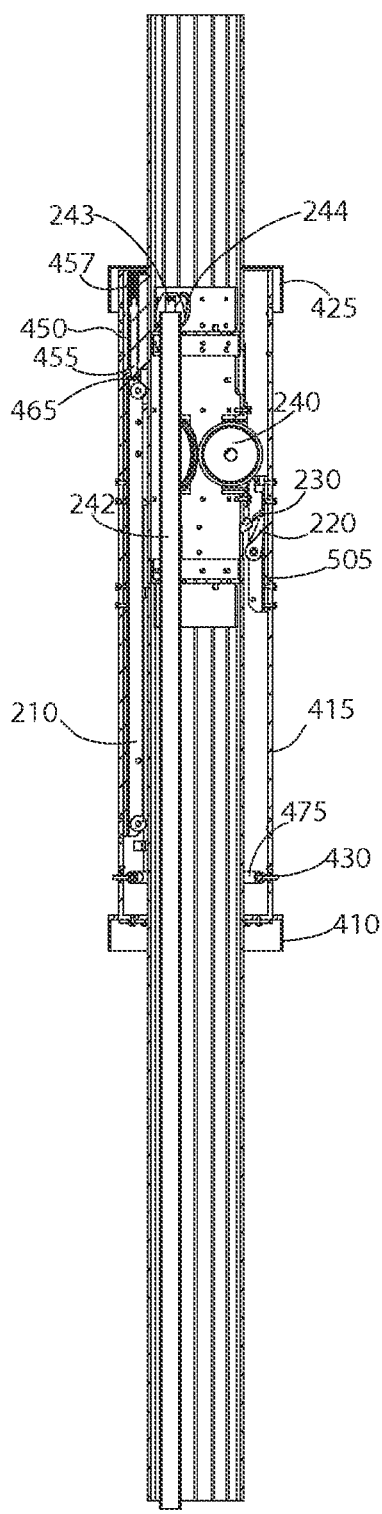
FIG. 37 provides a side cutaway view of an exemplary carriage assembly, on a fluted pole, in a releasing position, with a carriage collar assembly for use with a planter system according to principles of the invention.

Referring now to FIGS. 35 through 37, an exemplary carriage assembly is shown in an unlocked and lowered position in FIG. 35, in a locked position in FIG. 36 and in an unlocking position in FIG. 37. In the unlocked and lowered position in FIG. 35, the catch hook 220 is tilted away from the pole 405. The rollers 465 and guide pad 470 optionally may be in contact with the pole 405. The downflow pipe 447 is separated from the fluid coupling receptacle 247 as shown in FIGS. 39-41.

In the locked position in FIG. 36, the catch hook 220 has engaged the slot 225. The pusher pin 515 attached to the pusher bracket 235 has engaged the slanted plane 237 of the pusher bracket 235 during upward movement of the carriage assembly 400, causing the catch hook 220 to pivot towards and engage the slot 225. The rollers 465 and guide pad 470 optionally remain in contact with the pole 405. The downflow pipe 447 engages the fluid coupling receptacle 247 of the collar assembly 222. The fluid coupling receptacle 247 is fluidly coupled to an irrigation supply line, such as conduit 242, in the pole 405.

In the unlocking position in FIG. 37, the carriage assembly is raised above the locked position until the catch hook 220 is urged away from the slot 225 by the release bracket 230. The rollers 465 and guide pad 470 remain in contact with the pole 405. The downflow pipe 447 engages the fluid coupling receptacle 247 of the collar assembly 222, until the carriage assembly 400 is lowered below the collar assembly 222.

Figure 38:
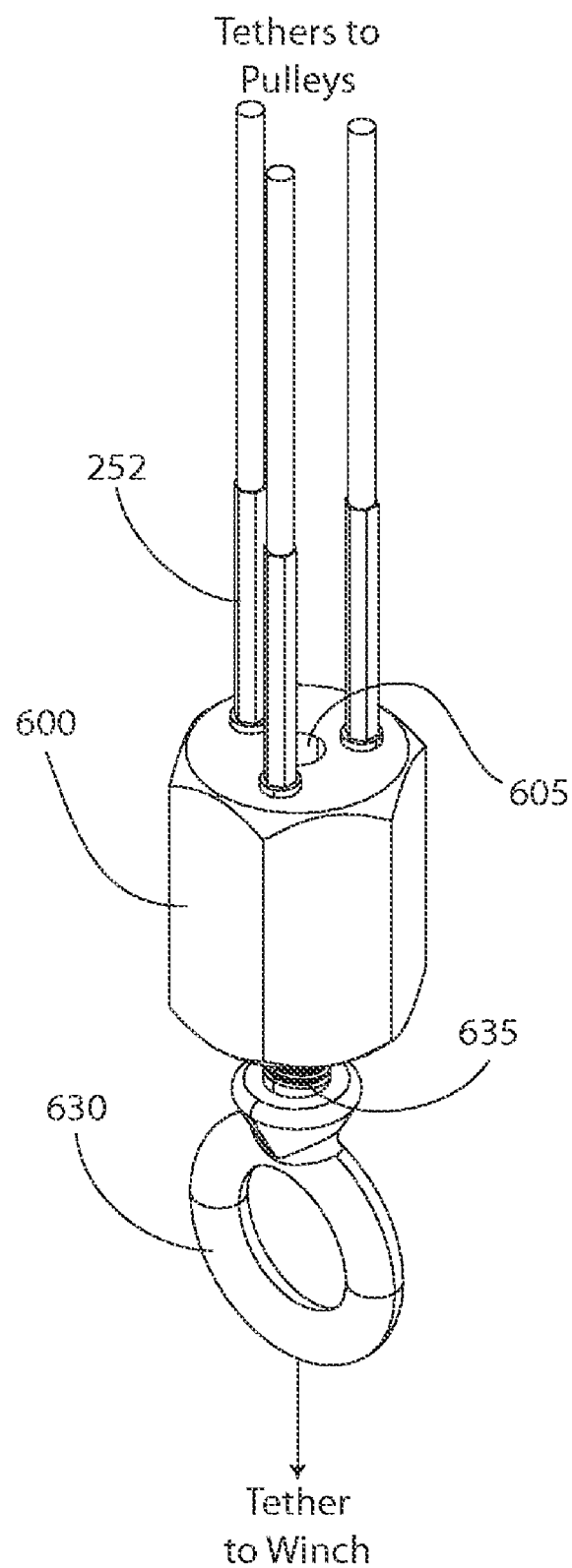
FIG. 38 provides a top perspective view of an exemplary yoke assembly with three attached cables for use with a planter system according to principles of the invention.

FIG. 38 shows tethering components that may be used to suspend an exemplary planter assembly for raising and lowering. A yoke 600 includes a plurality of joints for connecting tethers 252 (e.g., ropes, cords, cables or the like). The tethers 252 run over the pulleys in the collar assembly 222. While one pulley and one tether may suffice, a plurality of pulleys and corresponding tethers 252 are preferred to facilitate evenly raising and lowering the planter assembly. In the exemplary embodiment shown, three tethers 252 extend upwardly from the yoke 600 to the pulley. Each tether includes a coupling (e.g., a threaded end) configured for engaging the joints of the yoke 600. A central joint 605 (e.g., a threaded joint) is configured to receive a threaded shank 635 of an eye bolt (e.g., a forged eye bolt) 630. The eyebolt 600 is then tethered to a raising and lowering device (i.e., a raising and lowering means), such as a winch.

Referring now to FIGS. 42 through 47, multi-section planter assemblies and corresponding hanger assemblies are conceptually illustrated. The hanger assembly 605 includes a hook 603 extending downward from the top 604 of the hanger assembly for engaging a slot 435 per FIGS. 26 and 31 of the carriage assembly 400. A lip 604 is provided to engage the rim (i.e., top edge) of the planter assembly, or in the case of a multi-section planter as illustrated, then the lip engages the rim (i.e., top edge) of the section 600 of the planter assembly. A corresponding slot 602 formed in bottom of the planter section 600 receives a flange 601 extending upward from the bottom 612 of the hanger assembly 605. Thus, the hanger assembly 605 supports the planter assembly section 600 on the carriage assembly 400 by hooking into a slot of the carriage assembly 400, while engaging the top rim and the slot 602 of the planter assembly section 600.

Figure 44:
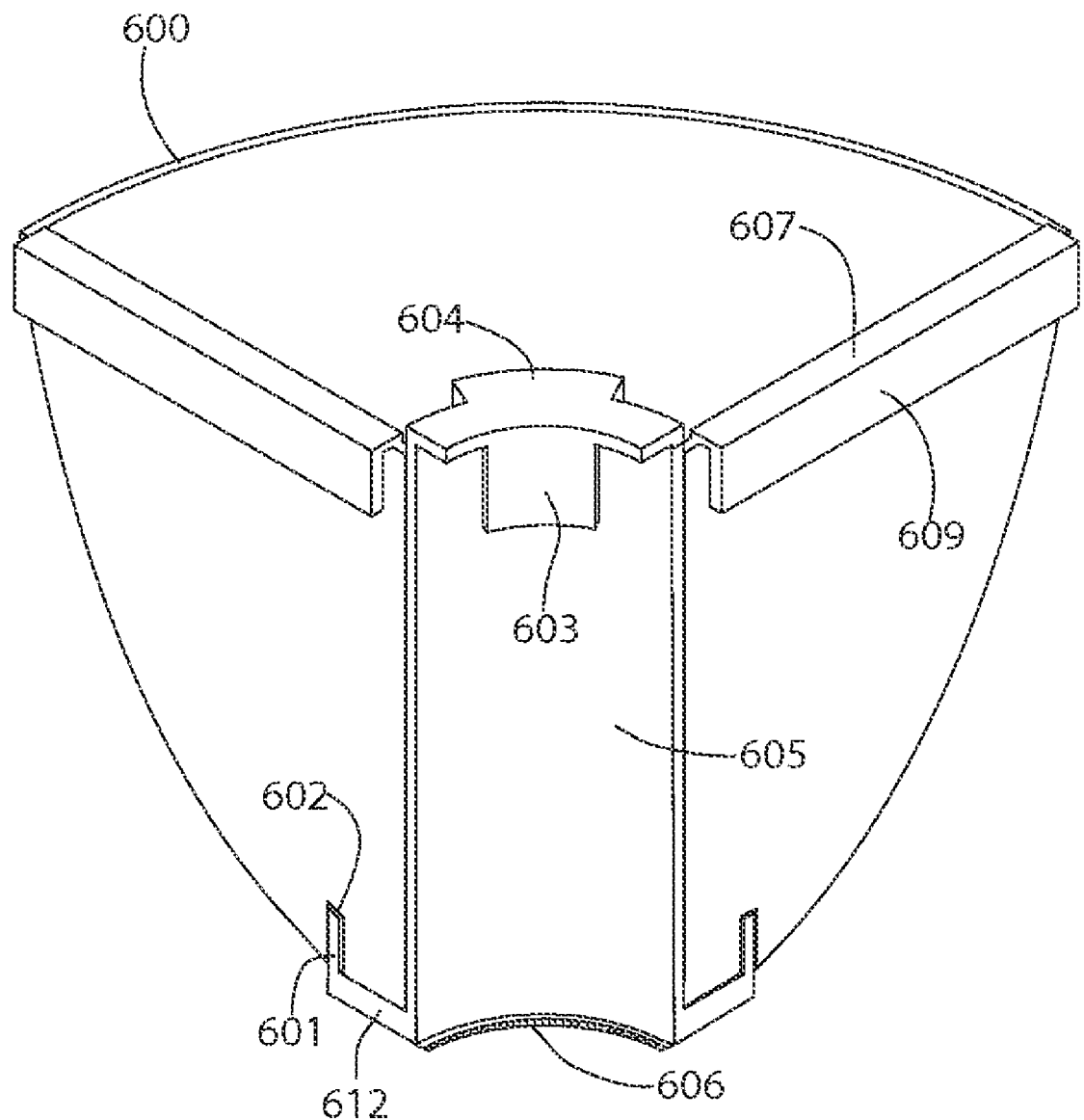
FIG. 44 provides a perspective view of a section of a multi-section planter assembly and a section of a multi-section carriage hanger assembly according to principles of the invention.
Figure 45:
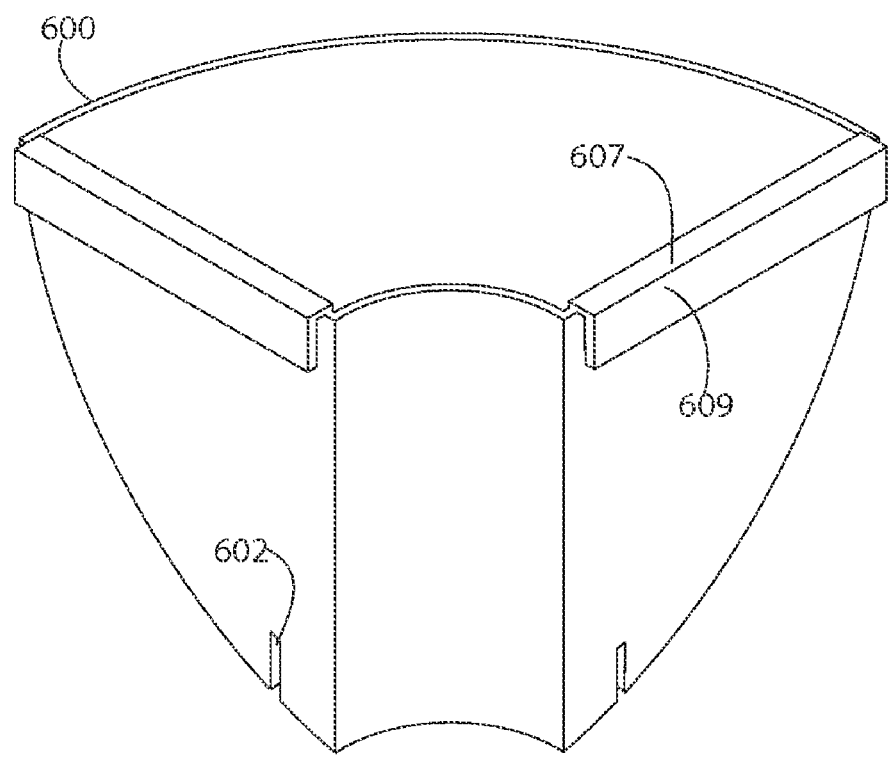
FIG. 45 provides a perspective view of a section of a multi-section planter assembly according to principles of the invention.

The embodiment in FIGS. 44 through 45 reveal a u-shaped female channel 607 formed on or attached to side edges of planter sections known as female sections. The channel 607 may be permanently attached to (e.g., integrally formed with) or removably attached to the side edge. Parallel spaced-apart planar sections 608, 609 define a channel for receiving an adjacent male edge 610 of an adjacent planter section in FIG. 43. The channel may frictionally engage a male edge 610, or may be mechanically fastened to the male edge using a plastic snap fit, clamp, screw, bolt and nut or the like. In this manner, several male and female sections may be joined together to form a segmented planter assembly.

Figures 46, 47:
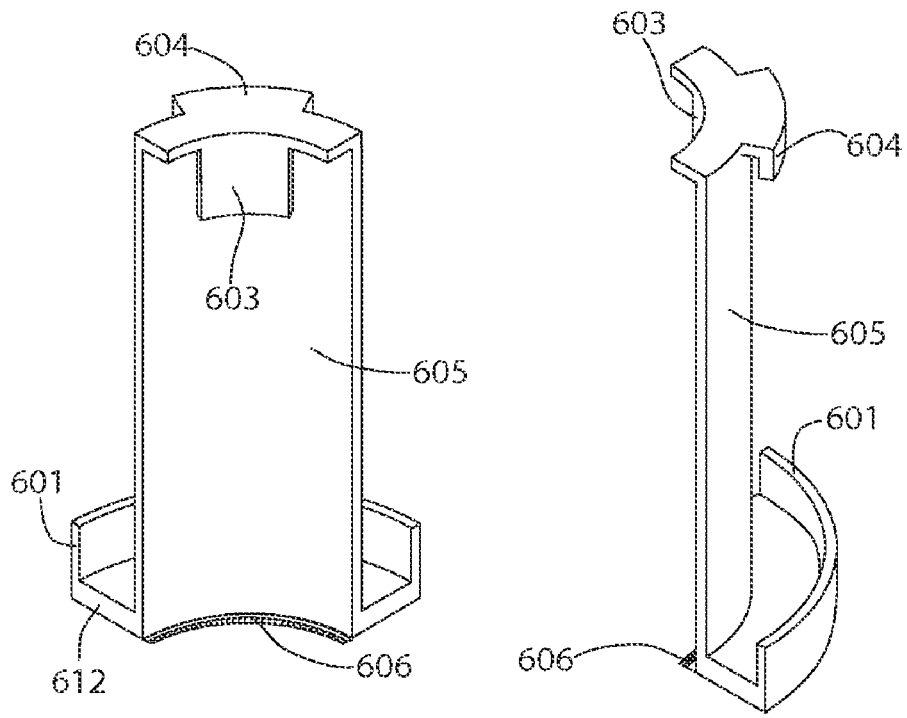
FIG. 46 provides a perspective view of a section of a multi-section carriage hanger assembly according to principles of the invention.
FIG. 47 provides another perspective view of a section of a multi-section carriage hanger assembly according to principles of the invention.
Figure 48:
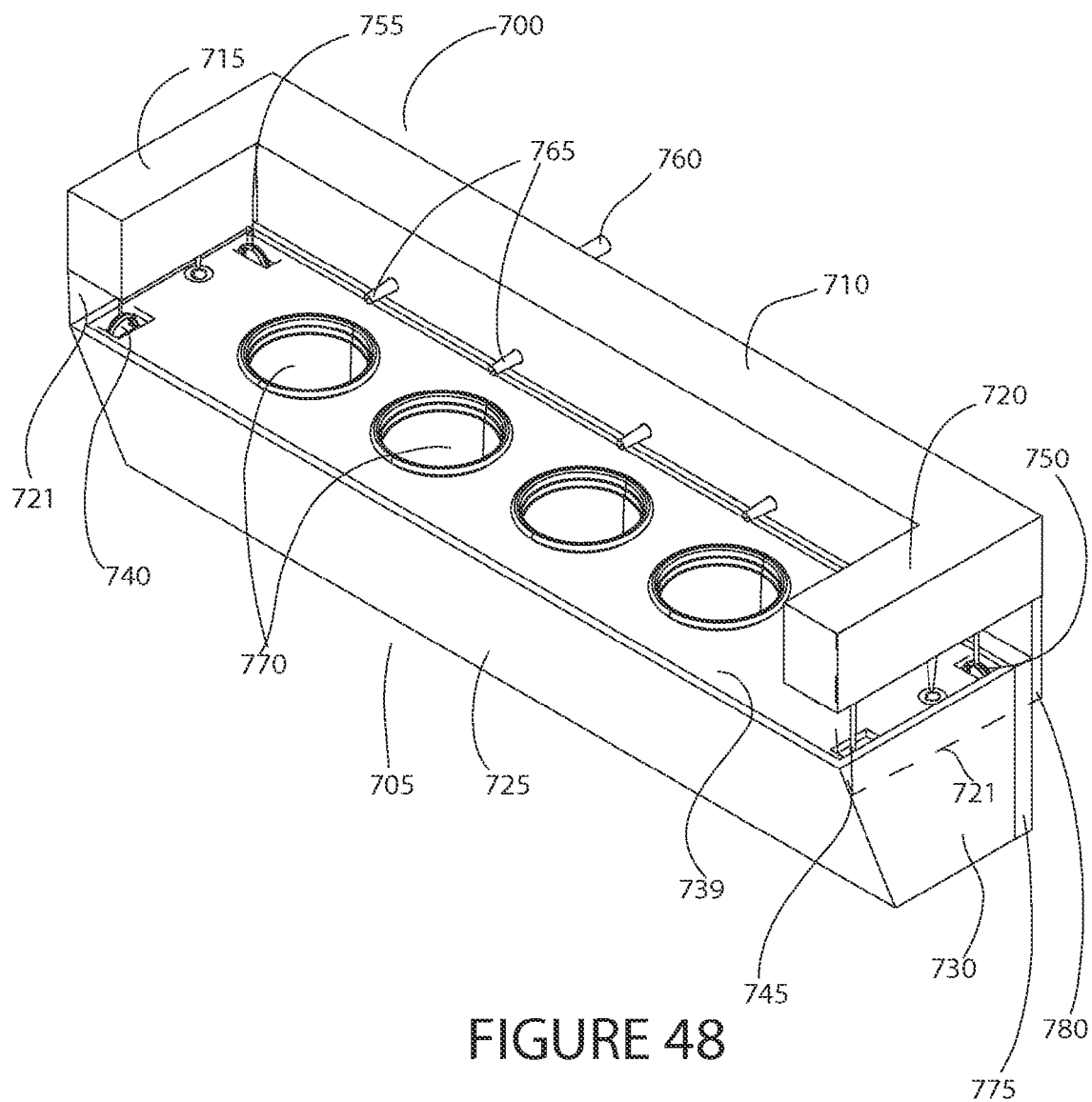
FIG. 48 provides a perspective view of an exemplary raceway planter system with a planter assembly in a raised position according to principles of the invention.
Figure 49:
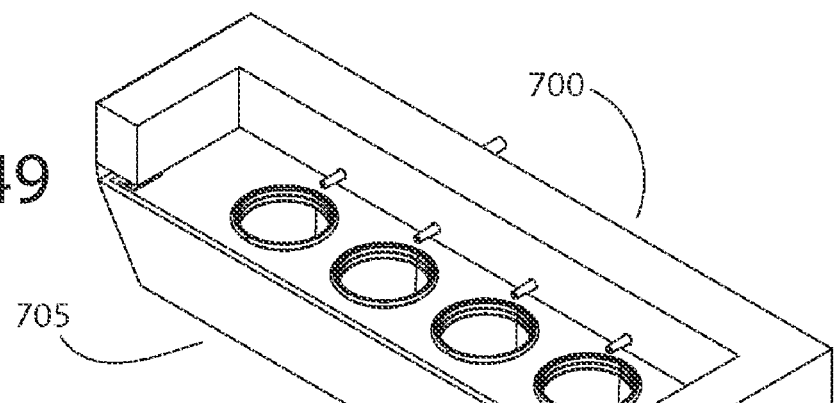
FIG. 49 provides a perspective view of an exemplary raceway planter system with a planter assembly in a locked position according to principles of the invention.
Figure 50:
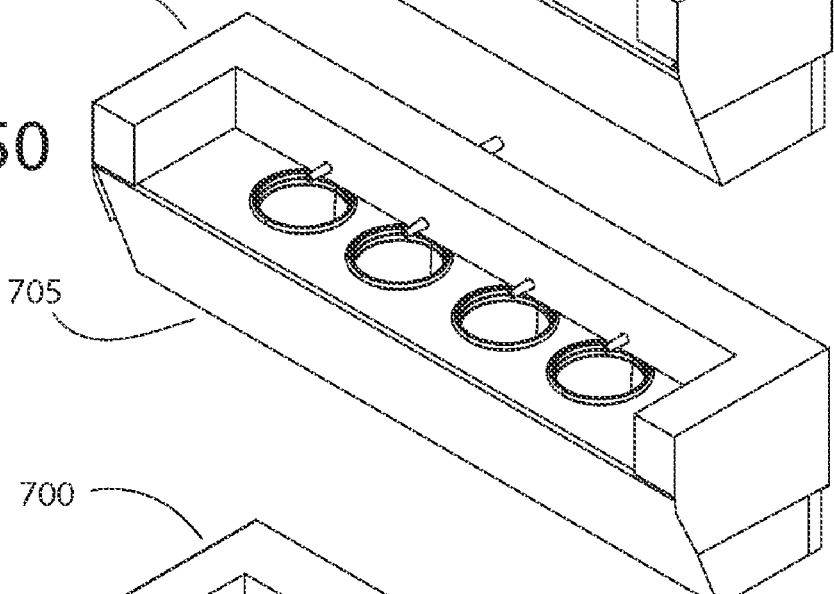
FIG. 50 provides a perspective view of an exemplary raceway planter system with a planter assembly in a releasing position according to principles of the invention.
Figure 51:
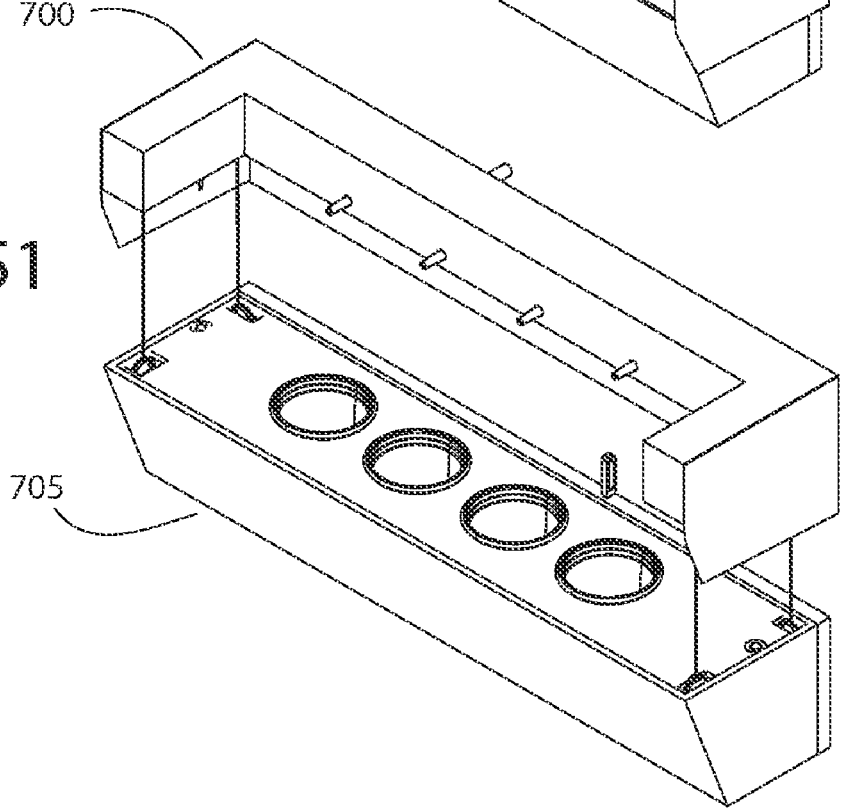
FIG. 51 provides a profile view of an exemplary raceway planter system with a planter assembly in a lowered position according to principles of the invention.

FIGS. 46 and 47 conceptually illustrate an exemplary hanger assembly, as described above with reference to FIG. 44. The hanger assembly 605 includes a hook 603 extending downward from the top 604 of the hanger assembly for engaging a slot 435 of the carriage assembly 400. A lip 604 is provided to engage the rim (i.e., top edge) of the planter assembly, or in the case of a multi-section planter as illustrated, then the lip engages the rim (i.e., top edge) of the section 600 of the planter assembly. A corresponding slot 602 formed in bottom of the planter section 600 receives a flange 601 extending upward from the bottom 612 of the hanger assembly 605. Thus, the hanger assembly 605 supports the planter assembly section 600 on the carriage assembly 400 by hooking into a slot of the carriage assembly 400, while engaging the top rim and the slot 602 of the planter assembly section 600.

Now referring to FIGS. 48 through 54, various views of another embodiment of a planter assembly according to principles of the invention are shown. This embodiment is referred to as a raceway assembly 700. The raceway assembly 700 includes an upper housing 710. Despite its unique shape and configuration, the housing 710 of the raceway assembly 700 replaces the collar assembly 222 of the embodiments described above. The housing 710 is a hollow container. A rear panel 780 is provided for mounting the housing 710 to a vertical support and/or providing an access panel to service interior components of the housing 710. Like the collar assembly 222, the housing 710 contains pulleys, guides, locking mechanisms and irrigation components for the planter assembly and defines the uppermost position of the planter assembly 705. Unlike the collar assembly 222, however, the housing 710 of the raceway assembly 700 also contains a winch or other raising and lowering means for raising and lowering the planter container assembly 705. In this embodiment, the vertical support may comprise a wall, or any other supportive structure to which the housing 710 of the raceway assembly 700 may be mounted at a height. The exemplary housing 710 is U-shaped, including an elongated base and a pair of parallel arms 715 and 720 extending therefrom. The outer sides of the arms may include dust covers 721 that extend downwardly to limit the intrusion of dirt and debris in the space between the housing and the planter assembly, when the planter assembly is raised.

Figure 62:
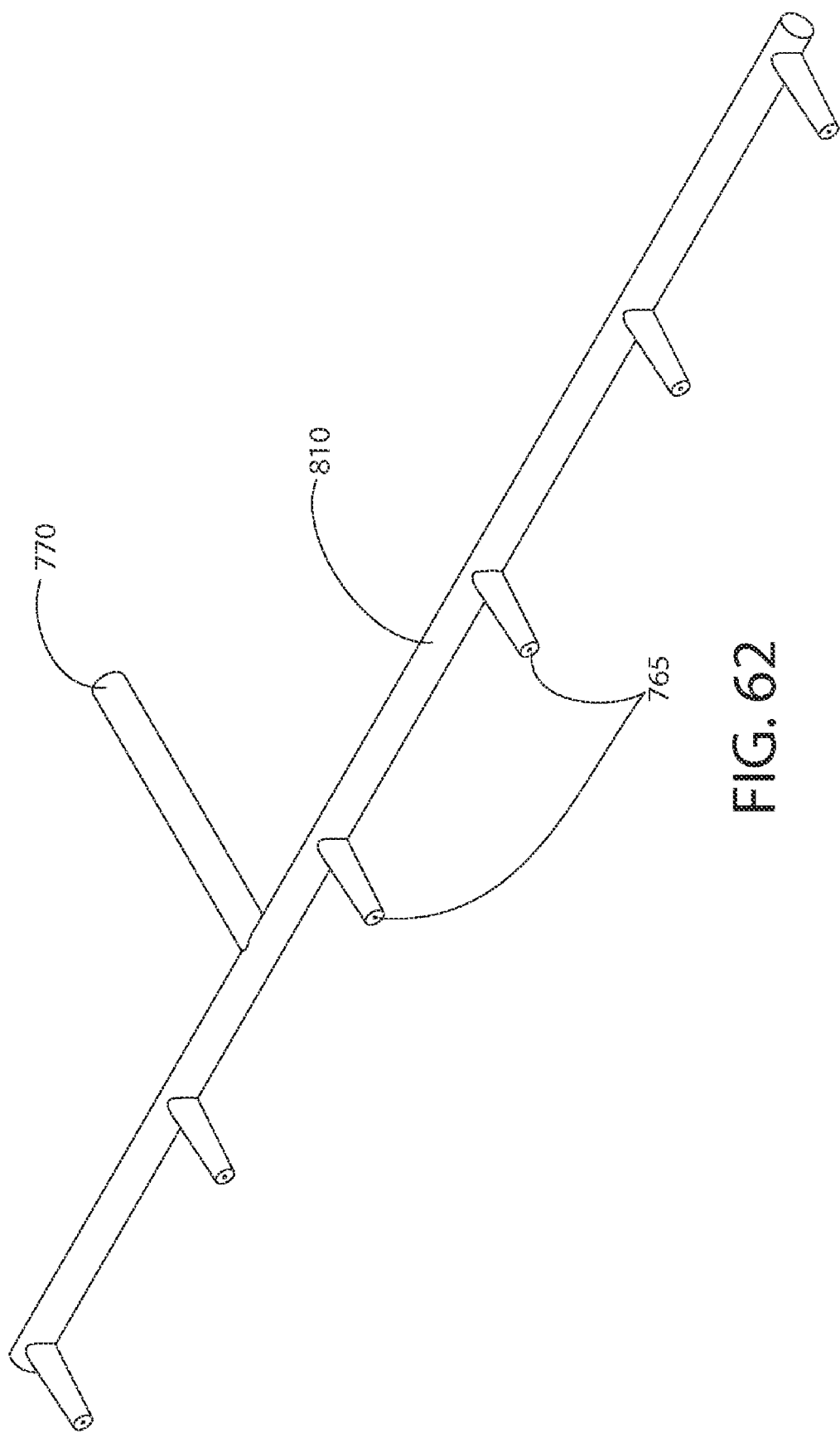
FIG. 62 provides a perspective view of an irrigation assembly for a raceway planter system according to principles of the invention.

Among the components contained in the exemplary housing 710 are irrigation components. The components include an assembly having outlet nozzles 765 and an inlet 760. The inlet 760 and outlet nozzles 765 may be fluidly coupled by a manifold 810 as shown in FIG. 62. Other components, such as timers, backflow prevention devices, control valves, filters, pressure regulators, pipes and tubing, emitters, sprayers and misters, for example, may be operably coupled to the irrigation assembly.

The housing 710 is configured to be supported by a vertical support, such as one or more poles, pedestals, columns, walls or the like. The vertical support may be fluted or non-fluted, textured or non-textured, solid or hollow, a standalone structure or an integral part of another structure such as a building, billboard or sign. The particular configuration of the vertical support is not important so long as it is suitable for supporting the housing 710 of the raceway assembly 700 at an elevation, to and from which the planter container assembly 705 may be raised and lowered.

The exemplary planter container assembly 705 is a window-box style planter container 705. The invention is not limited to a window-box style planter container 705. Rather, other shapes and configurations may be utilized and are intended to come within the scope of the invention. By way of example and not limitation, as seen in FIGS. 104-110, the ends of the planter container 705 can be aesthetically rounded rather than square as shown in the Figures. The exemplary planter container assembly 705 includes a front panel 725, side panels 730, a bottom panel and a rear panel 775. In the exemplary planter container assembly 705, at least one panel (e.g., the back panel 775) is removable to reveal a utility compartment that contains suspension and locking components. The planter container assembly 705 can be raised to, locked to, unlocked from and lowered from the housing 710 of the raceway assembly 700. A drainage port 727 and cleanout port 728 may be provided in the bottom of the planter assembly 705.

The planter container assembly 705 is raised and lowered using tethers 745, 750, (e.g., cables, rope or the like) near each corner of the planter assembly 705. One end of each tether connects to an attachment mechanism, such as a Dee-ring 740, 755, as also shown in FIG. 55. Each Dee-ring 740 includes a mounting base 741 and attachment ring 742. The opposite end of each tether is coupled directly or indirectly to a lifting mechanism such as a winch, contained in the housing 710 of the raceway assembly 700 and operated by remote control, or a manual switch near the bottom of the vertical structure.

The exemplary planter container assembly 705 includes a top lid 739 with apertures for accommodating planter pots 770 and exposing accessories such as Dee-rings 740, 755 and guides. The lid 739 may be removable or permanently attached.

Removable planter pots 770, such as the pot illustrated in FIG. 56, are inserted into apertures of the lid 739. Each removable pot 770 comprises a bottom 760 and walls 761 that define a compartment 763 for planting. Drainage ports 764 are provided at or near the bottom 760 of the pot 770. A lip or rim 762 is provided at the top of the pot. The rim 762 engages and covers the edge of the aperture in the lid 739.

This embodiment with removable pots 770 offers many unique advantages. It facilitates removal and replacement of potted plants held by the planter. This embodiment also reduces water consumption by using less soil or growing media. Additionally, this embodiment facilitates maintaining the temperature of potted plants, as the compartment beneath the lid 739 may be filled with an insulating material in the spaces between the plant pots 770. A variety of growing media can be used in each of the pots to match the needs of a plurality of plant species in each planter unit 705. Additionally, imitation plants can be firmly planted and periodically changed.

A narrow or wide roller or wheel assembly 785, 786, as shown in FIG. 58, is provided to facilitate linear vertical motion of the planter container assembly 705 in close proximity to a vertical support. The wheel assembly 785, 786 includes a mounting pad 787 and at least one rotating wheel. The mounting pad 787 attaches to the planter container assembly 705, such as to the rear panel 775 and/or to one or both side panels 730. The wheel assembly 785, 786 maintains a minimum space between the vertical support and the panel(s) to which the wheels is (are) mounted. The roller may be as wide as necessary with a variety of soft exteriors to traverse rougher vertical exteriors, such as stone or brick 786.

In addition to or in lieu of the wheel assembly 785, a sliding pad may be used to maintain spacing and facilitate vertical movement. The pads may be comprised of a durable material that exhibits a low frictional coefficient in relation to the contacted vertical support material. By way of example, and not limitation, replaceable acrylonitrile butadiene styrene (ABS), polytetrafluoroethylene (PTFE) or polyvinyl chloride (PVC) pads may be used with a steel, aluminum, wood or concrete vertical support. Alternatively, the tethers may serve as guides.

A registration guide assembly 790 includes a male pin 791 and a female receptacle 793. The female receptacle 793 may be attached to either the planter container assembly 705 or the housing 710 of the raceway assembly 700. The male pin 791 may be attached opposite the female receptacle 793 on either the planter container assembly 705 or the housing 710 of the raceway assembly 700, and in corresponding alignment with the female receptacle 793. When the planter container assembly 705 is raised to the housing 710 of the raceway assembly 700, a conical male extension 792 of the male pin 791 enters into a corresponding cavity 794 in the female receptacle 793. Thus, the female receptacle 793 engages the male pin 791. Upon engagement, the mating male pin 791 and female receptacle 793 resist rattling and misalignment. Mating engagement helps ensure proper alignment for locking and unlocking. Additionally, mating engagement helps resisting twisting forces from wind.

Figure 52:
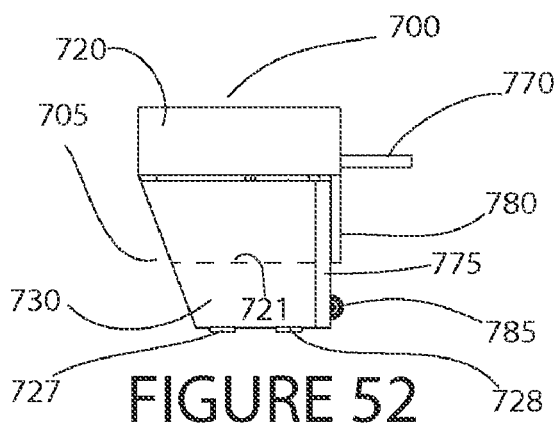
FIG. 52 provides a profile view of an exemplary raceway planter system with a planter assembly in a releasing position according to principles of the invention.
Figure 53:
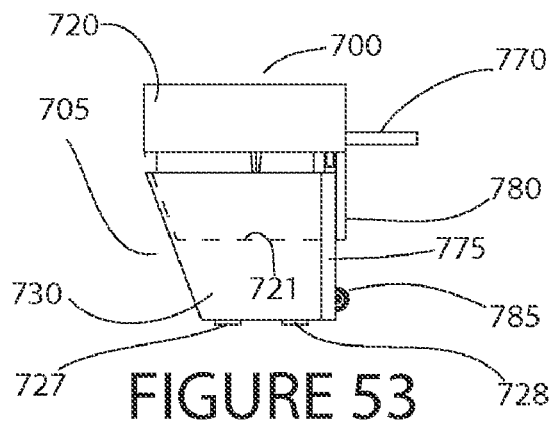
FIG. 53 provides a profile view of an exemplary raceway planter system with a planter assembly in a locked position according to principles of the invention.
Figure 54:
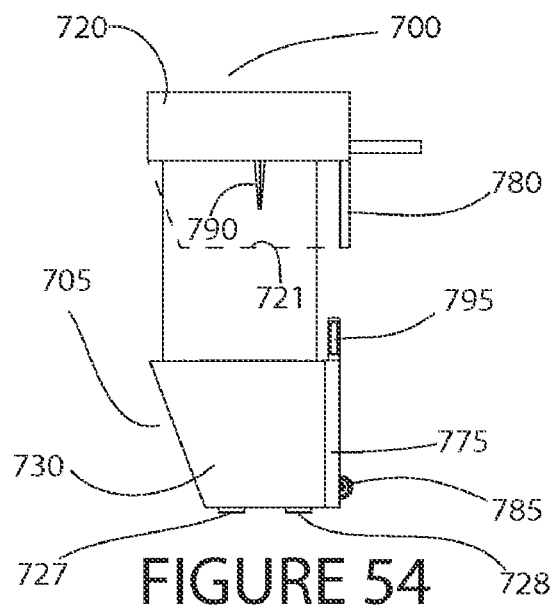
FIG. 54 provides a profile view of an exemplary raceway planter system with a planter assembly in a lowered position according to principles of the invention.

Referring now to FIGS. 49 through 54, perspective and profile views of the planter container assembly 705 and the housing 710 of the raceway assembly 700 in various positions are provided. In FIG. 52, the planter container assembly 705 is raised to an unlocking position relative to the housing 710 of the raceway assembly 700. In FIG. 53, the planter container assembly 705 is illustrated in a locked position relative to the housing 710 of the raceway assembly 700. In FIG. 54, the planter container assembly 705 is in an unlocked lowered position relative to the housing 710 of the raceway assembly 700. The planter container assembly 705 may be raised from the unlocked lowered position to the locked position, and then raised further to the unlocking position, and then lowered. Drainage apertures 727 and clean out plugs 728 are located in the bottom of the planter container assembly 705.

Figure 59:
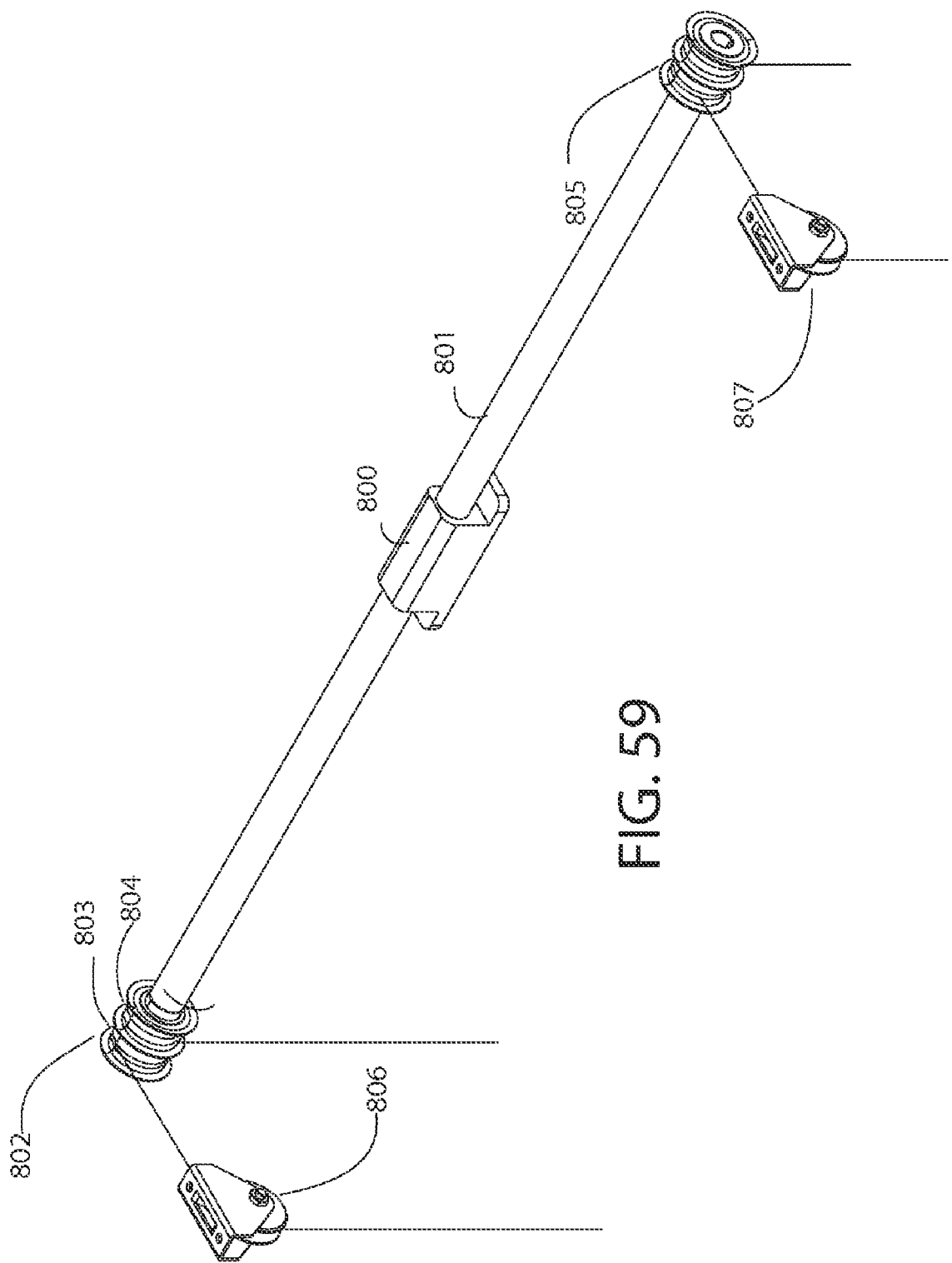
FIG. 59 provides a perspective view of an exemplary pulley and drivetrain assembly for a raceway planter system according to principles of the invention.

Referring now to FIG. 59, a winch and pulley assembly for the housing 710 of the raceway assembly 700 is shown. A winch 800 rotates drive shaft 801. Rotation of the drive shaft 801 rotates right and left dual spool assemblies 802, 805. Each dual spool assembly 802, 805 includes a pair of spools 803, 804, one spool 804 for the rear and the other spool 803 for the front. A tether (e.g., cable, rope, chain or other means of suspension suitable for winding) is wound around each spool. The tether from each front spool, extends forwardly to a corresponding pulley 806, 807. Therefore, rotation of the winch 800, winds or unwinds all tethers simultaneously. As all spools have the same diameter, the unwound portions of the several tethers are extended or retracted evenly.

Referring now to FIGS. 60 and 61, a back panel 775 of the planter container assembly 705 and alternative locking mechanism are illustrated. The back panel 775 is removable to reveal a utility compartment that contains suspension and locking components. The alternative locking mechanism comprises a solenoid 808 with a movable locking pin 809 and a corresponding female receptacle 795 for the locking pin 809. The female receptacle 795 is attached to or near the top edge of the back panel 775 of the planter container assembly 705. The solenoid 808 is attached to the housing 710 of the raceway assembly 700. When the planter container assembly 705 is raised to the housing 710 of the raceway assembly 700, the locking pin 809 of the solenoid 808 is extended through an elongated slot in the female receptacle 795. The locking pin

809 may be extended electronically, such as by actuating a switch or other sensor that defines the locking position. Alternatively, a locking pin may be mechanically actuated such as by pulling a cord or moving a slider. In an electronic embodiment, a switch or sensor may detect when the planter container assembly 705 is raised to the locking position relative to the housing 710 of the raceway assembly 700. At that point, the switch or sensor may generate a signal that activates the solenoid 808. Upon activation, the locking pin 809 of the solenoid 808 attached to the housing 710 of the raceway assembly 700 is extended through the slot in the female receptacle 795 attached to the back panel 775 of the planter container assembly 705. An unlock switch may retract the locking pin 809 of the solenoid 808, releasing it from the elongated slot in the female receptacle 795. Other locking mechanisms, include the mechanical locking mechanisms described herein may be used with the raceway embodiment in lieu of or in addition to the solenoid locking mechanism.

Still referring to FIG. 61, the back panel 775 includes guides. For example, in the embodiment shown in FIG. 61, rollers 785 or 786 protrude through apertures in the back panel. Alternatively, or in addition to the rollers 785 or 786, brushes 784 or other spacing and sliding devices are attached to the back panel 775. The brushes 784 or similar structures maintain a space between the planter container assembly 705 and the vertical support. The brushes 784 can be a continuous horizontal band at the bottom as well.

Figure 63:
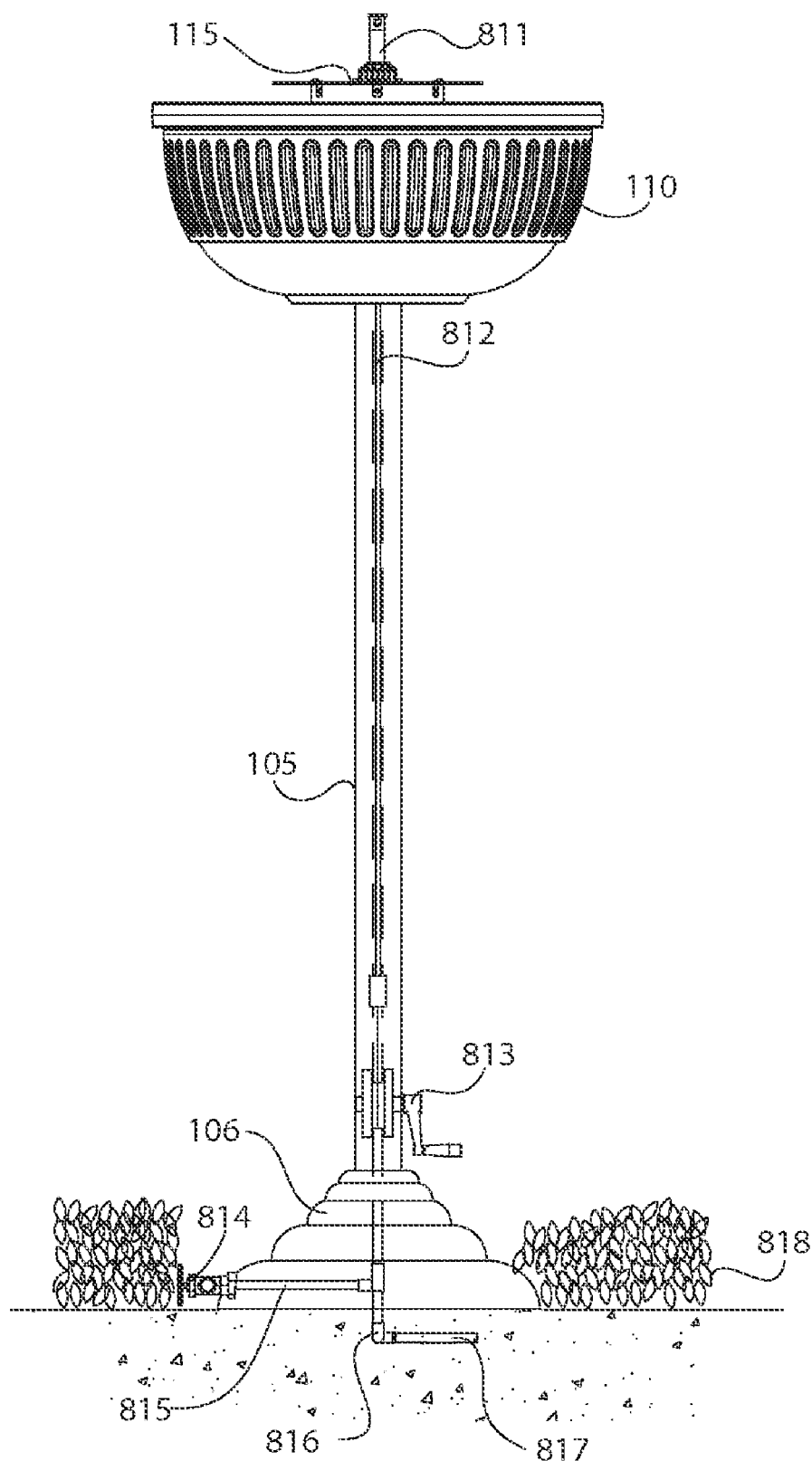
FIG. 63 provides a front view of an exemplary planter assembly conceptually showing certain internal components, including plumbing and winch components, according to principles of the invention.

Referring now to FIG. 63, a manually operated embodiment is shown. A manually operated winch with a handle 813 for cranking is provided. Tethers 812 extend through the vertical support pole 105. The pole is mounted to a support base 160. Alternative base substructures can be used as direct embedment, anchor bolting of the base to a concrete in ground base and others. This particular embodiment also reveals alternative water supplies. One supply is a hose bibb 814, to which a water supply line, such as a garden hose, may be connected. Opening the valve of the hose bibb 814 allows water to flow from a hose into the plumbing 815 of the planter assembly, to supply water to a sprinkler 811 and drip plate 115. The sprinkler may irrigate the plants in the planter and/or surrounding terrain and vegetation 818. As an alternative water supply source, the planting assembly may have a sprinkler system style plumbing connection comprising one or more pipes (e.g., PVC pipes) connected to an elbow 816 or Tee-fitting with a pipe extending vertically through the support pole 105 to supply water to the sprinkler, fountain distribution head and/or mister 811 and drip plate 115. In this embodiment, the supply of water may be controlled using conventional sprinkler controllers and solenoid valves.

Referring now to FIGS. 64 through 71, various alternative mechanical locking mechanisms are shown. These mechanisms illustrate the types of locking mechanisms that may be used, in addition to or in lieu of the catch hook locking mechanism described above with reference to FIGS. 32 through 34. In each case, the mechanical locking mechanism responds to vertical linear motion of the carriage assembly 400 relative to the collar assembly 222, pole, or vertical structure, or of the planter container assembly 705 relative to the housing 710 of the raceway assembly 700. Each mechanical locking mechanism includes one or more movable components that controllably engages and disengages a stationary component. The movable component may be mounted on either a carriage assembly 200, or 400, or a collar assembly 222, or a pole, or a vertical structure, or a planter container assembly 705 or housing 710 of a raceway assembly 700. The stationary component may be attached to the other of the carriage assembly 200, or 400 or a collar assembly 222, or pole, or a vertical structure or the planter container assembly 705 or housing 710 of a raceway assembly 700. Movement of the a carriage assembly 400 relative to the collar assembly 222, or pole, or vertical structure, or the planter container assembly 705 relative to the housing 710 of a raceway assembly 700, provides the motion needed to move the movable component into a locked and then into an unlocked position as the moveable component engages the stationary component. These locking systems may also be implemented to prevent contact with the normally exposed part of vertical structure thereby reducing visible marking and scratching.

Using any of these locking mechanisms or the catch hook locking mechanism described above with reference to FIGS. 32 through 34, provides several advantages. First and foremost, the locking mechanism provides a dedicated lock to support a potentially heavy planter. If a winch is used as a raising or lowering means, the lock on the winch may provide a backup lock. Second, the locking mechanism relieves the raising and lifting means and lanyards and tethers and related hardware of prolonged stresses and strains which may otherwise deform the components and/or shorten their useful life. For example, metal cables that are stressed for prolonged periods of time tend to resist coiling on a spool. Third, the mechanical locking mechanism operates automatically, without the need of manipulation from a user. Vertical movement of the movable component relative to and in engagement with the stationary component is all that is needed to achieve locking and unlocking. Fourth, it provides safety and security in high winds and protects against vandalism.

Figure 64:
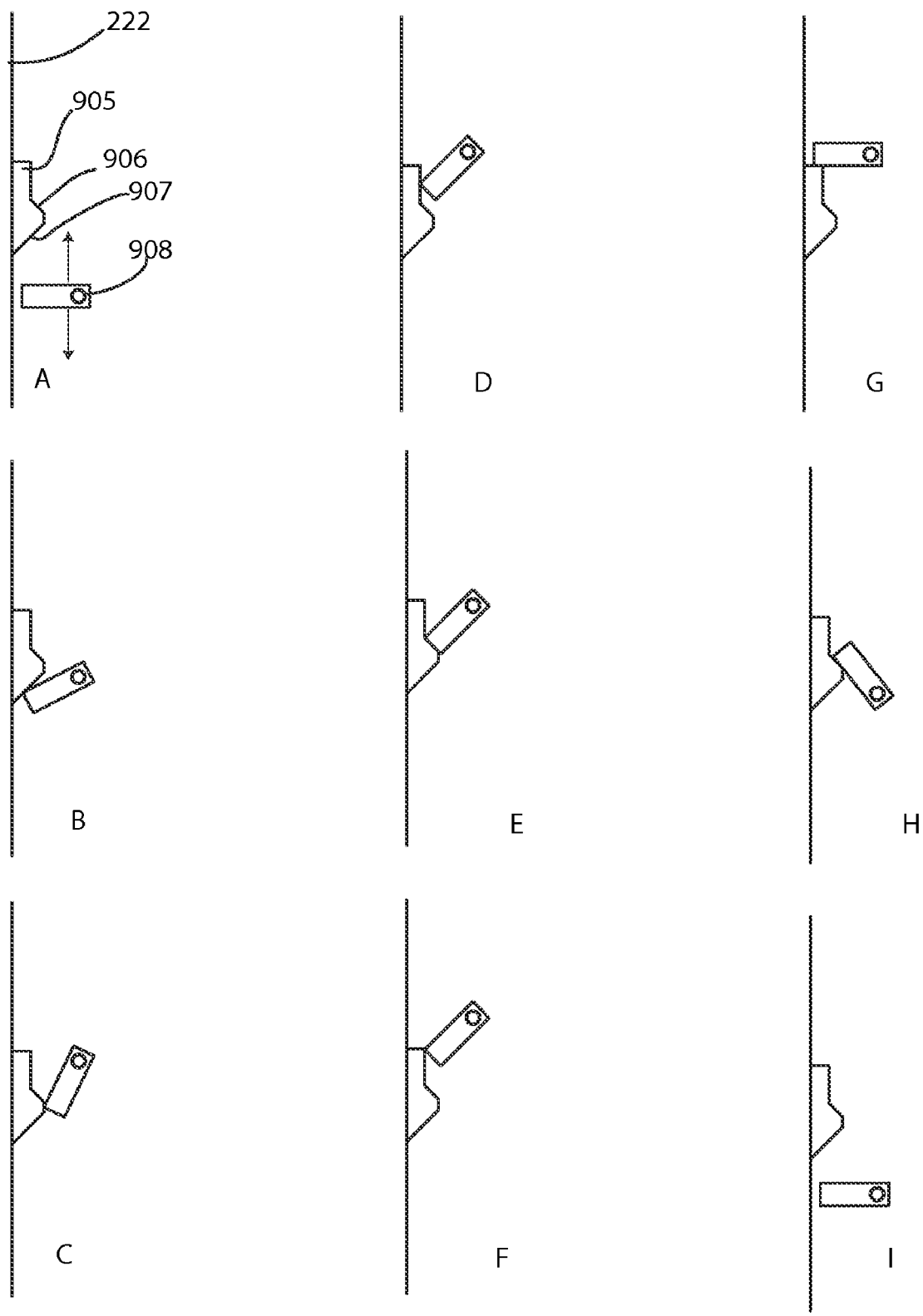
FIG. 64 provides a schematic flowchart of a sequence of steps for an exemplary locking mechanism according to principles of the invention.

With reference to FIG. 64, an embodiment with a stationary bracket 907 having a slanted locking surface 906 and a topmost unlocking corner 905 is shown. The bracket is mounted to a structure, such as (but not limited to) a collar assembly 222. A pivoting support pin 908 is mounted to the carriage assembly 400 in alignment with the bracket 907 so that the support pin 908 engages the bracket 907 when the carriage assembly 400 is raised to a locking position. The pivoting support pin 908 is shown moving into a locking position during upward movement relative to the bracket in steps A through E. In step E, the mechanism is locked, thereby supporting the planter assembly. Further upward movement, as shown in steps F through G pivots the support pin 908 into an unlocked position, which allows downward movement as in steps H and I. The pin 908 would include a spring wire to keep it perpendicular at the A and I sequence and to provide the tension necessary if moved up or down to move into each stage and position. The system would also work in reverse positions if the pin 908 were located on the collar or other stationary vertical structure and the stationary bracket were flipped over in the reverse top and bottom position.

Figure 65:
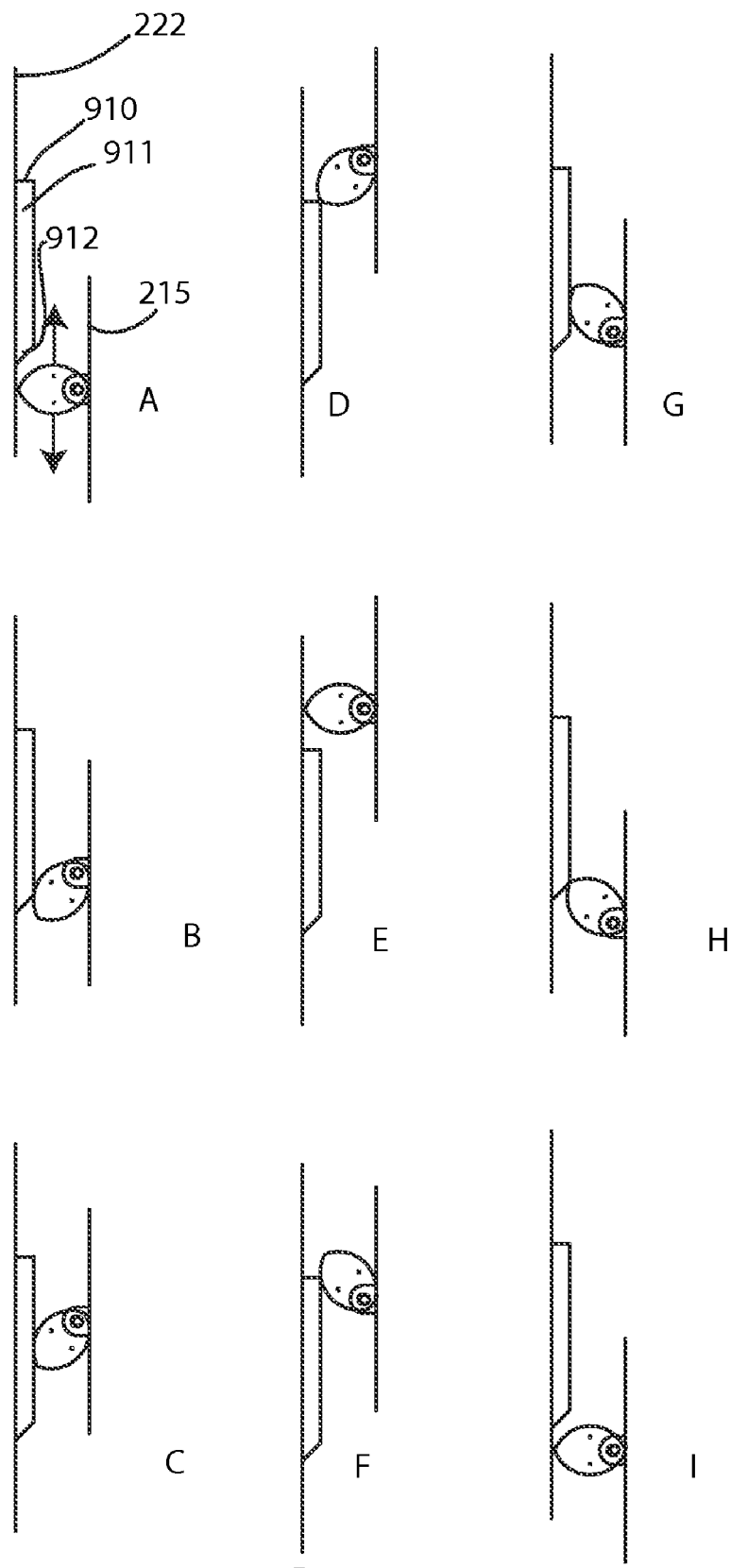
FIG. 65 provides a schematic flowchart of a sequence of steps for an exemplary locking mechanism according to principles of the invention.

With reference to FIG. 65, an embodiment with a stationary bracket 911 having a slanted locking surface 912 and a topmost unlocking corner 910 is shown. The bracket is mounted to a structure, such as (but not limited to) a collar assembly 222. A pivoting support cam is mounted to the carriage assembly 400 in alignment with the bracket 912 so that the support cam engages the bracket 912 when the carriage assembly 400 is raised to a locking position. The pivoting support cam is shown moving into a locking position during upward movement relative to the bracket in steps A through C. In step C, the mechanism is locked, thereby frictionally supporting the planter assembly. Downward movement is resisted. Further upward movement, as shown in steps D through E pivots the support cam into an unlocked position, which then allows downward movement as in steps F through I. With a spring holding the cam at the A and I position, the locking mechanism would work in reverse with the bracket upside down and mounted on the carriage assembly.

Figure 66:
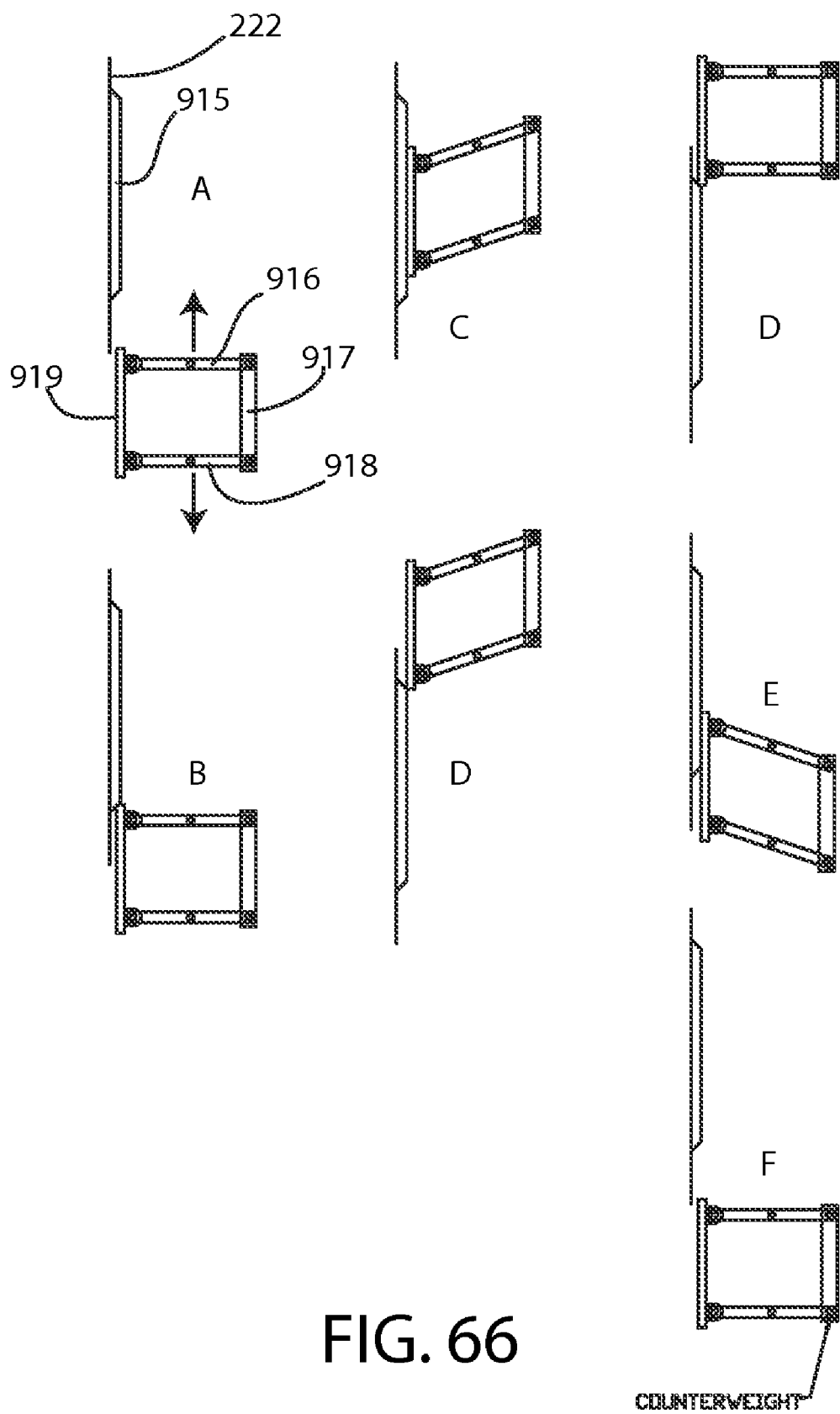
FIG. 66 provides a schematic flowchart of a sequence of steps for an exemplary locking mechanism according to principles of the invention.

With reference to FIG. 66, an embodiment with a stationary bracket 915 having a slanted lower locking surface and a topmost unlocking surface is shown. The bracket 915 is mounted to a structure, such as (but not limited to) a collar assembly 222. A pivoting support truss is mounted to the carriage assembly 400 in alignment with the bracket 915 so that the support truss engages the bracket 915 when the carriage assembly 400 is raised to a locking position. The pivoting support truss is shown moving into a locking position during upward movement relative to the bracket in steps A through C. In step C, the mechanism is locked, thereby frictionally supporting the planter assembly. Downward movement is resisted. Further upward movement, as shown in steps D through E pivots the support truss into an unlocked position, which then allows downward movement as in steps F through G. This unit would perform in reverse by switching the position of the bracket and support truss from the carriage assembly and the vertical structure.

Figure 67:
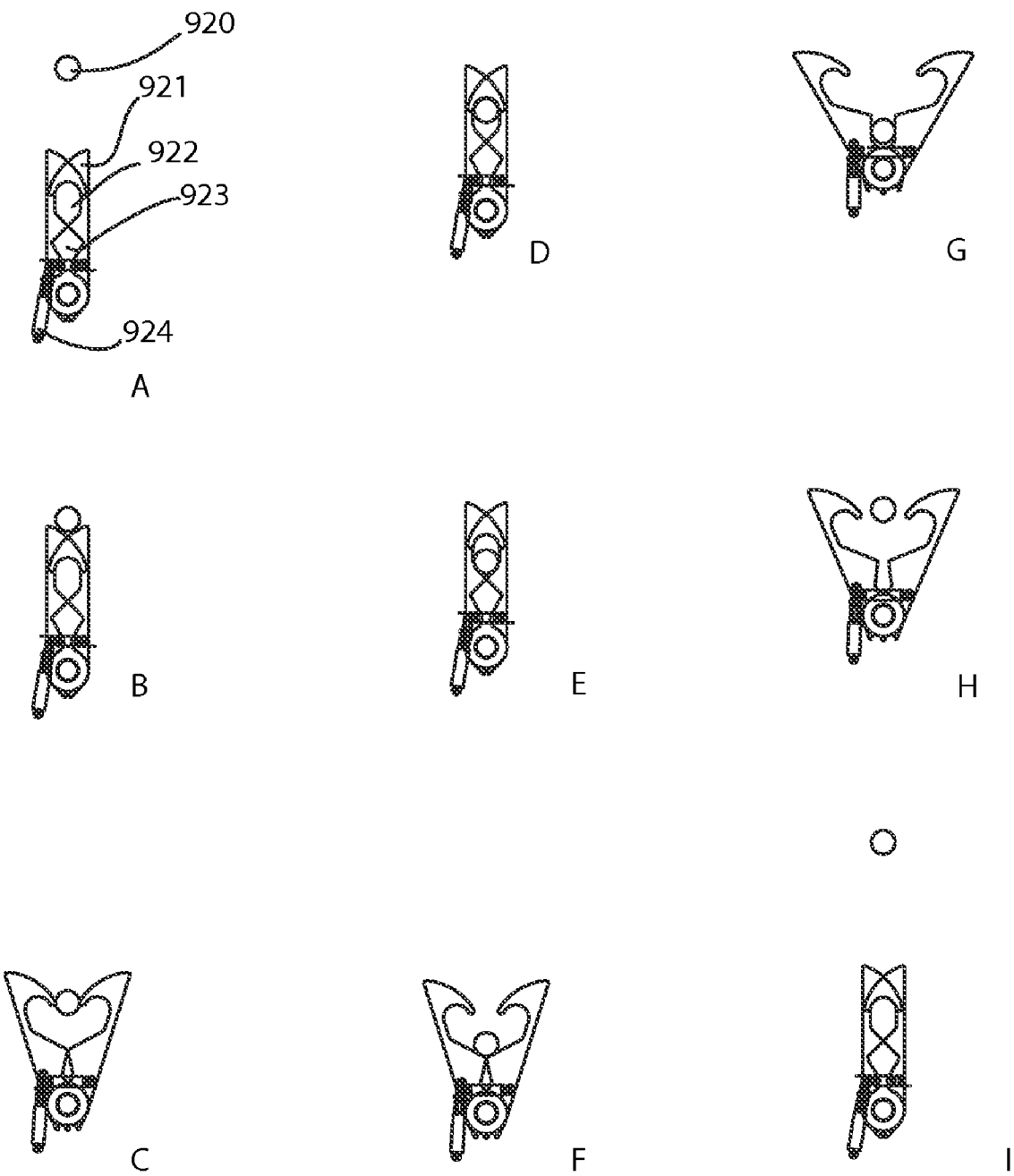
FIG. 67 provides a schematic flowchart of a sequence of steps for an exemplary locking mechanism according to principles of the invention.

With reference to FIG. 67, an embodiment with a stationary pin 920 is shown. The pin 920 is mounted to a structure, such as (but not limited to) a collar assembly 222. A pivoting hooked jaw assembly is mounted to the carriage assembly 400 in alignment with the pin 920 so that the jaw assembly engages the pin 920 when the carriage assembly 400 is raised to a locking position. The pivoting jaw assembly includes angled leading edges 921 to urge the jaws open upon encountering the pin, a biasing and damping means 924 to slowly urge the jaws closed, a hook 922 to engage the pin 920 when locked, and a disengagement surface to force the jaws open and allow release upon unlocking. The pivoting jaw assembly is shown moving into a locking position during upward movement relative to the pin in steps A through D. In step D, the mechanism is locked (i.e., hooked on the pin), thereby supporting the planter assembly. Downward movement is resisted. Further upward movement, as shown in steps D through G pivots the jaw assembly into an open and unlocked position. Because the biasing and damping means slowly closes the jaws, enough time is permitted to allow downward movement past the pin 920 as in steps H through I. This unit could be reversed with the pin and jaw assembly switched on either the carriage assembly or the vertical structure with the jaw assembly flipped up or down.

Figure 68:
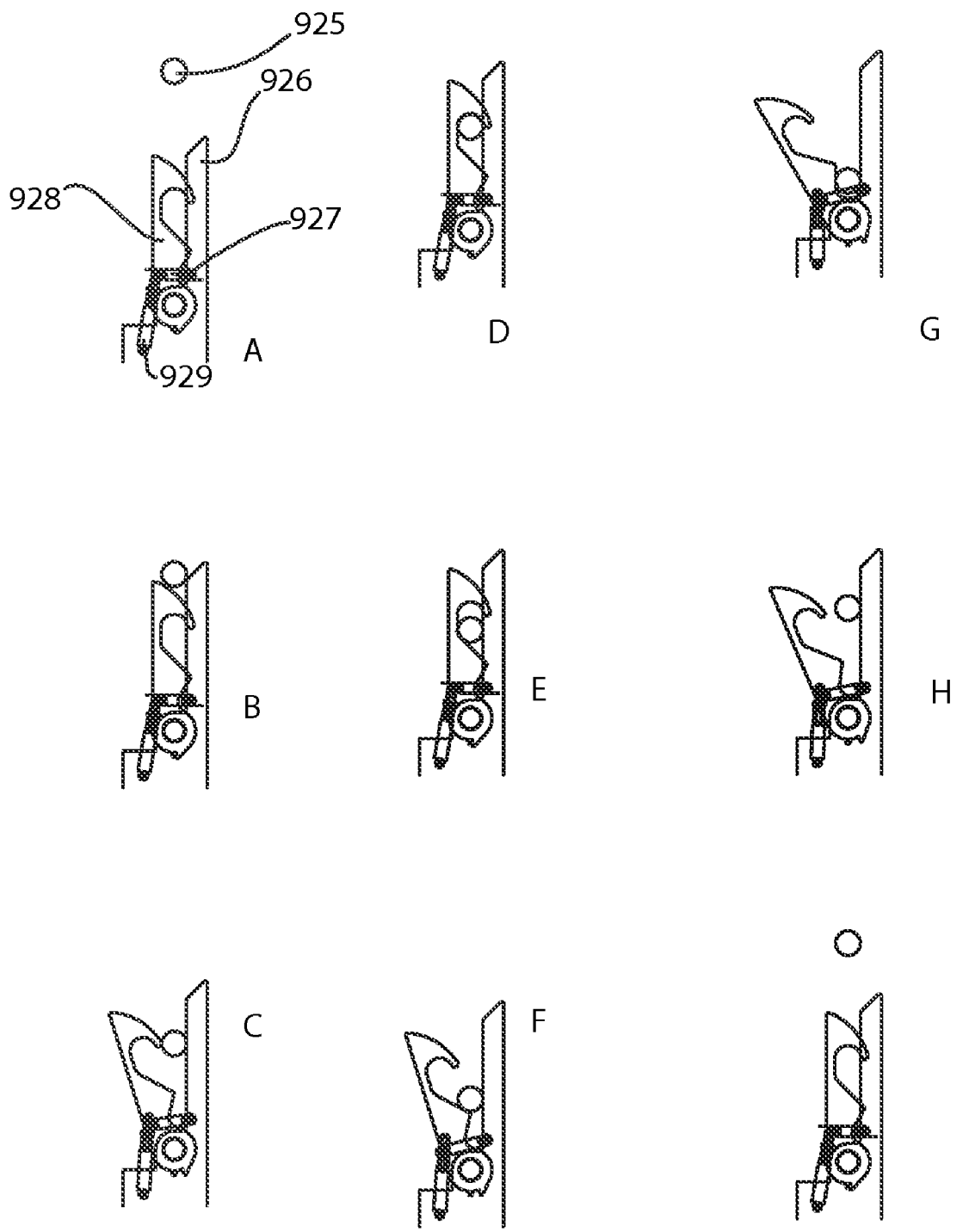
FIG. 68 provides a schematic flowchart of a sequence of steps for an exemplary locking mechanism according to principles of the invention.

With reference to FIG. 68, another embodiment with a stationary pin 925 is shown. The pin 925 is mounted to a structure, such as (but not limited to) a collar assembly 222. A pivoting hooked jaw assembly is mounted to the carriage assembly 400 in alignment with the pin 925 so that the jaw assembly engages the pin 925 when the carriage assembly 400 is raised to a locking position. The pivoting jaw assembly includes one pivoting jaw 928 with an angled leading edge to urge the jaw open and away from its base 926 upon encountering the pin 925, a biasing and damping means 927 to slowly urge the jaw closed, a hook to engage the pin 925 when locked, and a disengagement surface to force the jaws open and allow release upon unlocking. The pivoting jaw assembly is shown moving into a locking position during upward movement relative to the pin in steps A through D. In step D, the mechanism is locked (i.e., hooked on the pin), thereby supporting the planter assembly. Downward movement is resisted. Further upward movement, as shown in steps E through G pivots the jaw assembly into an open and unlocked position. Because the biasing and damping means slowly closes the jaws, enough time is permitted to allow downward movement past the pin 925 as in steps H through I. This unit can work in reverse positions of up or down in relationship to mounting on the carriage assembly or vertical structure.

Figure 69:
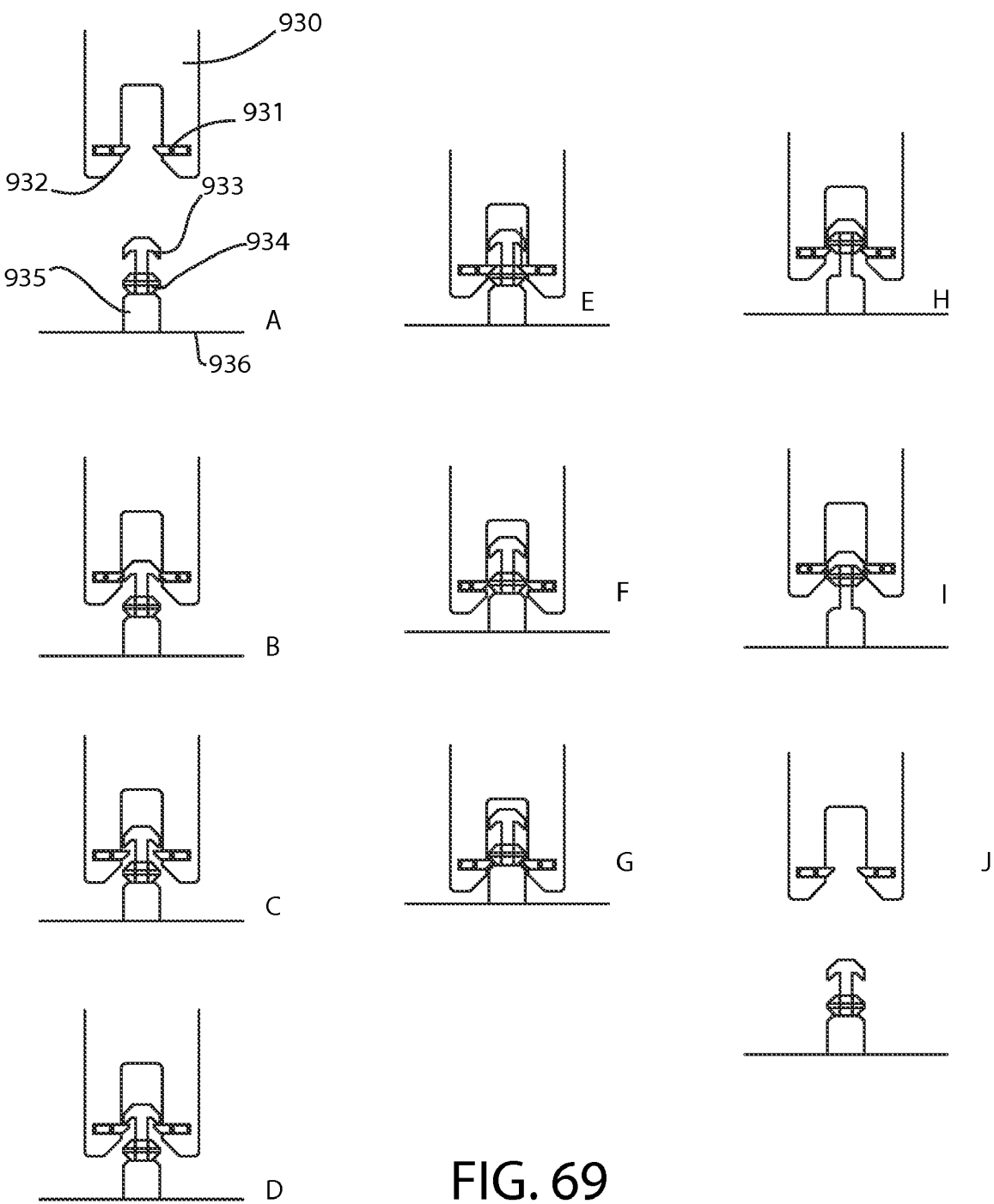
FIG. 69 provides a schematic flowchart of a sequence of steps for an exemplary locking mechanism according to principles of the invention.

With reference to FIG. 69, a male-female embodiment is shown. A male pin 935 is mounted to a structure 936, such as (but not limited to) a collar assembly 222, or 400 or a planter container assembly 705 or housing 710 of a raceway assembly 700 (i.e. reverse flipped, the lock can be used as shown or turned upside down and attached to the opposite assembly part). The male pin includes an angled head 933, a shaft and a sliding bushing 934 with chamfered sides slidingly disposed on the shaft. A female receptacle 930 includes a chamfered opening 932 and laterally sliding spring biased engagement pins 931 or a C-clamp. The male pin is shown moving into a locking position during upward movement relative to the pin in steps A through D. In step B, the angled head of the male pin urges the pins 931 or C-clamp open. In step D, the mechanism is locked, thereby supporting the planter assembly. Downward movement is resisted. Further upward movement, as shown in steps E through G causes the bushing to urge the pins 931 or C-clamp open and hold them in an open and unlocked position until the head is removed from the receptacle as in steps H through J.

Figure 70:
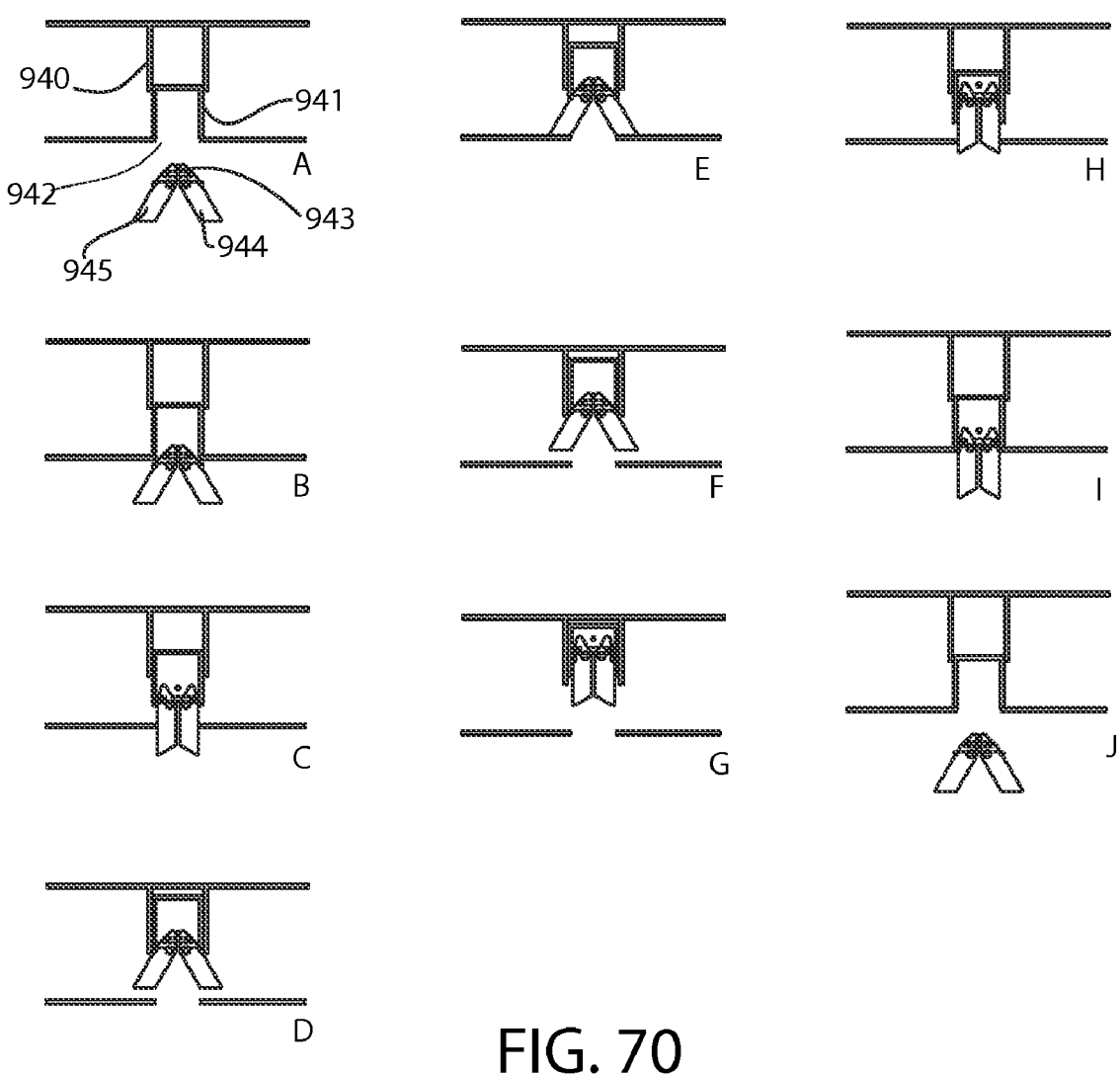
FIG. 70 provides a schematic flowchart of a sequence of steps for an exemplary locking mechanism according to principles of the invention.

With reference to FIG. 70, another male-female embodiment is shown. A male jaw assembly 943 is mounted to a structure 936 (not shown), such as (but not limited to) the planter container assembly 705 or housing 710 of a raceway assembly 700. The male jaw assembly includes a hinge biasing arms 944 and 945 of the jaw assembly 943 into an open position as shown in step A. A female receptacle 940 includes a telescoping sleeve 941 and a wall 942. The jaw assembly is shown moving into a locking position during upward movement relative to the female receptacle in steps A through E. In steps C and D, the jaws urge the sleeve 941 into the receptacle 940. This allows the jaws to flex open and be supported by the wall as in step E. In step E, the mechanism is locked, thereby supporting the planter assembly. Downward movement is resisted. Further upward movement, as shown in steps F through G cause the jaws to close in the sleeve, which holds them in an closed and unlocked position until the jaws are removed from the receptacle as in steps H through J.

Figure 71:
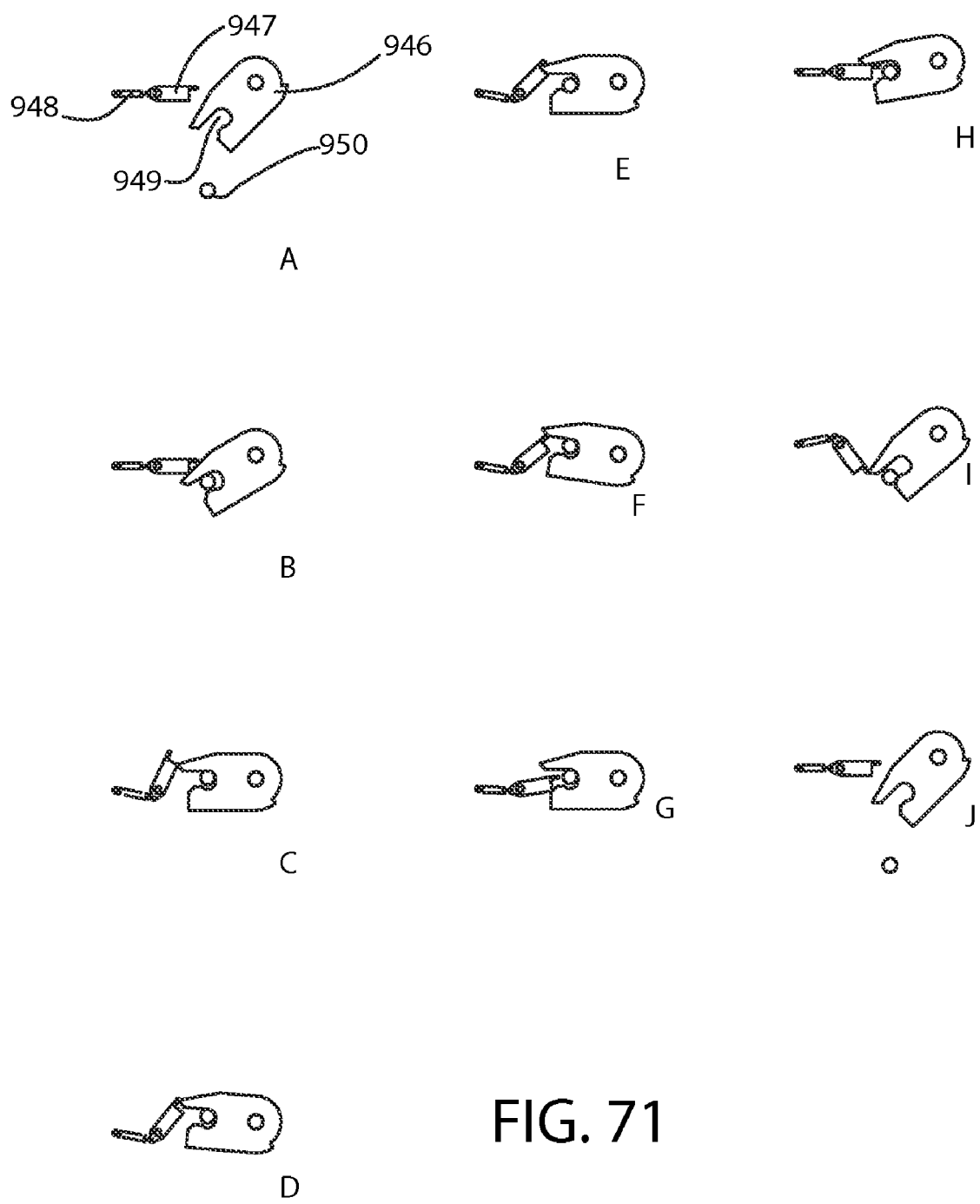
FIG. 71 provides a schematic flowchart of a sequence of steps for an exemplary locking mechanism according to principles of the invention.

With reference to FIG. 71, an embodiment with a stationary pin is shown. The pin 950 is mounted to a structure, such as (but not limited to) the carriage assembly 400, in which case the pin is stationary relative to the structure upon which it is mounted. A pivoting support claw and biased pawl 947 with a support arm 948 are mounted to the opposite of the collar 222 or carriage assembly 400 in alignment with the pin 950 so that the support claw engages the pin 950 when the carriage assembly 400 is raised to a locking position. The pivoting pawl 947 catches the top arm of the support claw in the locked position, as in step D. The pivoting support claw is shown moving into a locking position during upward movement relative to the pin 950 in steps A through E. In step E, the mechanism is locked, thereby supporting the planter assembly. Downward movement is resisted. Further upward movement, as shown in step F releases the pawl and pivots the support claw into an unlocked position, which then allows downward movement as in steps G through J.

Figure 72:
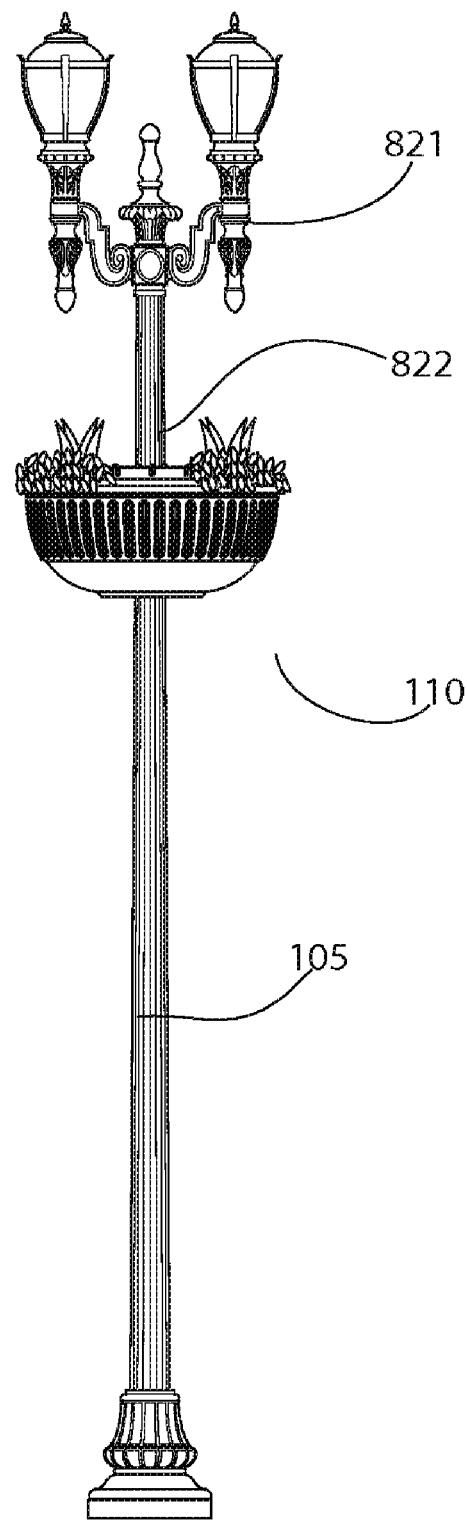
FIG. 72 provides a front view of an exemplary planter assembly with a light assembly according to principles of the invention.
Figure 73:
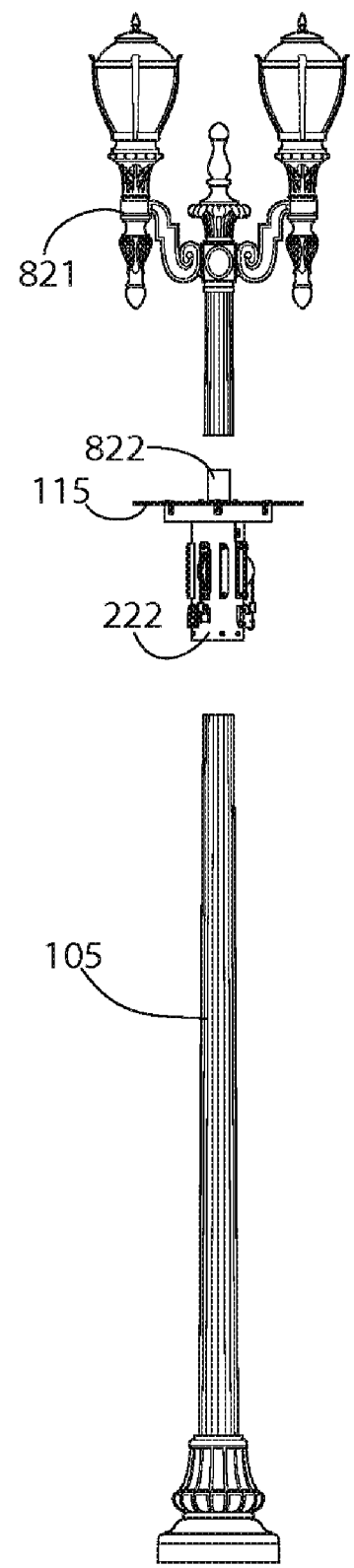
FIG. 73 provides a front exploded view illustrating components of an exemplary planter assembly with a light assembly according to principles of the invention.
Figure 74:
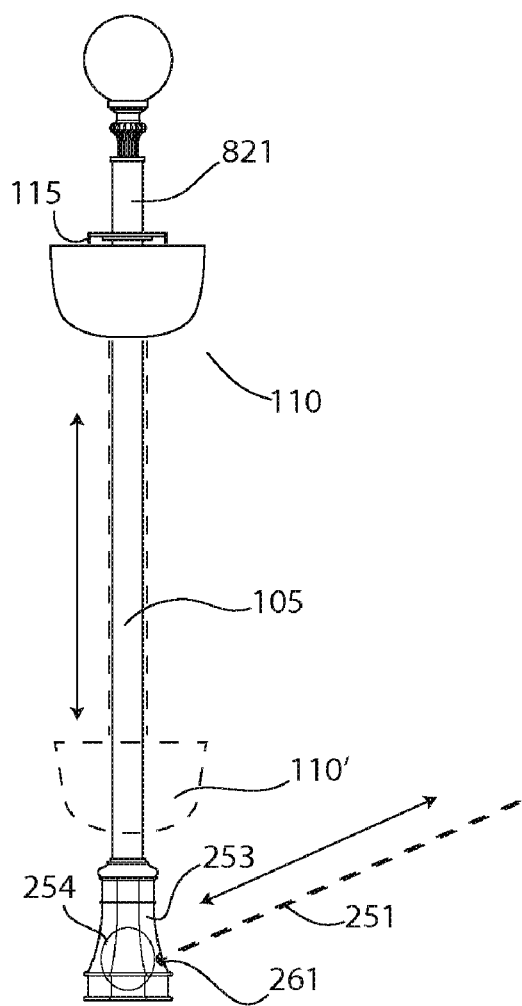
FIG. 74 provides a front view of another exemplary planter assembly with a light assembly and manually drawn tether according to principles of the invention.
Figure 75:
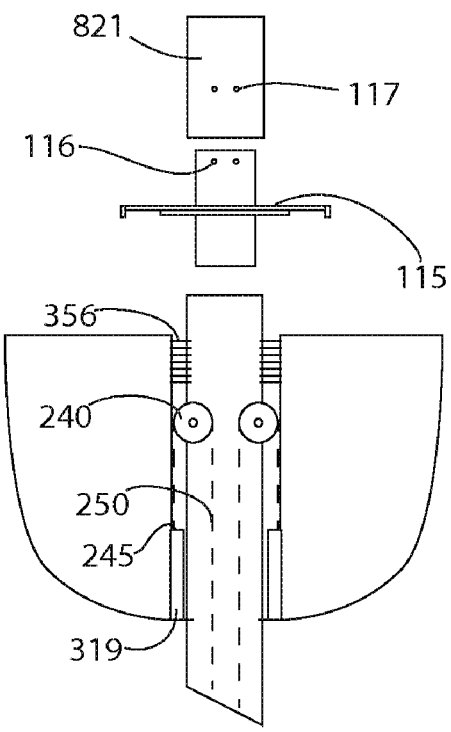
FIG. 75 provides a front view illustrating components of an exemplary planter assembly without a latching system according to principles of the invention.
Figure 77:
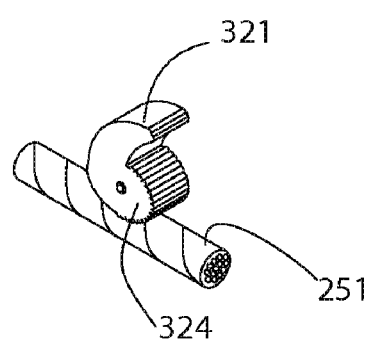
FIG. 77 provides a perspective view illustrating components of a tether cam lock assembly according to principles of the invention.

Referring now to FIGS. 72 and 73, an embodiment with a light assembly 821 is shown. The light assembly includes a support pole that mates over a tenon 822 at the top of the collar assembly 222, above the drip plate 115. Electrical wiring may run through conduit in the support pole 105.

In FIGS. 74 through 77 another embodiment with a light assembly 821 is shown. The system is relatively small, well suited for residential use, and easily operated manually, such as by hand halyard. Again, the light assembly 821 includes a pole joined to a drip plate assembly by a union 821, with corresponding mounting holes 117, 116. In this embodiment, the planter is manually raised and lowered and locked using a pulley, tether and a tether cam lock. A removable access panel 245 provides access to the interior of the base 253. A tether 251 is routed under a pulley 322 adjacent to a cam lock 324 on a pulley support assembly 323. The cam lock 324 has a lever 321. The tether is coupled to the lanyards 250 that pass over pulleys 240 rotatably mounted to the support pole 105. The lanyards 250 connect to the planter 110 with couplings 245 bristles or brushes 356, gaskets or slides 319 guide the planter relative to the pole 105. The cam lock is pivotable from an unlocked position that allows sliding movement of the tether 251 to a locked position that resists such sliding movement. The cam lock includes a cam-like body with a textured (e.g., ribbed) gripping surface. In the locked position, the lobe of the cam, which has the textured surface, engages the tether 251. The cam lock is configured so that further pulling of the tether when the cam lock is in a locked position does not release the cam lock 324. Rather, the lever 321 must be manipulated to release the cam lock 324. Excess tether is stored inside the base which can also include a cleet as necessary.

Figure 76:
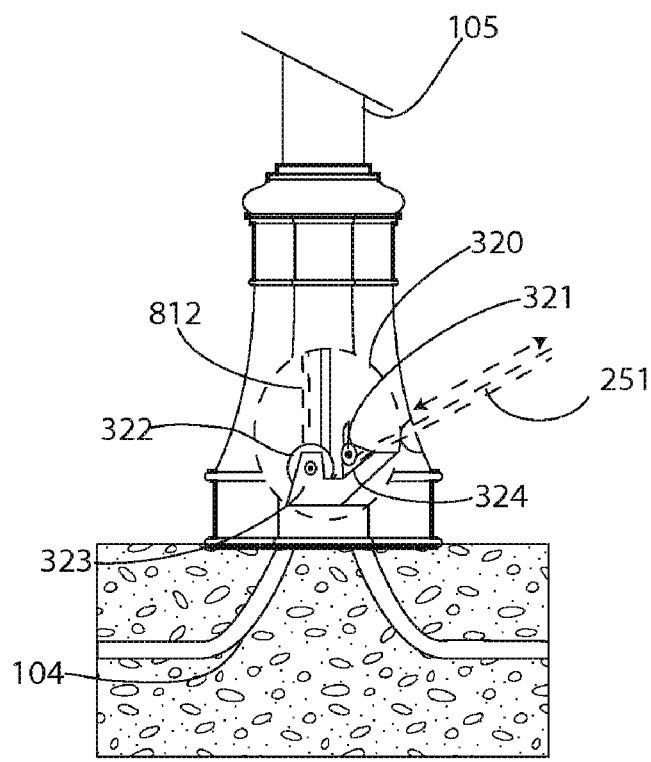
FIG. 76 provides a front view illustrating components of a base of a planter assembly with a manually drawn tether according to principles of the invention.

Also shown in FIG. 76 is a flexible curved conduit 104, or sweep embedded in the ground or other substrate. This configuration allows easy installation of flexible wires for lighting and irrigation.

Figure 78:
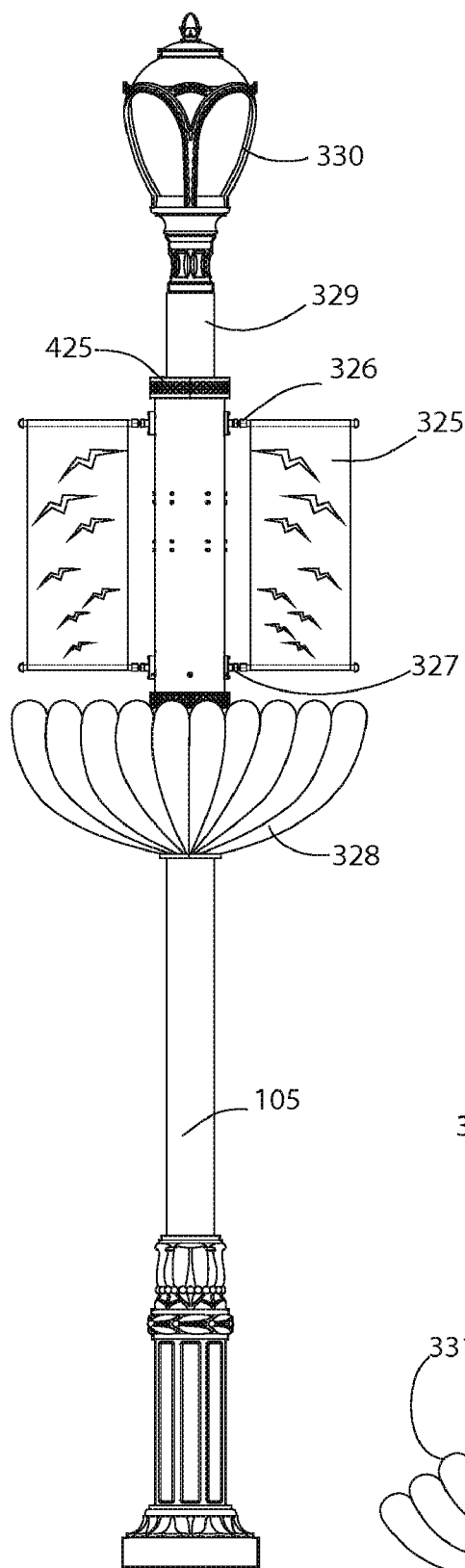
FIG. 78 provides a front view illustrating a planter assembly with a banner assembly according to principles of the invention.

In FIGS. 78 a front view and 79 a side view, the planter system on a lighting pole features embodiments with multi-section 331 and 332, planter assemblies 328 and banners 325. Hangers or banner arms 326 and 327 are removably mounted to the carriage assembly 400. A banner 325 is hung, supported or suspended by each pair of hangers or banner arms 326 and 327. Thus, the planter system supports the planter 328 and accessories, such as the banners. The banners and arms, or hangers may be readily changed or removed upon lowering the carriage 400. This particular embodiment also includes a light assembly 330 with a coupled light mounting post 329.

Figure 80:
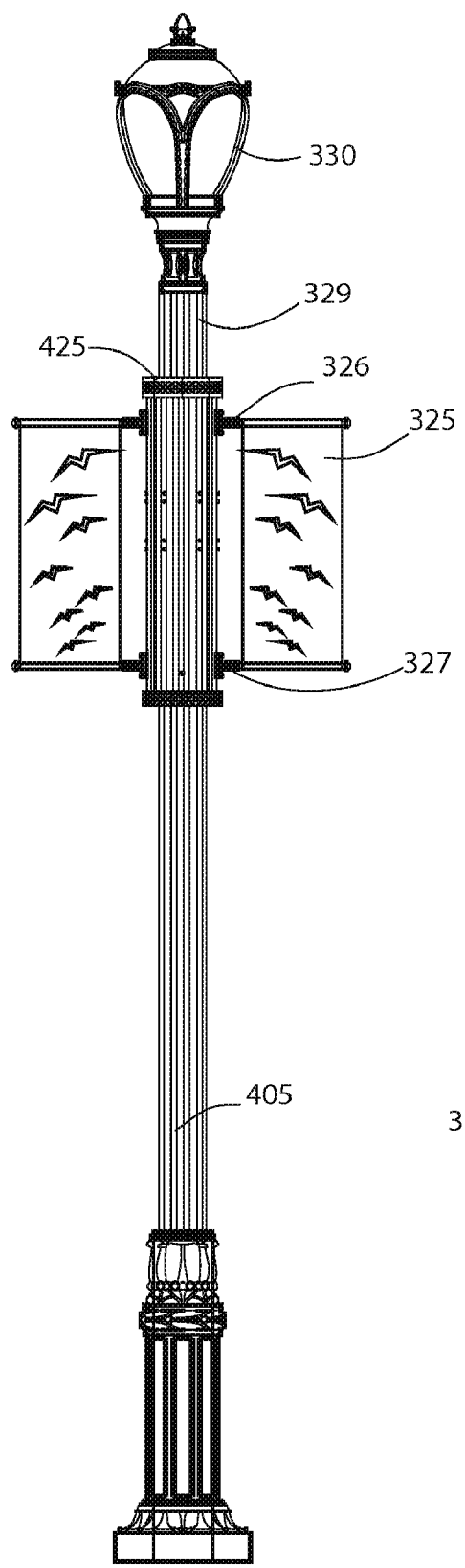
FIG. 80 provides a front view illustrating a banner assembly attached to a carriage assembly according to principles of the invention.
Figure 81:
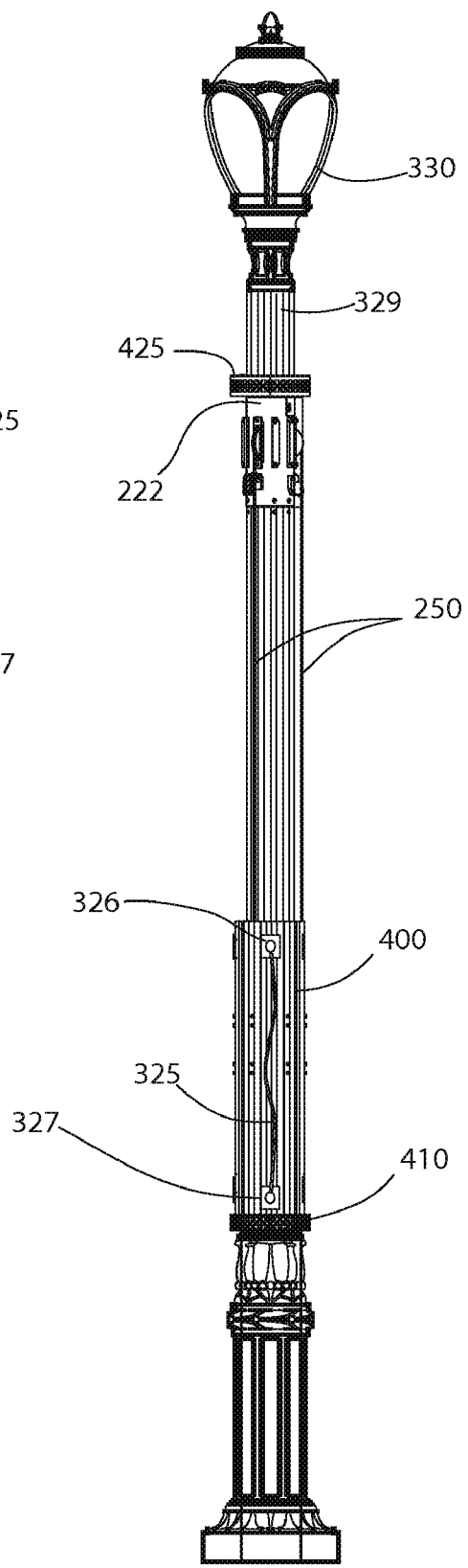
FIG. 81 provides a side view illustrating a banner assembly attached to a carriage assembly according to principles of the invention.

In FIGS. 80 and 81, a system on a lighting pole features embodiments without a planter but with banners 325. Hangers or banner arms 326 and 327 are removably mounted to the carriage assembly 400. A banner 325 is hung, supported or suspended by each pair of hangers or banner arms 326 and 327. Thus, the carriage supports accessories, such as the banners. The banners and arms, or hangers may be readily changed or removed upon lowering the carriage 400. This particular embodiment also includes a light assembly 330 with a coupled light mounting post 329. Alternatively, flags can be hung from hanger arms or posts as in FIGS. 82 and 83, with or without planters.

Figure 79:
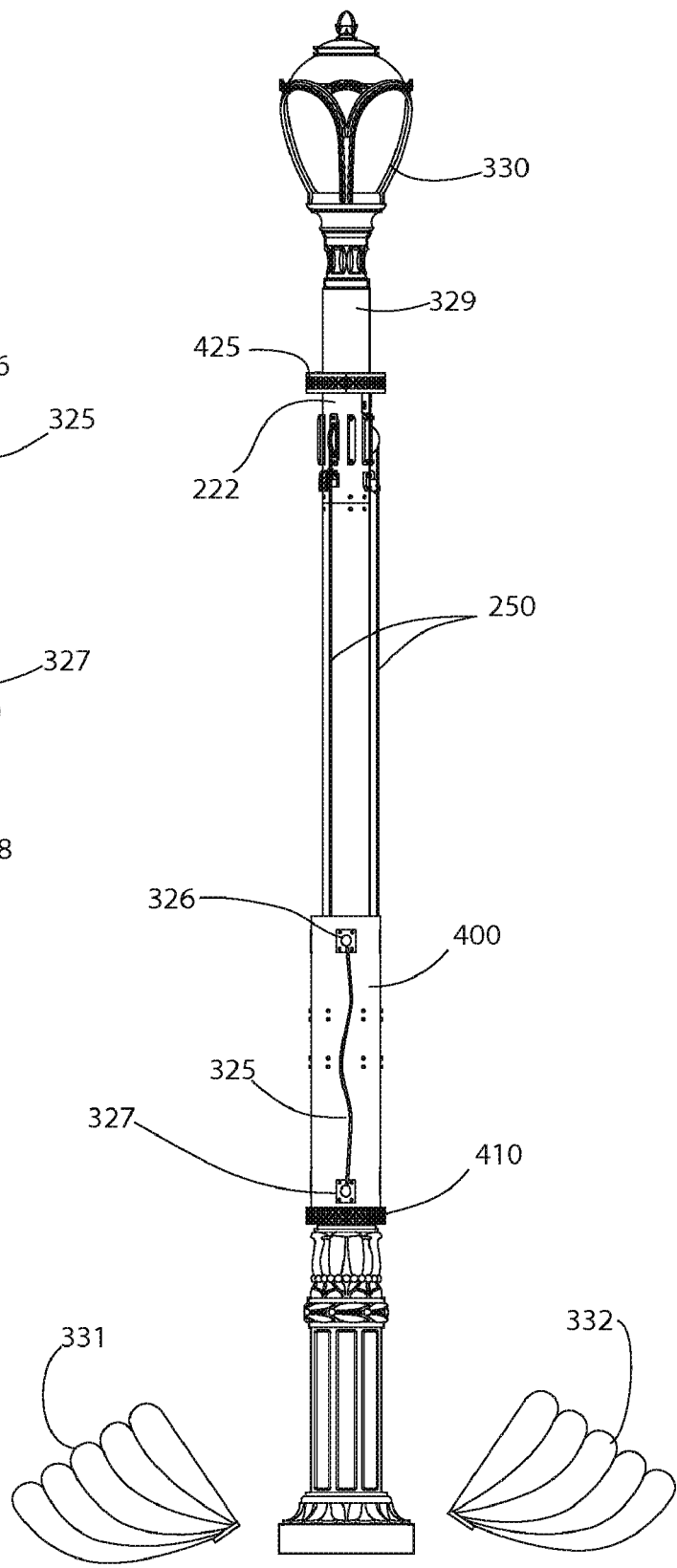
FIG. 79 provides a side view illustrating a multi-section planter assembly with a banner assembly and disassembled planter assembly according to principles of the invention.

Thus, in embodiments with planters, such as, for example, the exemplary embodiment of FIGS. 78 and 79, banner arms and/or flag poles may be attached to the carriage assembly. Additionally, the planter may be removed, such as by the end-user, or omitted. Without the planter, the systems may resemble the exemplary embodiments of FIGS. 80 and 81, for example.

Figure 82:
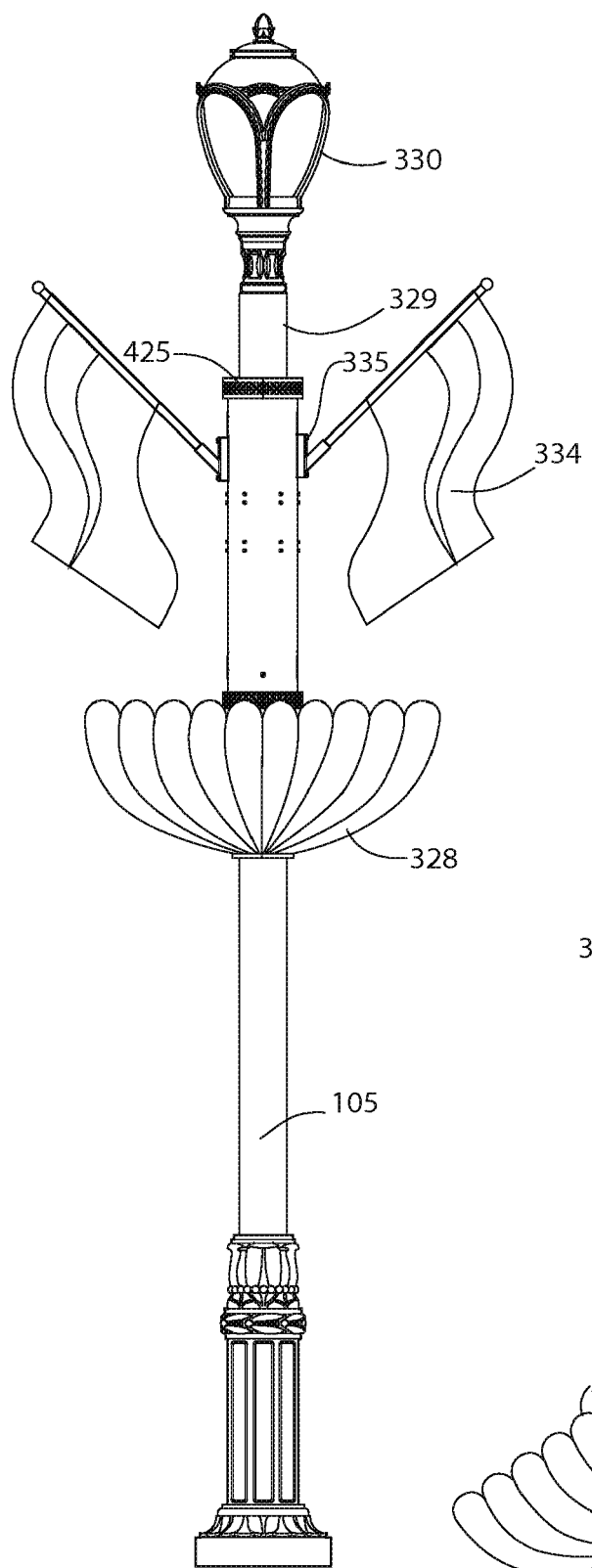
FIG. 82 provides a front view illustrating a planter assembly with a flag assembly according to principles of the invention.
Figure 83:
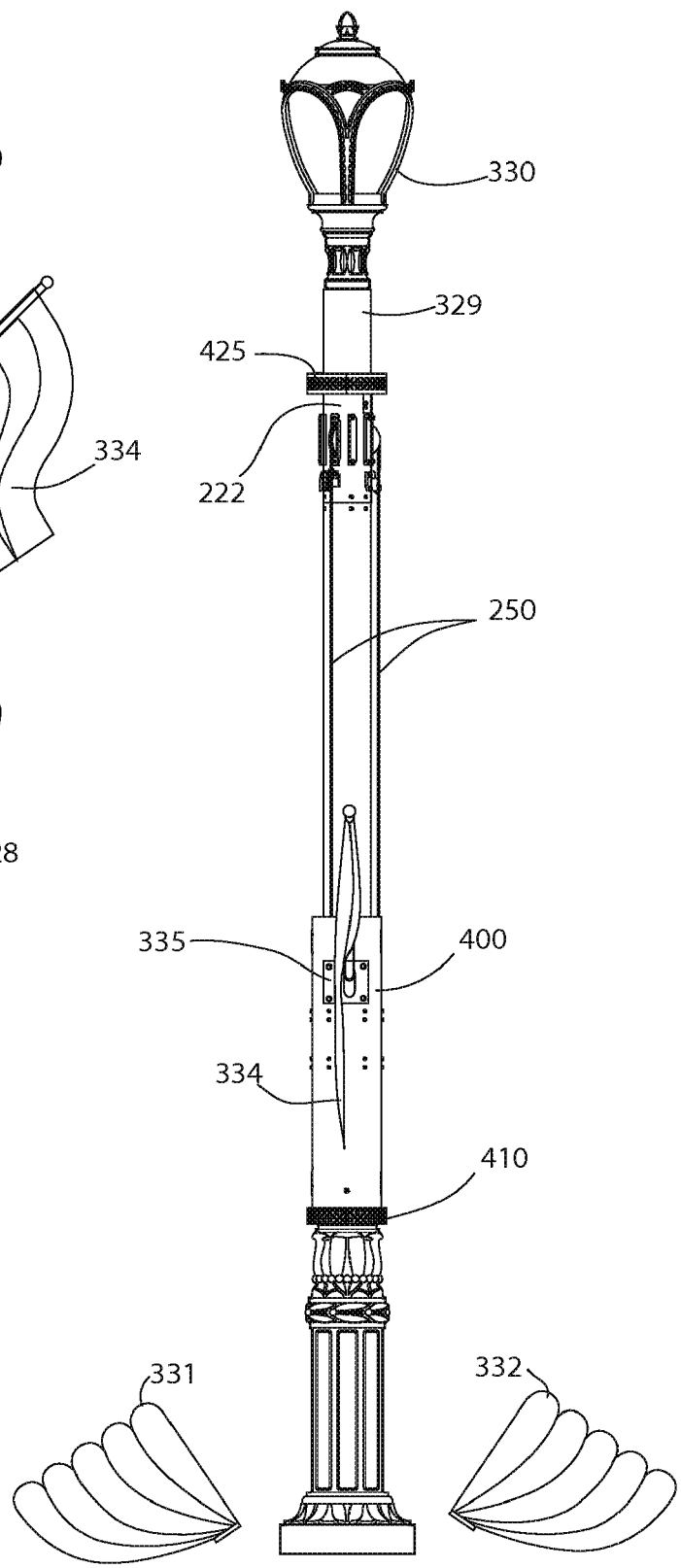
FIG. 83 provides a side view illustrating a multi-section planter assembly with a flag assembly and disassembled planter assembly according to principles of the invention.
Figure 86:
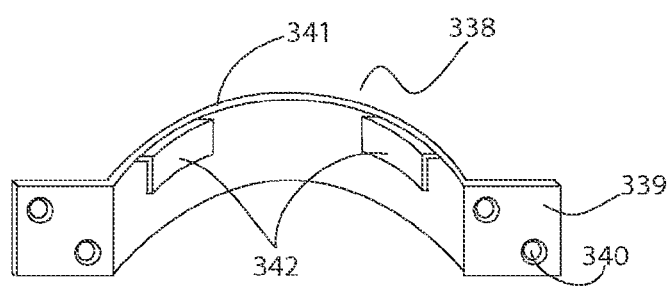
FIG. 86 provides a perspective view of a clamping component of a clamp assembly for a planter assembly with a plurality of planter baskets according to principles of the invention.
Figure 87:
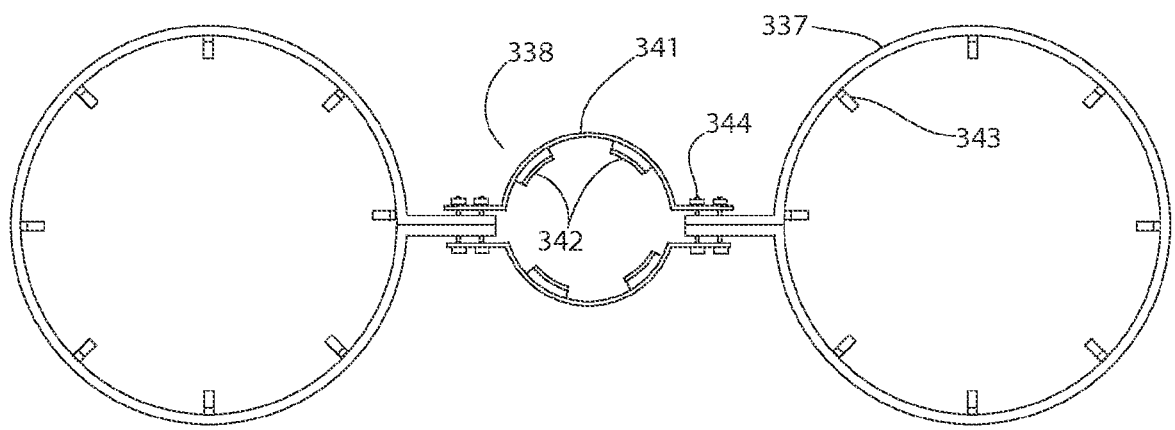
FIG. 87 provides a plan view of an exemplary clamp assembly and basket holders for a planter assembly with a plurality of planter baskets according to principles of the invention.
Figure 88:
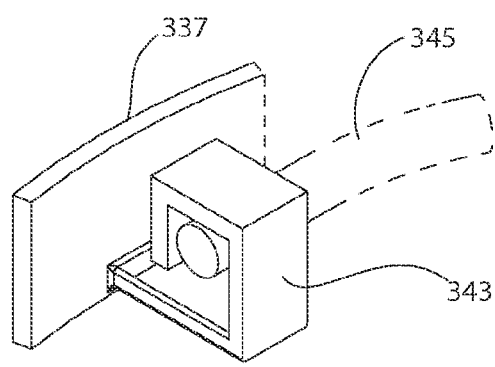
FIG. 88 provides a perspective view of a bracket for a hanging planter assembly with a planter basket according to principles of the invention.

In FIG. 82, a front view, and FIG. 83, a side view, a planter system on a lighting pole features embodiments with multi-section 331 and 332 planter assemblies 328 and flags 334. Flag posts or hangers 335 are removably mounted to the carriage assembly 400. A flag 334 is supported, hung or suspended by the hanger or flag post 335. Thus, the carriage supports both the planter 328 and accessories, such as the flags. The flags and hangers, or posts may be readily changed or removed upon lowering the carriage 400. This particular embodiment also includes a light assembly 330 with a coupled light mounting post 329.

In FIGS. 84 through 88, a planter system features embodiments with a wire basket planter assembly 336 and banners 325. Hangers or banner arms 326 and 327 are removably mounted to the carriage assembly 400. A banner 325 is supported, hung or suspended by each pair of hangers or banner arms 326 and 327. Thus, the carriage supports both the planter 336 and hanging accessories, such as the banners. The banners and arms may be readily changed or removed upon lowering the carriage 400. The baskets 336 may be removed from the basket support frames 337. Each basket support frame 337 comprises a clamped band with an interior surface that supports basket mounting hooks 343. The wire frame 345 of the baskets 336 may be fed into and removed from the support hooks 343. Mounting hardware such as nuts and bolts 344 connects each basket support frame 337 to a carriage mounting bracket 338. The bracket 338 comprises a pair of generally U-shaped clamping bands 341 connected together through aligned mounting holes 340 on opposed mounting flanges 339. Carriage hooks 342 are provided on the interior surface of the bracket 338. The hooks 342 are configured to engage slots 435 in the carriage assembly 400 as shown in FIGS. 24 and 31. This particular embodiment also includes a light assembly 330 with a coupled light mounting post 333. Optionally, the wire baskets can be replaced with solid planters. Alternatively, banners can be replaced by flags and hung from hanger posts as in FIG. 82.

Figure 89:
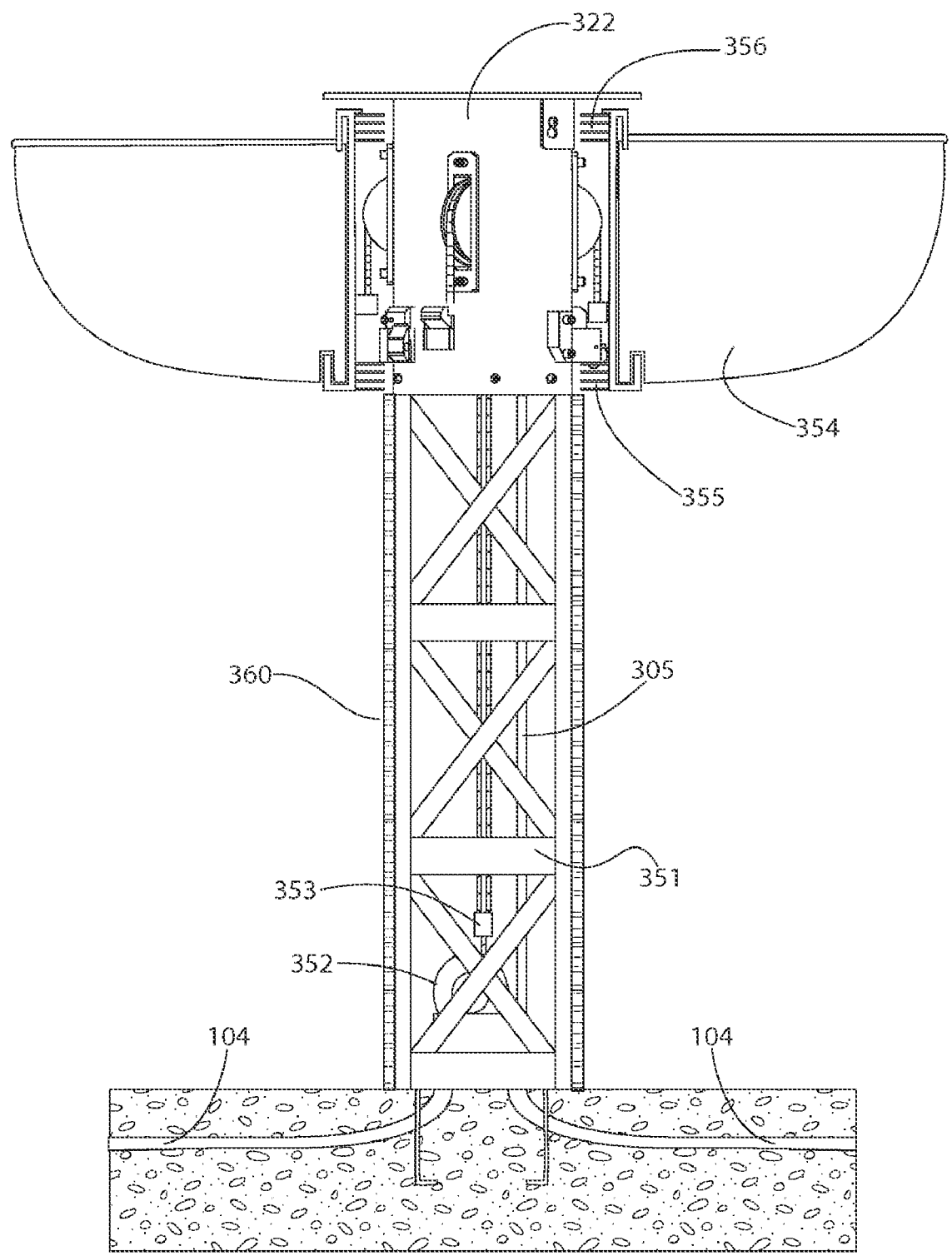
FIG. 89 provides a side section view of a veneered planter assembly according to principles of the invention.

With reference now to FIG. 89, an embodiment with a laminated 360 support framework 351 is illustrated. A winch 352 with a tether and a yoke 353 coupled to lanyards raises and lowers the planter assembly 354. Guides such as bristles or brushes 355 and 356 are provided at the bottom and top of the planter assembly, respectively. A collar assembly 322 is provided on the support framework. One or more electrical and/or plumbing conduits 305 are provided. Sweeps 104 can be installed in the base for easy installation of flexible electric and irrigation lines. A large access door can be installed on one side of the base eliminating one of the cross bar trusts to open up the area. Thus, a veneer 360 may be used to decorate a support structure 351, which may be non-round, rectangular, square, elliptical, oval or any other shape.

Various alternative embodiments are illustrated in FIGS. 90 through 92. In each case a vertical support with a decorative surface 360, 361, 363 is provided. Additionally, in each case, a raisable and lowerable planter assembly with a different appearance 354, 362 and 364 is provided. The possible combinations and variations of the shapes, configurations, sizes and aesthetic features of the vertical support and planter are boundless. The invention is highly scalable from small backyard devices to large commercial structures.

Figure 93:
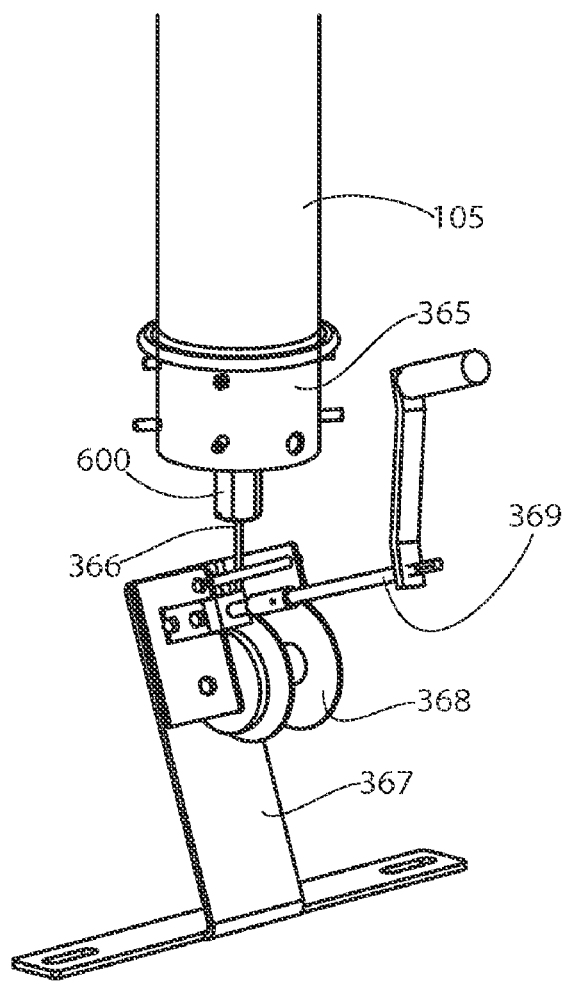
FIG. 93 provides a perspective view of components of a crank-powered mechanical winch assembly for a planter assembly according to principles of the invention.
Figure 94:
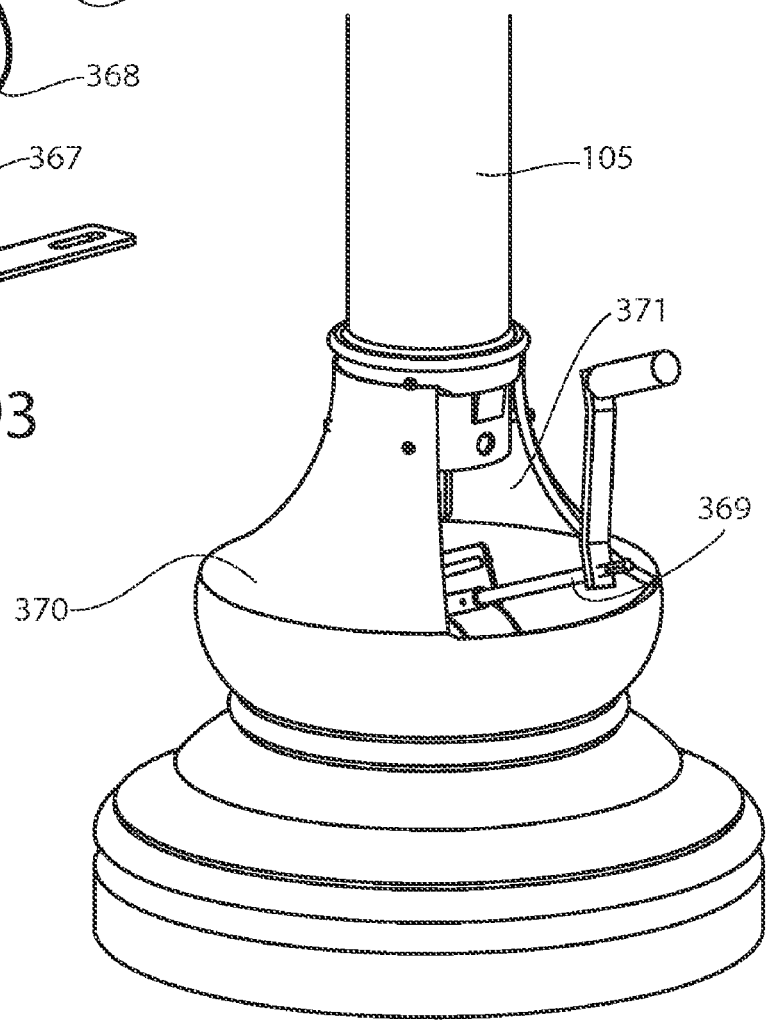
FIG. 94 provides a perspective view of components of a crank-powered winch assembly partially exposed through an opening in a base for a planter assembly according to principles of the invention.
Figure 98:
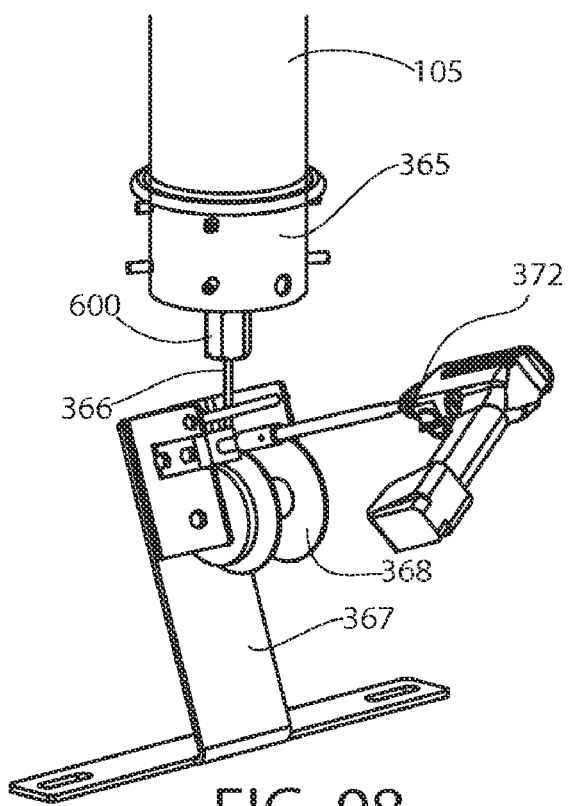
FIG. 98 provides a perspective view of components of a drill-powered mechanical winch assembly for a planter assembly according to principles of the invention.
Figure 99:
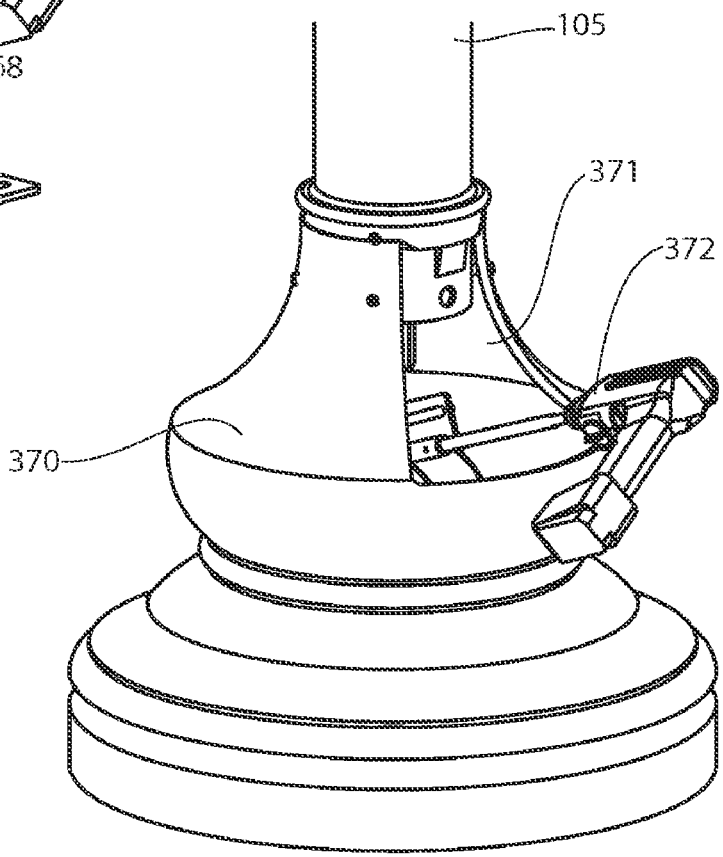
FIG. 99 provides a perspective view of components of a drill-powered mechanical winch assembly partially exposed through an opening in a base for a planter assembly according to principles of the invention.

In FIGS. 93 and 94, an embodiment of a raising and lowering means comprising a manually cranked winch 368 is shown. A tether (e.g., cable) 366 extends from the winch 368 to a yoke 600. A crank shaft 369 with a handle extends from the winch. The crank shaft and handle may be removable and/or collapsible or foldable. A support bracket 367 supports the winch 368 in the base 370 of the assembly. The slots on the bottom of the support bracket 367 can be aligned with the anchor bolts securing the base and pole to a concrete foundation. The base includes a removable access panel that provides an access port 371 for accessing the winch. In the alternative embodiment of FIGS. 98 and 99, a removable powered drill 372 is shown engaging and driving the crank shaft upon removing the handle.

With reference now to FIGS. 95 through 97, embodiments with external removable raising and lowering means are shown. A winch 375 on a platform 374 with a leveling telescopic support pole 373 and a connecting bracket 377 engages the bottom 365 of the pole 105. One or more pulleys 376 on the platform 374 and/or bracket 377 routes the tether 378 to the winch 375, which may be drill or manually operated. When the planter is raised to a locked position, the tether may be removed from the winch 375 and the external removable raising and lowering means may be removed. When the planter has to be unlocked and lowered, the external removable raising and lowering means may be provided again. Alternative removable and portable systems can be used.

Figure 100:
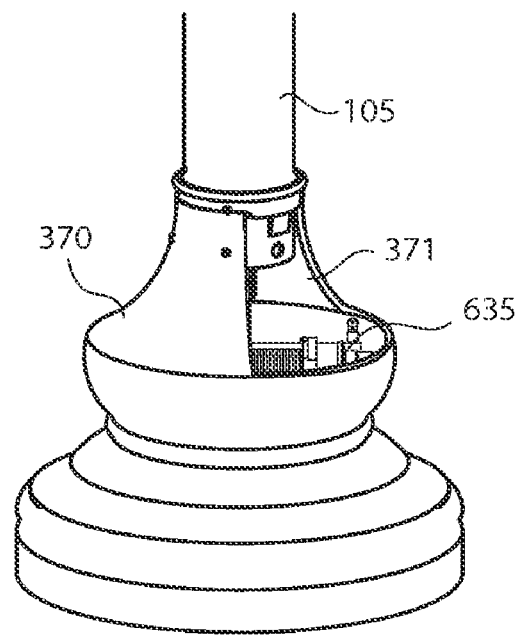
FIG. 100 provides a perspective view of components of an electrical winch assembly for a planter assembly according to principles of the invention.

In FIG. 100 an electrical winch 635 is partially shown contained in the base. The winch 635 may be remote controlled or controlled using switches and/or control panels provide on or near the winch 635 or base 370. Utility or battery electrical power may be used.

Figure 101:
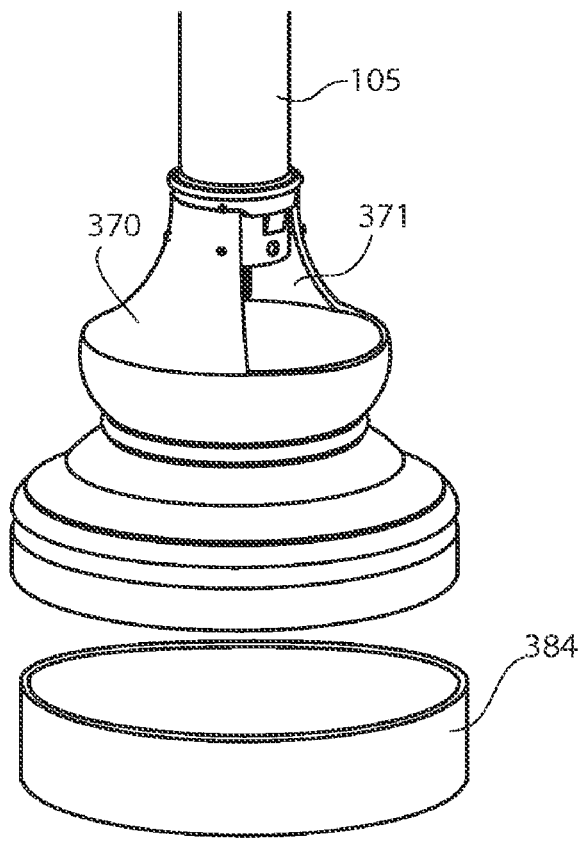
FIG. 101 provides a perspective view of components of an electrical winch assembly with an extended base for a planter assembly according to principles of the invention.
Figure 110:
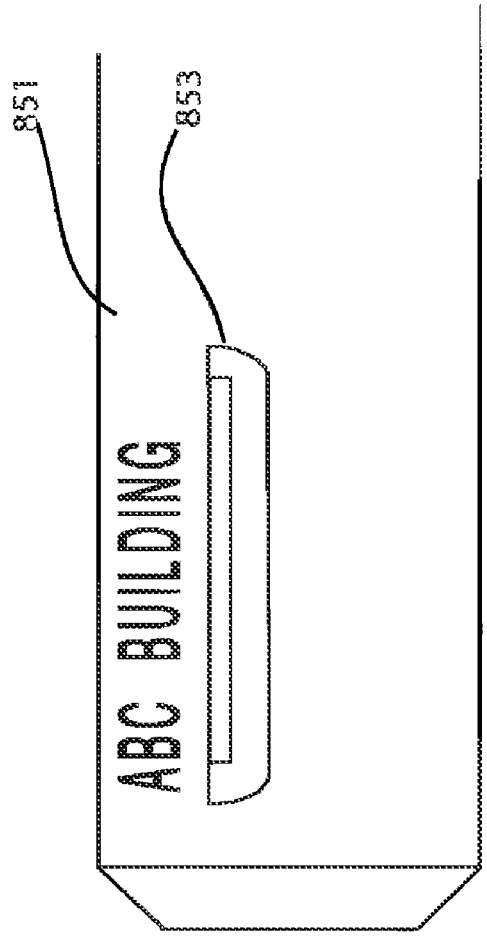
FIG. 110 provides a front view of a planter assembly with a raceway building sign according to principles of the invention.

FIG. 101 provides an embodiment with a supplemental support base 384. The supplemental support base 384 increases the storage volume of the base 370, which may be a standard inventoried base to accommodate alternative raising and lowering means and related items. Attachment to the standard base can be achieved via bolting, welding, initial forming or other means. Any variety of shapes can be used to enhance the aesthetics.

Figure 111:
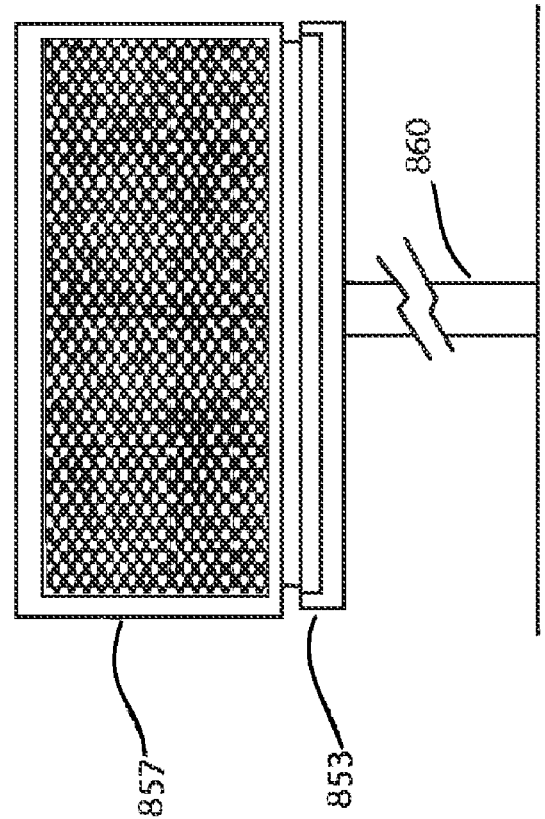
FIG. 111 provides a front view of a single faced raceway planter assembly with an LED digital billboard sign according to principles of the invention.

FIGS. 102 through 109 illustrate various vertical supports, planters and optional signage. The vertical supports 856, 861, 862 and 864 may be round or non-round, singular or a plurality. The planters 852 may be bundt-styled or 853 raceway-styled, or some other configuration and may have various shapes, sizes and configurations to suit their respective vertical supports and signage. Additionally, the banners, flags and wire basket systems in FIGS. 78-88 can be used on signage. The signage 850 may be illuminated or not. Electronic Digital, LCD and LED signage 856 may be utilized. Electrical power, communication data and irrigation lines may run through conduit in the vertical supports to operate the signs, as needed. A building mounted sign 851 and an LED billboard sign 857 are further shown in FIGS. 110 and 111, respectively.

Figures 112, 113:
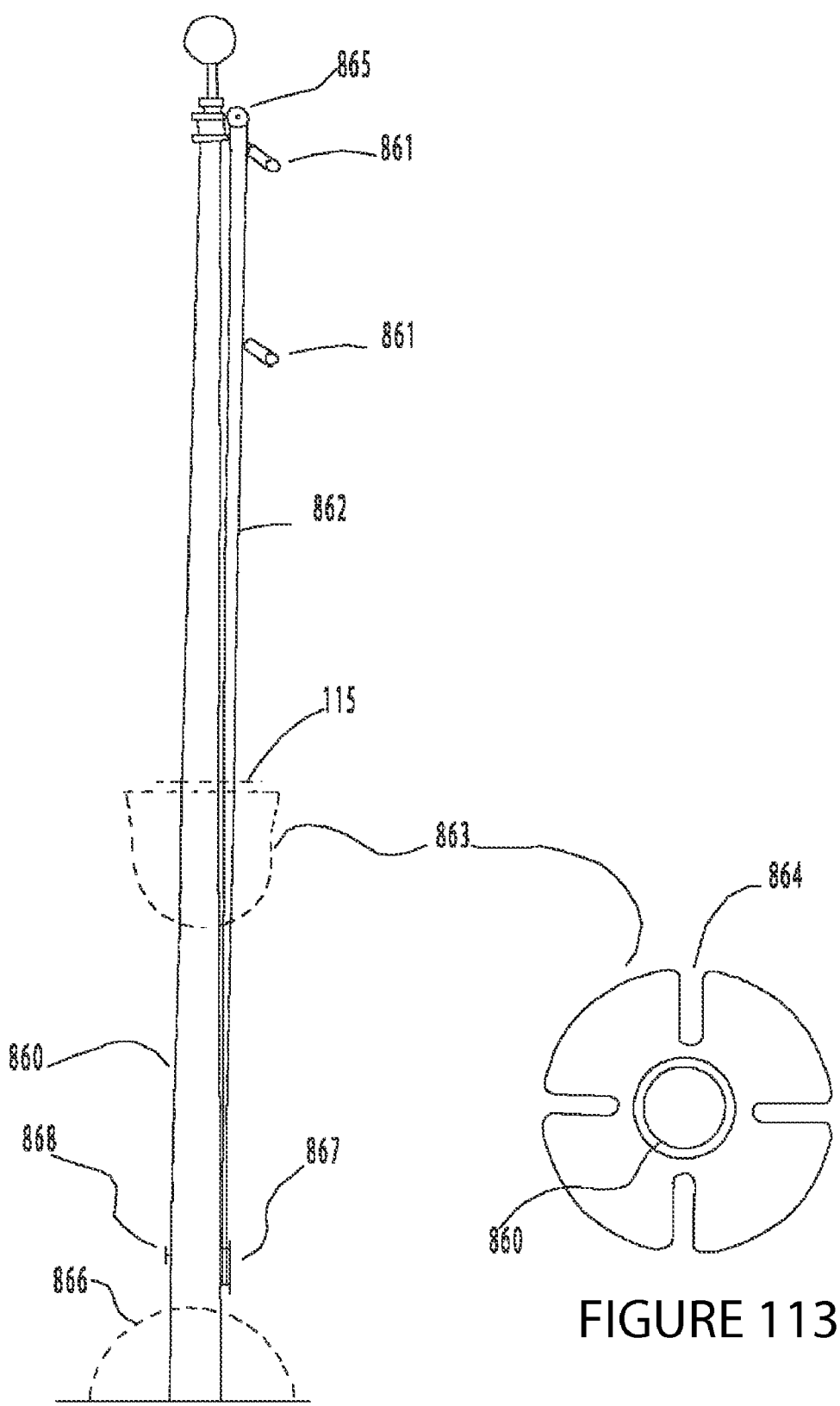
FIG. 112 provides a front view of a planter assembly with flagpole according to principles of the invention.
FIG. 113 provides a top view of a planter assembly for a flagpole according to principles of the invention.

With reference now to FIGS. 112 and 113, flag pole 860 embodiments are shown. The exemplary planter assembly 863 uniquely includes a configuration with one or more channels 864 to accommodate the lanyard used to raise and lower the flag. Thus the lanyard 862 may travel between sections of the planter in the channel 864. A cleat 867 is provided for securing the lanyard. A base 866 is provided to house raising and lowering means for the planter 863. The cleat is secured to the pole with mounting hardware 868. Couplings 861 are provided to secure a flag to the lanyard 862. A pulley 865 is provided to define the top most position of the flag and to facilitate raising and lowering. An internal halyard flag pole can be used with other varying requirements.

Figure 114:
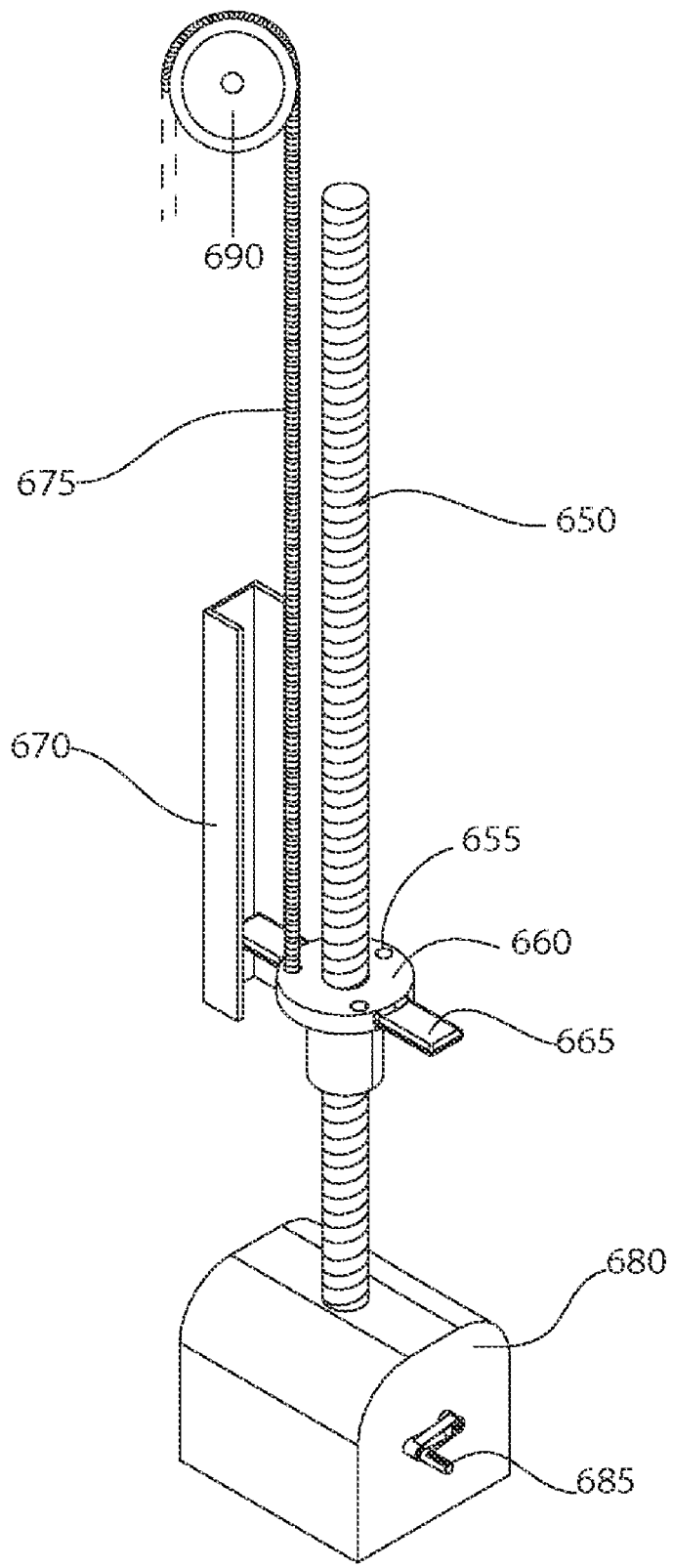
FIG. 114 provides a perspective view of a lead screw assembly for a planter assembly according to principles of the invention.

With reference now to FIG. 114, a raising and lowering means comprising a lead screw 650 with a threaded yoke 660 is shown. The yoke 660 includes threaded joints 655 for connecting one or more lanyards 675 routed over a pulley 690 to a planter assembly or carriage for a planter assembly. One or more u-shaped channel guide tracks 670 is mounted to the interior of the vertical support (e.g., pole). An arm 665 extends from the yoke 660 to the guide track 670. The guide track 670 allows upward and downward movement of the yoke, but prevents twisting motion of yoke relative to the guide track. This is important to prevent twisting of the lanyards 675. A generic gear box 680 converts crank or motor revolutions to rotational input to the lead screw 650. As the crank 685 is turned, the lead screw turns. As the lead screw turns, the yoke either rises or descends, depending upon the direction of rotation. The gear box 680 can be cranked by an electrical drill, or motor or other means.

Figure 115:
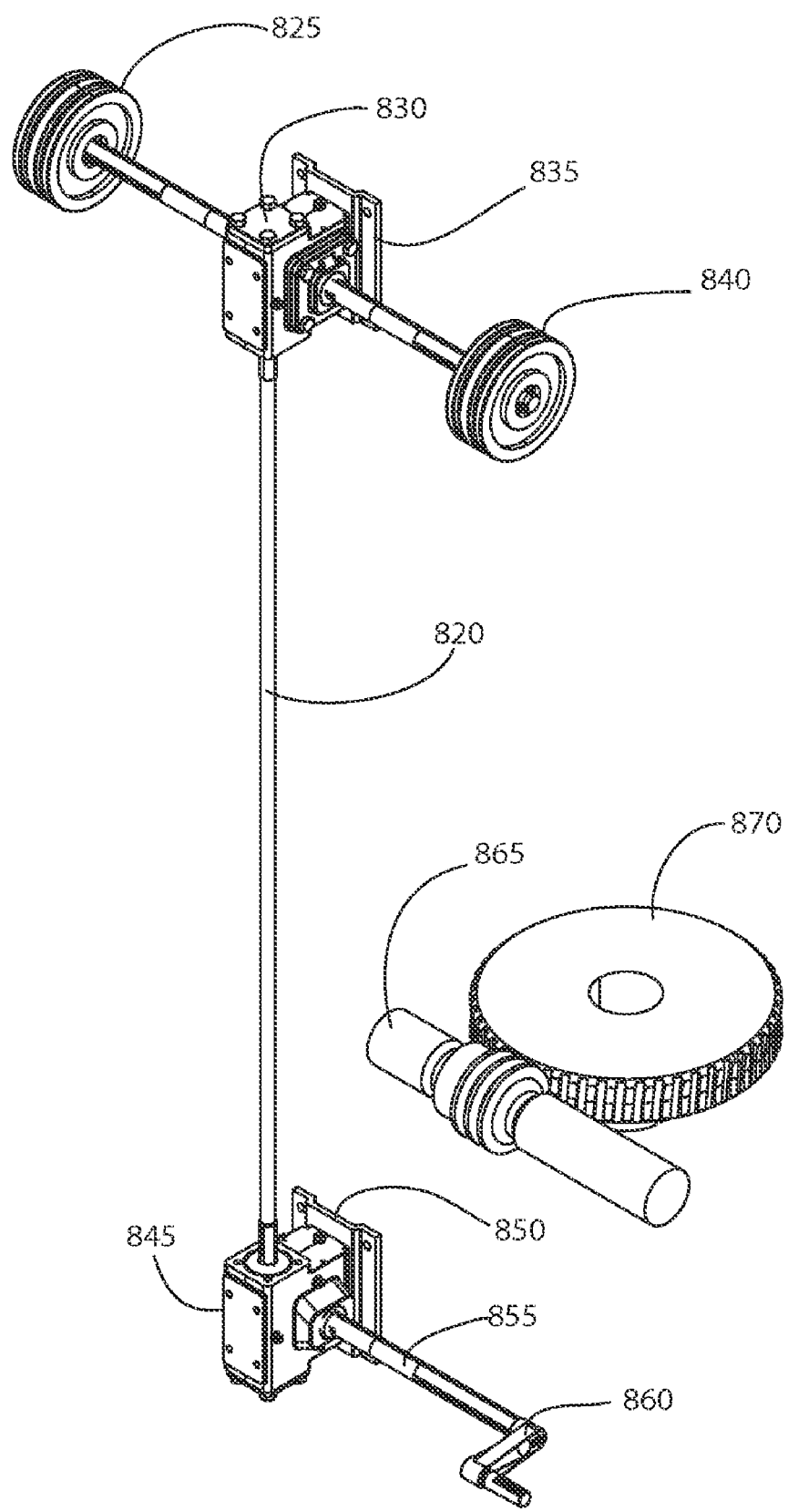
FIG. 115 provides a perspective view of a drive shaft and gear box assembly for a planter assembly according to principles of the invention.

Now referring to FIG. 115, a raising and lowering means comprising a drive shaft 820 between gear boxes 830, 845 is shown. Each gear box may contain an input worm gear 865 driving a circular gear 870. Rotating the worm gear 865, rotates the driven circular gear 870 which is coupled to the drive shaft 820. Thus, rotating the crank shaft 855 using the handle 860, causes the drive shaft 820 to rotate which causes the spools 825, 840 connected by an axle to the top gear box 830 to rotate. The top gear box and bottom gear box each include mounts 835, 850 for attachment to the interior vertical support. Causing the spools to rotate one direction raises the planter assembly by winding up supporting lanyards, while rotation in the opposite direction lowers the planter assembly.

Figure 116:
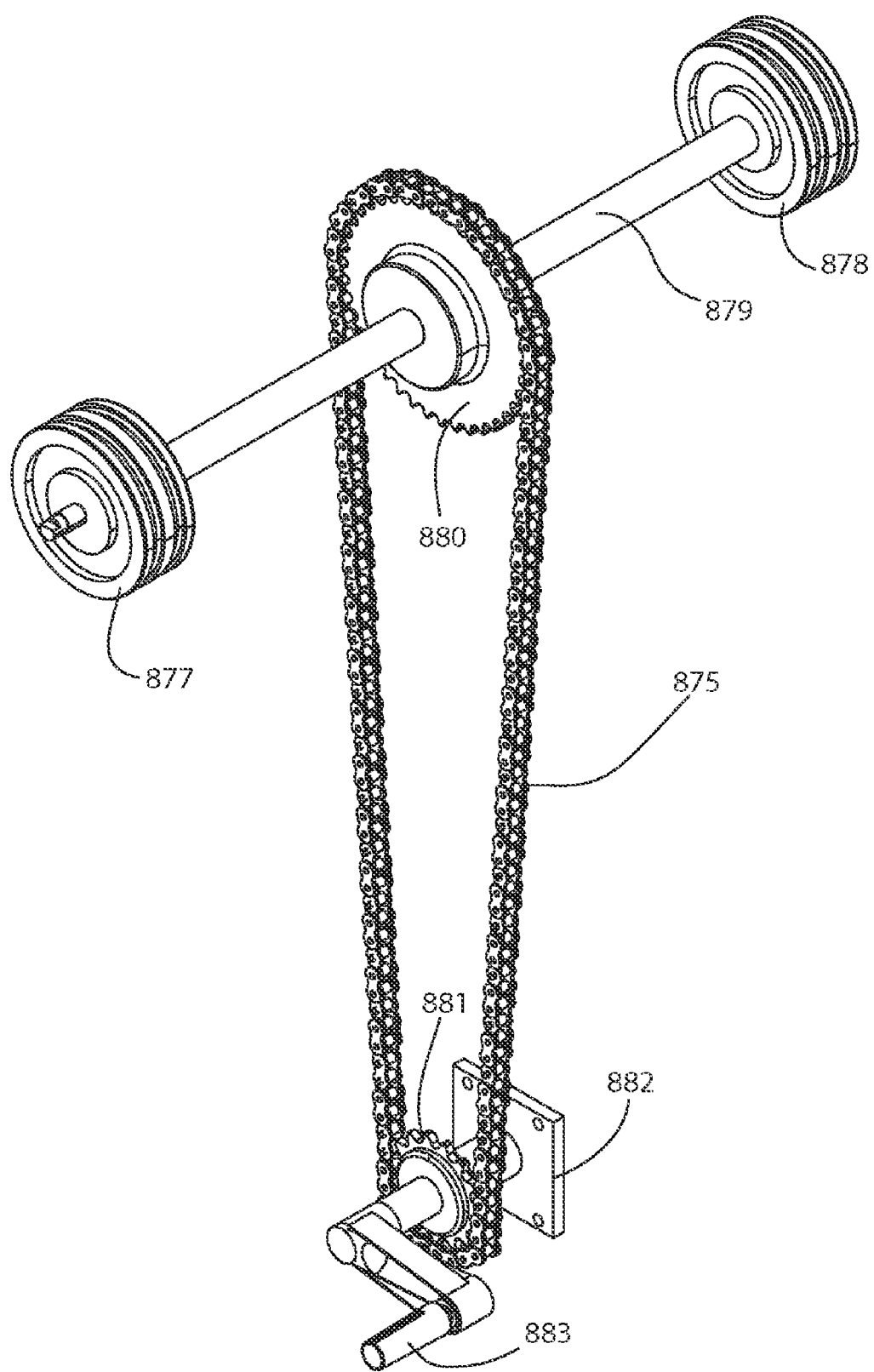
FIG. 116 provides a perspective view of a sprocket and chain drive assembly for a planter assembly according to principles of the invention.

Now referring to FIG. 116, a raising and lowering means comprising sprockets 881, 880 and a chain 875 is shown. Rotating the crank 883 rotates a sprocket 881 rotatably mounted to the interior of the vertical support using a mounting pad 882. The rotating sprocket drives the chain 875. The driven chain drives the opposite sprocket 880 which turns the coupled axle 879, which rotates the spools 877, 878. Thus, rotating the crank 883 causes the spools 877, 878 to rotate. Causing the spools to rotate one direction raises the planter assembly by winding up supporting lanyards, while rotation in the opposite direction lowers the planter assembly.

Various raising and lowering means may include, but are not limited to, a tether and pulley, a winch, a windlass, a block and tackle, a compression spring, an extension spring, a rack and pinion, a hydraulic cylinder, a pneumatic cylinder, a lead screw assembly, a beveled gear assembly, a worm gear assembly and a ballast etc.

While exemplary embodiments of the invention have been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:
1. An adjustable height planter system comprising
an adjustable height planter assembly,
a vertical support structure, said vertical support structure being tubular and having a cross-section shape from the group consisting of circular and noncircular,
raising and lowering means for controllably moving the planter assembly relative to the support structure along a continuum of heights, from a lowest position to a highest position, a tether assembly having a first portion and a second portion, the tether assembly operably coupling the adjustable height planter assembly to the raising and lowering means, a pulley at a raised height, said tether assembly extending from said raising and lowering means over said pulley to said adjustable height planter assembly, said adjustable height planter assembly being coupled to and suspended from the second portion of the tether assembly, and said second portion of the tether assembly being external to the vertical support structure, and said first portion of the tether assembly being internal to the vertical support, and said raising and lowering means being configured to move the planter assembly along a continuum of heights, from the lowest position to the highest position by controllably adjusting the tether assembly from which the planter assembly is suspended, and said planter assembly comprising a planter container and being configured to substantially surround a portion of the vertical support structure and hold contents comprising a plant in a planting medium, said planter container having a top that is substantially-uncovered and remains substantially uncovered throughout the entire range of motion, including at the highest position, allowing the contents to be exposed throughout the entire range of motion, and said planter assembly including a channel through which the surrounded portion of the vertical support extends, and said planter assembly further comprising a drainage aperture, said drainage aperture being positioned and sized to automatically release from the planter assembly liquid accumulated in the planter container while contents are held in the planter container.

2. An adjustable height planter system according to claim 1, said adjustable height planter system further comprising a plurality of guides disposed between the vertical support structure and the planter assembly, said plurality of guides maintaining a space between the vertical support structure and the planter assembly, protecting the vertical support structure from marring when the planter assembly moves relative to the vertical support structure, and facilitating movement of the planter assembly relative to the vertical support structure.

3. An adjustable height planter system according to claim 2, wherein said guides comprise a plurality of supporting tether assemblies.

4. An adjustable height planter system according to claim 2, wherein said guides comprise rollers.

5. An adjustable height planter system according to claim 2, wherein said guides comprise slides.

6. An adjustable height planter system according to claim 2, wherein said guides comprise resilient material.

7. An adjustable height planter system according to claim 2, wherein said guides comprise brushes.

8. An adjustable height planter system according to claim 2, wherein said guides comprise bristles.

9. An adjustable height planter system according to claim 2, wherein said guides comprise gaskets.

10. An adjustable height planter system according to claim 2, wherein said guides comprise a registration male pin and a female receptacle.

11. An adjustable height planter system according to claim 1, said adjustable height planter system further comprising an automatic locking assembly apart from the raising and lowering means, said automatic locking assembly configured to automatically releasably secure and hold the weight of the planter assembly at a locking height, said locking assembly comprising a first locking mechanism associated with the planter assembly in the channel of the planter assembly and a corresponding engageable locking mechanism associated with the support structure at the locking height, whereby, upon moving the planter assembly to the locking height, the first locking mechanism automatically engages and thereby locks with the engageable locking mechanism, preventing the planter assembly from moving below the locking height, and, upon raising the planter assembly above the locking height, the first locking mechanism automatically disengages and thereby unlocks from the engageable locking mechanism allowing the planter assembly to move relative to the support structure along a continuum of heights, from the highest position to the lowest position.

12. An adjustable height planter system according to claim 11, said first locking mechanism associated with the planter assembly comprising a mechanism movable relative to the planter assembly, and said engageable locking mechanism associated with the support structure comprising a mechanism stationary relative to the support structure.

13. An adjustable height planter system according to claim 11, said first locking mechanism associated with the planter assembly comprising a mechanism stationary relative to the planter assembly, and said engageable locking mechanism associated with the support structure comprising a mechanism movable relative to the support structure.

14. An adjustable height planter system according to claim 11, said first locking mechanism associated with the planter assembly comprising a pivoting hook, and said engageable locking mechanism associated with the support structure comprising a slot for receiving a portion of the pivoting hook when moved into a locking position.

15. An adjustable height planter system according to claim 1, said planter assembly comprising a carriage movable relative to the vertical support and said planter container being supported by said carriage.

16. An adjustable planter system according to claim 15, said carriage including a plurality of hangers configured to support a plurality of objects.

17. An adjustable height planter system according to claim 15, said carriage including a carriage body to which an accessory may be attached.

18. An adjustable height planter system according to claim 17, said accessory comprising an item from the group consisting of a flag and banner.

19. An adjustable height planter system according to claim 1, said planter assembly comprising a carriage movable relative to the vertical support and said planter container being supported by said carriage, said carriage including a flange with a plurality of slots, said planter container including a plurality of hooks configured to engage said slots.

20. An adjustable height planter system according to claim 1, said planter assembly comprising a carriage movable relative to the vertical support and said planter container supported by said carriage, and said vertical support including a collar, said pulley being rotatably attached to said collar.

21. A planter system according to claim 1, said raising and lowering means comprising a winch operably coupled to said first portion of the tether assembly, said winch being adapted to retract and extend said tether assembly, and said pulley guiding said tether assembly.

22. A planter system according to claim 1, said raising and lowering means comprising a winch with a second pulley operably coupled to said first portion of the tether assembly, said winch being adapted to retract and extend said tether assembly.

23. A planter system according to claim 1, further comprising an irrigation unit attached to the vertical support, said irrigation unit having an outlet at about the highest position, a solenoid valve controlling the supply of water to the irrigation unit, said irrigation unit automatically supplying water to the planter assembly in the highest position.

24. A planter system according to claim 23, said irrigation unit supplying water to surrounding terrain beyond the planter container.

25. A planter system according to claim 23, said irrigation unit supplying misting to the planter and surrounding terrain beyond the planter container.

26. A planter system according to claim 23, said irrigation unit comprising a water fountain.

27. A planter system according to claim 1, said raising and lowering means comprising a winch operably coupled to said first portion of said tether assembly, said winch being adapted to retract and extend said tether assembly, and said winch being contained within the vertical support structure.

28. A planter system according to claim 1, said pulley guiding said tether assembly, and said raising and lowering means comprising an access panel providing access into the vertical support structure, and a removable winch removably coupled to said tether assembly through said access panel, said removable winch being adapted to retract and extend said tether assembly.

29. A planter system according to claim 1, said planter container comprising a plurality of removable, replaceable and rotatable planter vessels, said planter vessels enabling segregation of growing media and plants, independent removal and replacement of plants, said planter container supporting said planter vessels in spaced apart relation, and insulation material provided in spaces between said planter vessels for temperature control.

30. A planter system according to claim 1, further comprising a waterfall assembly including a reservoir at a bottom end of said vertical support structure, said planter container having a peripheral edge, said planter container being above the reservoir, and the irrigation unit configured to supply water through a pipe extending from the vertical support structure to beyond the peripheral edge of the planter container, said reservoir being configured to catch water supplied beyond the peripheral edge, said reservoir containing a pump configured to pump the water back to the pipe extending from the vertical support structure to beyond the peripheral edge of the planter container.

31. A planter system according to claim 1, said system further comprising a sign attached to the vertical support.

32. A planter system according to claim 1, said vertical support comprising a flag pole.

\* \* \* \* \*